United States Patent [19]

Tani et al.

[11] Patent Number: 5,416,517

[45] Date of Patent: May 16, 1995

[54] APPARATUS FOR DRIVING IMAGE PICK-UP DEVICE INCLUDING SMEAR PREVENTION

[76] Inventors: Nobuhiro Tani; Shinichi Kakiuchi, both c/o Asahi Kogaku Kogyo Kabushiki Kaisha, 36-9, Maenocho 2-chome, Itabashi-ku, Tokyo, Japan

[21] Appl. No.: 87,081

[22] Filed: Jul. 7, 1993

Related U.S. Application Data

[60] Division of Ser. No. 613,086, Nov. 15, 1990, Pat. No. 5,282,041, which is a continuation-in-part of Ser. No. 452,283, Dec. 15, 1989, abandoned.

[30] Foreign Application Priority Data

| Dec. 15, 1988 | [JP] | Japan | 63-317374 |
| Dec. 16, 1988 | [JP] | Japan | 63-317904 |
| Dec. 19, 1988 | [JP] | Japan | 63-320004 |
| Dec. 21, 1988 | [JP] | Japan | 63-322518 |
| Dec. 21, 1988 | [JP] | Japan | 63-322519 |
| Dec. 21, 1988 | [JP] | Japan | 63-322520 |
| Nov. 15, 1989 | [JP] | Japan | 1-296997 |

[51] Int. Cl.⁶ .......................................... H04N 5/238
[52] U.S. Cl. .................................... 348/249; 348/363
[58] Field of Search .............. 358/228, 213.24, 213.19, 358/213.13, 209, 248, 249, 363; H04N 5/238; 354/446, 451, 452

[56] References Cited

U.S. PATENT DOCUMENTS

| 4,516,172 | 5/1985 | Miyata et al. ................. 358/228 |
| 4,599,657 | 7/1986 | Kinoshita et al. . |
| 4,622,596 | 11/1986 | Suga et al. . |
| 4,689,686 | 8/1987 | Hashimoto et al. . |
| 4,714,963 | 12/1987 | Vogel . |
| 4,734,777 | 3/1988 | Okino et al. . |

(List continued on next page.)

FOREIGN PATENT DOCUMENTS

| 0225133 | 6/1987 | European Pat. Off. . |
| 0243977 | 11/1987 | European Pat. Off. . |
| 0256464 | 2/1988 | European Pat. Off. . |
| 0257379 | 3/1988 | European Pat. Off. . |
| 0265925 | 5/1988 | European Pat. Off. . |
| 0357932 | 3/1990 | European Pat. Off. . |
| 3441025 | 5/1985 | Germany . |
| 62-271565 | 11/1987 | Japan . |
| 63-234676 | 9/1988 | Japan . |
| 2196811 | 5/1988 | United Kingdom . |

OTHER PUBLICATIONS

Horii, Kenju, "Half-Inch CCDs: Meeting Challenges," Journal of Electric Engineering, No. 252, Dec. 1987 Tokyo, Japan, pp. 44–46.
"New CCD Camera Variance from EEV", Electronic Engineering, Jun. 1988, pp. 9–14.
United Kingdom Search Report.

*Primary Examiner*—Michael T. Razavi
*Assistant Examiner*—Wendy R. Greening

[57] ABSTRACT

An apparatus for driving an image pick-up device is provided with arrays of photoelectric elements, and vertical transfer portions are located adjacent to the arrays of photoelectric elements. A photographing lens for forming a focused image of an object to be photographed on the light receiving surface of the image pick-up device, a release device for performing a release operation, and a diaphragm device having a diaphragm for adjusting the quantity of light incident upon said light-receiving surface of the image pick-up device are provided. The diaphragm is normally fully closed but when a release operation is commenced, the diaphragm device opens the diaphragm to a predetermined diaphragm value, and fully closes the diaphragm in accordance with a predetermined stop-down speed after a completion of the exposure. A smear detecting mechanism is provided for reading electric charges accumulated in the vertical transfer portions when the diaphragm is opened to the predetermined diaphragm value, after the commencement of said release operation, and for adding the electric charges for every vertical transfer portion to compare the level of the added electrical charges with a predetermined level. A control mechanism is also provided for changing the stop-down speed of the diaphragm depending on the compared level of the added electrical charges.

8 Claims, 32 Drawing Sheets

U.S. PATENT DOCUMENTS

| | | |
|---|---|---|
| 4,742,395 | 5/1988 | Nagai et al. . |
| 4,782,394 | 11/1988 | Hieda et al. . |
| 4,783,702 | 11/1988 | Sone et al. . |
| 4,799,108 | 1/1989 | Gerner . |
| 4,800,435 | 1/1989 | Ikeda et al. . |
| 4,805,024 | 2/1989 | Suzuki et al. . |
| 4,868,667 | 9/1989 | Tani et al. . |
| 4,881,127 | 11/1989 | Isoguchi et al. . |
| 4,884,142 | 11/1989 | Suzuki . |
| 4,908,709 | 3/1990 | Inuiya et al. . |
| 4,912,560 | 3/1990 | Osawa et al. . |
| 4,918,533 | 4/1990 | Date et al. . |
| 4,918,538 | 4/1990 | Saito et al. ............... 358/228 X |
| 4,977,584 | 12/1990 | Kohno et al. . |
| 4,980,769 | 12/1990 | Inuiya et al. . |
| 4,985,776 | 1/1991 | Taniji . |
| 5,031,048 | 7/1991 | Naruto et al. . |
| 5,040,070 | 8/1991 | Higashitsutsumi et al. . |
| 5,187,569 | 2/1993 | Tani ............................. 358/50 |

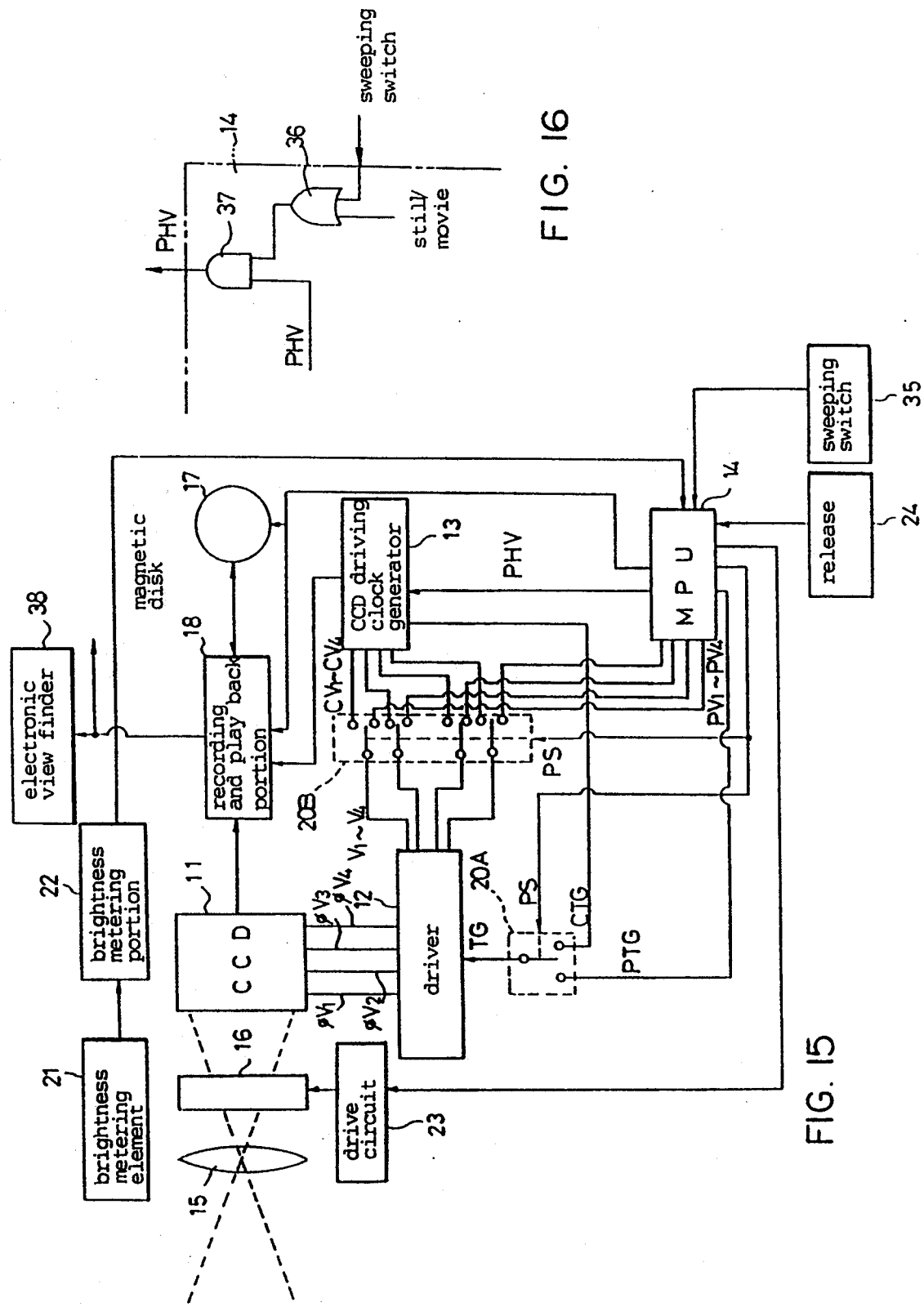

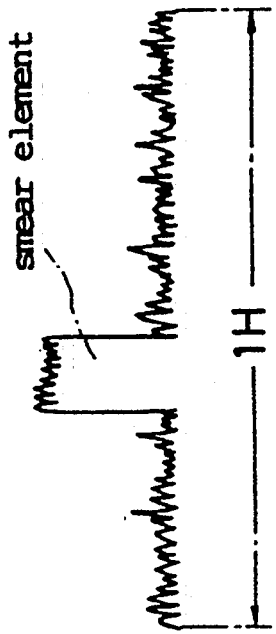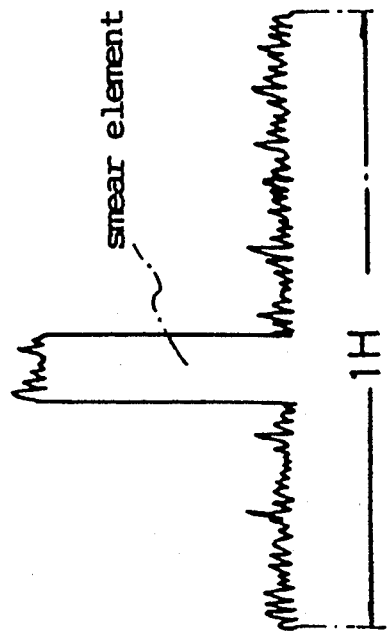
FIG. 33A  FIG. 33B
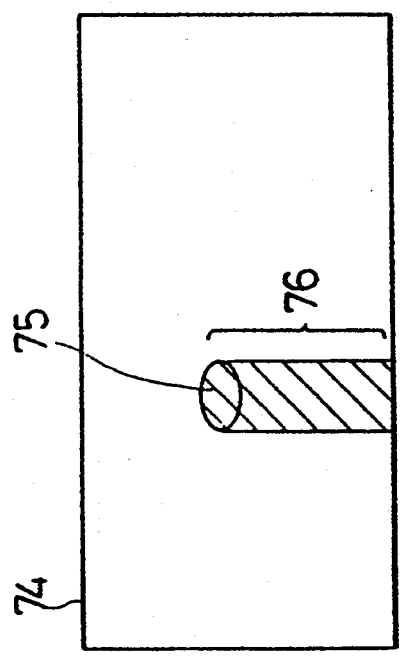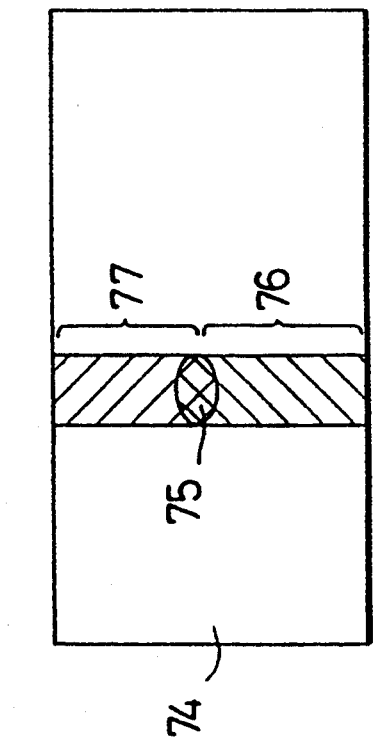
FIG. 34A  FIG. 34B

APPARATUS FOR DRIVING IMAGE PICK-UP DEVICE INCLUDING SMEAR PREVENTION

This application is a division of application Ser. No. 07/613,086, filed Nov. 15, 1990, (U.S. Pat. No. 5,282,041) which is a continuation-in-part of application Ser. No. 07/452,283, filed Dec. 15, 1989, now abandoned.

BACKGROUND OF THE INVENTION

1. Field of the Invention

The present invention relates to an apparatus for driving an image pick-up device, and more precisely it relates to an imaging device driving apparatus which can control the accumulation time of electrical charges of an imaging device, such as a CCD image pick-up device in a still video camera or the like.

2. Description of Related Art

Recently, various electronic still cameras having CCD image pick-up devices used therein in place of conventional silver halide films have been developed. In such electronic still cameras, the shutter speed is mechanically controlled by means of a mechanical shutter that is similar to that found in cameras in which the silver halide film is used to control the period of time in which a light receiving portion of the CCD pick-up device receives light of an object to be photographed.

In a CCD pick-up device, a shutter speed control function similar to the conventional mechanical shutter can be realized by controlling the interval of time for transferring electrical charges accumulated in a light receiving portion (photodiode) to a vertical transfer portion (CCD), i.e., the accumulation time. This is the reason that a pure electronic shutter, which controls the time for accumulation of electrical charges, has been widely adopted in a camera to decrease the weight thereof.

However, in a CCD image, pick-up device which is used in a conventional electronic still camera, transfer pulses are periodically outputted to transfer the signal charges accumulated in the light receiving portion to the vertical transfer portion. Therefore, an apparatus for outputting the transfer pulses at an optional time must be additionally provided. However, the provision of such an additional device makes the electronic control circuit complex and increases the manufacturing cost thereof.

Furthermore, since no mechanical shutter is provided in a pure electronical shutter, light of an object is always incident upon the CCD image pick-up device. This causes a so-called brooming smear phenomenon especially at high object brightness.

The brooming is a phenomenon caused when an intensive light is incident upon an image pick-up element. The electrical charges overflow into circumferential light receiving elements or the vertical transfer portions, so that a bright portion circumferentially spreads. Smear is a phenomenon caused when signal charges are transferred to the vertical transfer portion. Unnecessary electrical charges overflow from the light receiving element, on which the intensive light is made incident, into the vertical transfer portion, so that vertically extending bright fringes occur.

In particular, in an inter-line transfer type of CCD image pick-up device, which is mostly used, it takes a relatively long time to read the signal charges transferred to the vertical transfer portion upon completion of the shutter operation. Accordingly, unnecessary electrical charges accumulated in the light receiving portion tend to overflow into the vertical transfer portion, and are added to the signal charges, resulting in the occurrence of the smear phenomenon.

Generally speaking, brooming occurs more or less in conventional silver halide film, and the to some extent can be accepted to form a natural image. On the other hand, smear phenomenon in the vertical direction leads to an unnatural image, resulting in the failure of a picture.

Furthermore, since the CCD image pick-up device is always exposed, as mentioned above, unnecessary electrical charges accumulated in the light receiving portion must be periodically discharged when no picture is taken. To this end, electrical charges of the light receiving portion are transferred to the vertical transfer portion at one time in accordance with transfer pulses which are periodically outputted by an image pick-up element driver. Thus the electrical charges transferred to the vertical transfer portion are swept to discharge the same into a drain or a silicon circuit board.

Upon operating the shutter, the transfer pulse is first outputted from the image pick-up element driver at a time which is obtained by a calculation of the shutter speed (exposure time, accumulating time), after the periodical generation of the transfer pulses, to transfer the unnecessary electrical charges of the light receiving portion to the vertical transfer portion. As a result, no electrical charge exists in the light receiving portion, so that the accumulation of the signal charges can be commenced. The unnecessary electrical charges of the vertical transfer portion are swept or discharged in accordance with a sweep signal before the subsequent periodical transfer pulse is outputted, i.e., within an exposure time.

After the expiration of the exposure time, the periodical transfer pulse is outputted to transfer the signal charges accumulated in the light receiving portion to the vertical transfer portion, so that the signal charges can be read in accordance with a read signal and be recorded.

As can be understood from the above discussion, in a conventional electronical shutter, the time for sweeping or discharging the unnecessary electrical charges decreases as the shutter speed increases, i.e., as the exposure time decreases. Accordingly, the sweep or discharge of the unnecessary electrical charges must be effected at a high speed.

However, since the capacity of the gate electrodes of the vertical transfer portion is large, if the frequency of the sweep signal is increased, the transfer efficiency is reduced. Namely, the amount of electrical charge which can be swept at one time is decreased.

On the contrary, in the case of a high speed shutter, since an object to be photographed is usually bright, there is a large amount of light that is incident upon the light receiving portion. In addition, the time for accumulating the unnecessary electrical charges increases as the shutter speed increases, and accordingly, the quantity of unnecessary electrical charges to be accumulated increases. Therefore, there is a difficulty in completely sweeping the unnecessary electrical charges when the shutter speed is high. As a result, the unnecessary electrical charges which are not swept are added as a noise to the signal charges at high shutter speed, resulting in damage to a picture.

For instance, in a CCD image pick-up device in which the periodical transfer pulses are outputted at an interval of 1/60 second, when the shutter speed is 1/125 second, the unnecessary electrical charges are accumulated in the light receiving portion for only about 1/125 (1/60–1/125) second. Accordingly, the unnecessary electrical charges transferred to the vertical transfer portion can be fully swept, resulting in the formation of a noiseless picture having a uniform brightness.

However, in the case of a high shutter speed, such as 1/2000 second, unnecessary electrical charges are accumulated in the light receiving portion for about 1/60 (1/60–1/2000) second. In addition, generally speaking, since the brightness of the object is high at the high shutter speed, the amount of unnecessary electrical charges accumulated in the light receiving portion increases by several times that of the 1/125 second shutter speed mentioned above. Therefore, the unnecessary electrical charges can not be completely swept, so that the unnecessary electrical charges which can not be swept remain in the vertical transfer portion. Consequently, the residual unnecessary electrical charges are added to the signal charges, so that a lower portion of the picture becomes brighter than the remaining portion thereof.

Furthermore, in a conventional electronic still camera, a CCD image pick-up unit (an inter-line transfer type of CCD image pick-up element and drive thereof) equivalent to that used in a video camera is used to reduce the manufacturing cost.

In a CCD image pick-up unit for a video camera, the signal charges which are accumulated in the light receiving portion are periodically (about every 1/60 second) transferred to the vertical transfer portion at one time at a normal photographing mode (movie mode), so that the signal charges are successively read prior to a periodical transfer of subsequent signal charges. The transfer of the signal charges to the vertical transfer portion is effected in accordance with periodical transfer pulses which are outputted by a pulse signal output device, and the reading of the signal charges is effected in accordance with read pulses having vertical and horizontal transfer pulses which are outputted by the pulse signal output device. Namely, in the movie mode, all the operations are controlled by the pulses periodically outputted by the pulse signal output device.

On the other hand, in the operation of the electronical shutter (a still mode), unnecessary electrical charges which are accumulated in the light receiving portion are first transferred to the vertical transfer portion in accordance with a first compulsive transfer pulse which is outputted by a control device before the first periodical transfer pulse immediately after the output of the read signal is outputted, and the unnecessary electrical charges are swept in accordance with a sweep pulse signal which is outputted by the pulse signal output device.

After that, the read pulse which is outputted by the pulse signal output device is stopped, so that the unnecessary electrical charges accumulated in the light receiving portion are transferred to the vertical transfer portion in accordance with a second compulsive transfer pulse which is outputted by the control device at a predetermined time to commence the exposure. The unnecessary electrical charges which are transferred to the vertical transfer portion by the second compulsive transfer pulse are swept within a short space of time in accordance with the sweep pulse signal which is outputted by the pulse signal output device before the expiration of the exposure time.

Upon completion of exposure, the periodical transfer pulses are outputted from the pulse signal output device, so that the electrical charges accumulated in the light receiving portion during exposure are transferred to the vertical transfer portion. After that, the signal charges are read by the periodical read signals which are outputted by the pulse signal output device.

The operation of the conventional image pick-up device mentioned above will be explained below with reference to FIGS. 21 and 30. FIGS. 21 and 30 are timing charts of a still mode and a movie mode, respectively. In the illustrated examples, periodical transfer pulses CTG and read signals are periodically outputted at a predetermined interval (about 1/60 second). The output duration of the periodical transfer pulses CTG will be referred to as a field hereinafter.

In the still mode, a first compulsive transfer pulse PTG1 and a sweep signal are outputted after the read signal is outputted and before the periodical transfer pulse CTG is outputted, so that the unnecessary electrical charges accumulated in the light receiving portion are transferred to the vertical transfer portion and are swept. Namely, the sweeping of the unnecessary electrical charges is effected in field n immediately before the field n+1 in which exposure time for accumulating the signal charges for recording the picture is included.

After that, at a predetermined time, a second compulsive transfer pulse PTG2 is outputted, so that the unnecessary electrical charges accumulated in the light receiving portion are transferred to the vertical transfer portion to commence the exposure.

Upon the completion of exposure, the periodical transfer pulse CTG is outputted, so that the signal charges accumulated within the exposure time (shutter speed) IV are transferred to the vertical transfer portion to finish the exposure.

The unnecessary electrical charges transferred to the vertical transfer portion by the second compulsive transfer pulse PTG2 are swept within a short space of time in accordance with the sweep signal immediately before the periodical transfer pulse CTG is outputted.

The signal charges which have been accumulated in the light receiving portion within the exposure time TV and which are transferred to the vertical transfer portion in accordance with the periodical transfer pulse CTG are read by the periodical read signal to be recorded as picture signals (see Ⓒ in FIG. 21).

Upon recording in the movie mode, as shown in FIG. 35, the unnecessary electrical charges which are accumulated in the light receiving portion in field n immediately before the exposure field n+1 are transferred to the vertical transfer portion by the periodical transfer pulse CTG1 at the commencement of the exposure in the exposure field n+1, so that the exposure can be commenced.

The unnecessary electrical charges which are transferred to the vertical transfer portion by the periodical transfer pulse CTG1 are read by the read signal before the periodical transfer pulse CTG2 at the completion of exposure is outputted and are discharged.

When the periodical transfer pulse CTG2 is outputted at the completion of exposure, the signal charges which are accumulated in the exposure field n+1, i.e., within the exposure time TV ($\approx$ 1/60 second), are transferred to the vertical transfer portion to finish the exposure. The signal charges transferred to the vertical transfer portion are read by the periodical read signal to be recorded as a picture signal (see ⓓ in FIG. 30).

As can be seen from the foregoing, in the movie mode, only the periodical read signals outputted between the periodical transfer pulse CTG1 at the commencement of the exposure and the periodical accumulation signal CTG0 outputted immediately before the periodical transfer pulse CTG1.

On the other hand, in the still mode, the first compulsive transfer pulse PTG1 and the sweep signal are outputted in field n immediately before field n+1 which includes the second compulsive transfer pulse PTG2 at the commencement of the exposure after the periodical read signal is outputted.

It can be understood from the above description that in the conventional CCD image pick-up unit, there is a difference in processing of the unnecessary electrical charges which are accumulated in the field immediately before the exposure between the movie mode and the still mode. Accordingly, the image quality of the picture recorded in the movie mode is different from the picture recorded in the still mode, even in the same exposure time.

This is the reason that there is a difference in image quality of the recorded pictures even with the same exposure value in a camera in which the picture can be taken at both the still mode and the movie mode.

Furthermore, in the case of a pure electronic shutter as mentioned above, the smear level in the movie mode in which the signal charges accumulated in the light receiving portion are periodically read is different from that in the still mode in which the electrical charges are accumulated only for the time corresponding to the shutter speed at the operation of the electronic shutter and then the signal charges accumulated in that time are read, resulting in a difference in image quality.

For instance, in the movie mode, the periodical transfer pulses are outputted every 1/60 second to transfer the signal charges from the light receiving portion to the vertical transfer portion, and the signal charges are then read by the read signal. Therefore, the signal charges which can not be read in the previous frame may remain in the vertical transfer portion.

However, when a picture is taken at a 1/60 second shutter speed in the still mode, the electrical charges transferred to the vertical transfer portion are swept immediately before the periodical transfer pulse is outputted after the compulsive transfer pulse is outputted. Accordingly, almost no unnecessary electrical charges remain in the vertical transfer portion.

Namely, there is a tendency that the smear level in the movie mode is higher than that in the still mode, within the same electrical charge accumulation time. Such a smear level difference is undesirable and accordingly should be eliminated. To this end, the circuit adjustment is usually effected, which is however, troublesome and difficult.

The assignee of the present application has developed a driving apparatus of a image pick-up device for operating the electronic shutter, using the CCD image pick-up unit for a conventional movie. An electronic still camera using the driving apparatus of the image pick-up device will be explained below with reference to FIG. 18.

In the CCD image pick-up unit for a video camera, normally, the signal charges accumulated in the light receiving portion are periodically (approximately every 1/60 second) transferred to the vertical transfer portion at one time. The signal charges are successively read before the subsequent signal charges are periodically transferred. The unnecessary electrical charges when no record is effected are swept out by the sweep pulses. The transfer of the signal charges to the vertical transfer portion is effected by the transfer pulse, and the reading of the signal charges is effected by the read pulse including the vertical and horizontal transfer pulses. Furthermore, the sweeping is effected by the sweep pulse. When the electronic shutter operation is effected, the signal charges are transferred by the compulsive transfer pulse which are optionally outputted.

The transfer pulse, the read pulse and the sweep pulse are made of a combination of a control signal and a drive pulse. The control signal consists of one pulse, and the transfer pulse consists of at least four pulses. The control pulse and the transfer pulse for transferring the electrical charges of the light receiving portion to the vertical transfer portion, the read pulse and the sweep pulse are made of a combination of one accumulation control pulse and four transfer pulses. Namely, four transfer pulses selectively become a transfer pulse, read pulse or sweep pulse in accordance with the level of the control pulse.

In the driving apparatus of the image pick-up device mentioned above, the control pulse and the transfer pulse for the operation of the electronic shutter are processed by a control device (i.e., microcomputer). Therefore, seven pulses; including one accumulation control pulse, at least four transfer pulses, one sweep demand pulse and one switching pulse are outputted from the microcomputer to operate the electronic shutter. Namely, seven output ports are used in the microcomputer.

However, the usage of the seven output ports of the microcomputer (MPU, CPU etc.) decreases the number of output ports which can be used for other control purposes. In addition, a software for producing the transfer pulses is also necessary.

Furthermore, if a conventional CCD image pick-up unit is used to realize an electronic shutter, a smear would appear on a picture. For instance, in the CCD image pick-up device 11 shown in FIGS. 2A and 2B, if relatively high intensity of light is incident upon a certain photoelectric element (photodiode) 11a and a vertical transfer portion (vertical transfer CCD) 11b adjacent thereto, in comparison with light incident upon the other photoelectric elements 11a and vertical transfer portion's 11b, that is, if an object of high luminance is imaged on a certain photoelectric element 11a and a vertical transfer portions 11b adjacent thereto, unnecessary electric charges which overflow from the adjacent photodiodes 11a or which are caused by light passing through the edge portions of the shield member 73 or transmitted through the shield member 73 are accumulated on that vertical transfer portions 11b. The signal charges which are transferred to the vertical transfer portions 11b are mixed with the unnecessary (harmful) electric charges, so that a bright vertical line appears on an image below the photodiode 11a (FIGS. 33A and 34A). This is a smear.

To prevent the occurrence of such a smear, it is known to control the exposure time TV by the opening and closing operation of a shutter. However, the provision of the shutter increases the number of components, thus resulting in a heavy and large camera. In addition, the shutter makes the control circuit of the camera more complicated.

The assignee of the present application has proposed Japanese Patent Application Serial No. 63-317904 which discloses means for preventing the occurrence of smear, in which the signal charges are read after the diaphragm is closed. In particular, in case of continuous photographing, the diaphragm and the shutter must be closed at very high speed. However, the repeated quick closing of the diaphragm results in an increased electrical power consumption.

SUMMARY OF THE INVENTION

The primary object of the present invention is to provide a driving apparatus for image pick-up device which can control the shutter speed only by the existing devices without providing any additional control device.

To achieve the object mentioned above, according to the present invention, there is provided an apparatus for driving an image pick-up device having a light receiving portion for accumulating signal charges of an image of an object to be photographed. The driving apparatus comprises a pulse signal output device which normally and periodically outputs periodical transfer pulses, for transferring signal charges accumulated in the light receiving portion to the vertical transfer portions of the image pick-up device and which outputs read pulses to the image pick-up device to successively read the signal charges transferred to the vertical transfer portions. The pulse signal output device also outputs high speed sweep pulses to the image pick-up device to sweep the signal charges transferred to the vertical transfer portions at high speed, when a sweep demand signal is inputted from outside. The driving apparatus also includes a control device for outputting compulsive transfer pulses to the image pick-up device at an optional time to transfer the signal charges accumulated in the light receiving portion to the vertical transfer portions and for outputting the sweep demand signal to the pulse signal output device after the compulsive transfer pulses are outputted.

With this arrangement, normally, the periodical transfer pulses and the read signal (vertical and horizontal transfer signals) are periodically outputted from the pulse signal output device to the image pick-up device.

When the control device operates the shutter, the compulsive transfer pulses are outputted from the control device to the image pick-up device at a reference time at the commencement of the shutter operation to transfer the unnecessary electrical charges to the vertical transfer portions. At the same time, the sweep demand signal is outputted to the pulse signal output device to output the sweep signal (high speed vertical inversion transfer signal) from the pulse signal output device to sweep the unnecessary electrical charges of the vertical transfer portions at high speed.

The signal charges which are accumulated in the light receiving portion after the compulsive transfer pulses are outputted from the control device are read by the periodical transfer pulses and the read signal is outputted from the pulse signal output device.

The compulsive transfer pulses are outputted at a proper timing corresponding to the brightness data of the object or at a timing that is predetermined by a photographer, from the control device.

With the operations mentioned above, a pure electronic shutter using only the image pick-up device can be realized.

The pulse signal output device and the control device are existing devices, and accordingly, no additional device is needed. Thus, an electronic shutter can be constructed only by modifying a control program, without increasing the cost of manufacturing.

Another object of the present invention is to provide a driving apparatus of an image pick-up device which can realize an electronic shutter in which a smear that is peculiar to an inter-line transfer type of CCD image pick-up element can be minimized.

To achieve the object, according to another aspect of the present invention, there is provided a driving apparatus of an image pick-up device, comprising a diaphragm adjusting device that has a diaphragm for adjusting the quantity of incident light from an object to be photographed and an image pick-up device for converting the incident light from the object to signal charges. The driving apparatus also includes a control device for controlling the time of accumulation of the electrical charges of the image pick-up device and for reading the signal charges which are accumulated within the time of accumulation of the electrical charges after the diaphragm is almost completely closed by the operation of the diaphragm adjusting device.

With the driving apparatus of the invention mentioned above, the signal charges which are accumulated in the image pick-up device in the time corresponding to the shutter speed are read after the diaphragm is almost completely closed by the diaphragm adjusting device, and accordingly, even when the object has a high brightness, the signal charges can be recorded without a smear phenomenon occurring. This results in a high quality picture, regardless of the brightness of the object.

Another object of the present invention is to provide a driving apparatus of an image pick-up device which can sweep unnecessary electrical charges even at a high speed shutter operation.

To achieve the object mentioned above, according to another aspect of the present invention, there is provided an apparatus for driving an image pick-up device, comprising an image pick-up device having a light receiving portion which converts an incident light from an object to be photographed into signal charges and accumulates the same and, a pulse signal output device which normally and periodically outputs a periodical transfer pulse for periodically transferring the signal charges accumulated in the light receiving portion to vertical transfer portions to the image pick-up device and which outputs read pulses to the image pick-up device to successively read the signal charges transferred to the vertical transfer portions. The pulse signal output device also outputs high speed sweep pulses to the image pick-up device to sweep the signal charges transferred to the vertical transfer portions at high speed, when a sweep demand signal is inputted from outside. The driving apparatus also includes a control device for outputting a first compulsive transfer pulse to the image pick-up device before the periodical transfer pulses are outputted from the pulse signal output device to transfer the signal charges accumulated in the light receiving portion to the vertical transfer portions and for outputting the sweep demand signal to the pulse signal output device. The control device outputs a second compulsive transfer pulse to the image pick-up device before the subsequent periodical transfer pulse is outputted, and then outputs the sweep demand signal to the pulse signal output device.

With this arrangement, the transfer pulses are periodically outputted to the image pick-up device to transfer the signal charges from the light receiving portion to the vertical transfer portions at a normal position in which it is not necessary to transfer the signal charges at high speed. The relatively slow drive pulses are given by the pulse signal output device, so that the signal charges from the vertical transfer portions are read at a normal speed.

On the other hand, when the control device commences the shutter operation, the control device outputs the first compulsive transfer pulse and the high speed transfer demand signal to the image pick-up device and the pulse signal output device, respectively, prior to the shutter operation, so that the unnecessary electrical charges previously accumulated can be swept from the image pick-up device.

Upon the shutter operation, the control device outputs the second compulsive transfer pulse and the high speed transfer demand signal to the image pick-up device and the pulse signal output device, respectively, so that the unnecessary electrical charges can be transferred from the vertical transfer portions at high speed.

Accordingly, since the unnecessary electrical charges to be swept at the operation of the shutter are those accumulated after the first compulsive transfer pulse is outputted and before the second compulsive transfer pulse is outputted, the quantity of the unnecessary electrical charges to be swept is less than half that in the conventional apparatus. As a result, the unnecessary electrical charges can be certainly swept, regardless of the shutter speed.

Note that the second compulsive transfer pulse for commencing the shutter operation is properly outputted by the control device, in accordance with the brightness of the object to be photographed or at a predetermined optimum timing.

Another object of the present invention is to provide a driving apparatus of an image pick-up device in which the accumulation time of the electrical charges can be controlled and the adjustment for making the smear level in the still mode identical to the smear level in the movie mode can be easily effected.

To achieve the object, according to still another aspect of the present invention, there is provided an apparatus for driving an image pick-up device, comprising an image pick-up device having a light receiving portion which converts an incident light from an object to be photographed into signal charges and accumulates the same, and vertical transfer portions which temporarily hold the signal charges accumulated in the light receiving portion, and a pulse signal output device which normally and periodically outputs a periodical transfer pulse for transferring the signal charges accumulated in the light receiving portion of the vertical transfer portions of the image pick-up device and which outputs read pulses to the image pick-up device to successively read the signal charges transferred to the vertical transfer portions. The pulse signal output device also outputs sweep pulses to the image pick-up device at a predetermined time for a predetermined period of time to sweep the signal charges transferred to the vertical transfer portions within a short space of time, when a sweep demand signal is inputted from outside. The driving apparatus also includes a control device for outputting compulsive transfer pulses to the image pick-up device to transfer the signal charges accumulated in the light receiving portion to the vertical transfer portions at an optional time and for outputting the sweep demand signal to the pulse signal output device, and a sweep demand signal output device for outputting the sweep demand signal to the pulse signal output device.

With this arrangement, in the normal mode (movie mode), the periodical transfer pulses and the read signal are periodically outputted to the image pick-up device from the pulse signal output device, so that the signal charges from the vertical transfer portions can be read at a normal speed.

On the other hand, in the electronic shutter operation mode (still mode), the compulsive transfer pulses and the sweep demand signal are outputted from the control device to the image pick-up device and the pulse signal output device, respectively, so that the unnecessary electrical charges of the light receiving portion are transferred to the vertical transfer portions to be swept within a short space of time. This realizes an electronic shutter solely using the image pick-up device.

When the sweep demand signal outputting device operates in the movie mode, the sweep signals are outputted from the pulse signal output device for every field so that the unnecessary electrical charges remaining in the vertical transfer portions can be discharged.

Thus, the smear level in the movie mode is made identical to that in the still mode, resulting in the formation of clear pictures having a uniform quality.

Another object of the present invention is to provide a driving apparatus of an image pick-up device in which the accumulation time can be controlled and an adjustment for taking pictures having a uniform quality in the still mode and the movie mode can be easily effected.

To achieve this object, according to an aspect of the present invention, there is provided an apparatus for driving an image pick-up device, comprising, an image pick-up device having a light receiving portion which converts an incident light from an object to be photographed into signal charges and accumulates the same, and vertical transfer portions which temporarily hold the signal charges accumulated in the light receiving portion, and a pulse signal output device which normally and periodically outputs a periodical transfer pulse for transferring the signal charges accumulated in the light receiving portion of the vertical transfer portions of the image pick-up device and which outputs read pulses to the image pick-up device to successively read the signal charges transferred to the vertical transfer portions. The pulse signal output device also outputs sweep pulses to the image pick-up device at a predetermined time for a predetermined period of time to sweep the signal charges transferred to the vertical transfer portions within a short space of time, when a sweep demand signal is inputted from outside. The driving apparatus also includes a control device for outputting compulsive transfer pulses to the image pick-up device to transfer the signal charges accumulated in the light receiving portion to the vertical transfer portions at an optional time and for outputting the sweep demand signal together with the compulsive transfer pulses or solely to the pulse signal output device. The control device outputting the sweep demand signal to sweep the unnecessary charges at a normal recording time.

With this arrangement, upon recording in the movie mode, the compulsive transfer pulses and the sweep signal are outputted after the periodical reading operation is finished and before the periodical transfer pulses are outputted at the commencement of exposure, so that the electrical charges of the light receiving portion and the vertical transfer portions can be completely discharged. Furthermore, the exposure takes place immediately after the sweeping operation is completed. Consequently, the quantity of the unnecessary electrical charges which cause the noise can be reduced, resulting in no difference in quality between the still mode and the movie mode.

Another object of the present invention is to provide a driving apparatus of an image pick-up device in which the number of output terminals of a control unit can be decreased and a control software can be simplified.

To achieve the object mentioned above, according to an aspect of the present invention, there is provided an apparatus for driving an image pick-up device, comprising an image pick-up device having a light receiving portion which converts an incident light from an object to be photographed into signal charges and accumulates the same, and vertical transfer portions which temporarily hold the signal charges accumulated in the light receiving portion, and a pulse signal output device which normally and periodically outputs a periodical transfer pulse for transferring the signal charges accumulated in the light receiving portion to the vertical transfer portions of the image pick-up device and which outputs read pulses to the image pick-up device to successively read the signal charges transferred to the vertical transfer portions. The pulse signal output device outputs the transfer pulses when a transfer demand signal is inputted from outside, and device also outputs sweep pulses at a predetermined time to sweep the signal charges transferred to the vertical transfer portions within a short space of time when a sweep demand signal is inputted from outside. The driving control apparatus includes device for outputting the transfer demand signal and the sweep demand signal at a predetermined time to the pulse signal output device.

With this arrangement, since no transfer pulse is outputted from the control device, no signal lines are therefor necessary. Furthermore, since it is not necessary to produce the transfer pulses, the software for the control unit can be simplified.

According to another aspect of the present invention, there is provided a method for driving an image pick-up device having a light receiving portion for accumulating signal charges of an image of an object to be photographed, comprising periodically outputting transfer pulses to the image pick-up device to normally transfer the signal charges accumulated in the light receiving portion to the vertical transfer portions, outputting read pulses to the image pick-up device to successively read the signal charges transferred to the vertical transfer portions after the periodical transfer pulses are outputted, outputting high speed sweep pulses to the image pick-up device to sweep the signal charges transferred to the vertical transfer portions at high speed when a sweep demand signal is inputted from outside, outputting compulsive transfer pulses to the image pick-up device at an optional time to transfer the signal charges accumulated in the light receiving portion to the vertical transfer portions, and outputting the sweep demand signal to the pulse signal output device after the compulsive transfer pulses are outputted.

Another object of the present invention is to provide a simple still video camera with a reduced electrical power consumption, in which no smear occurs.

In view of an infrequent occurrence of the smear, according to the present invention, only when the smear is detected, the speed of the closure of the diaphragm is increased.

Namely, according to the present invention, there is provided a still video camera having an image pick-up device which is provided on its light receiving surface with rows of a large number of photoelectric elements and vertical transfer portions (CCDs) which are located close to the rows of the photoelectric elements, a photographing lens for forming a focused image of an object to be taken on the light receiving surface of the image pick-up device, a release device for performing the release operation, and a diaphragm device having a diaphragm for adjusting the quantity of light incident upon the light receiving surface of the image pick-up device. The diaphragm normally fully closed, so that the diaphragm device opens the diaphragm to a predetermined diaphragm value after the commencement of the release operation and fully closes the diaphragm after the completion of the exposure. The improvement comprises a smear detecting device for reading the electric charges accumulated in the vertical transfer portions when the diaphragm is opened to a predetermined diaphragm value after the commencement of the release operation and for adding the electric charges for every vertical transfer portion to compare the level of the added electrical charges with a predetermined level, and a control device for changing the stop-down speed of the diaphragm depending on the level of the added electrical charges.

With this arrangement, since the possibility of the occurrence of smear is detected immediately before the exposure, the necessary operations to prevent the smear can be performed accordingly.

For instance, if there is a possibility of the occurrence of smear, the signal charges are read after the diaphragm is closed at higher speed upon the completion of the exposure, and accordingly, no smear takes place. Conversely, if there is no possibility of the occurrence of smear, the diaphragm is closed at a normal speed and the signal charges are read upon the completion of the exposure, thus resulting in a decreased battery power consumption.

BRIEF DESCRIPTION OF THE DRAWINGS The invention will be described below in detail with reference to the accompanying drawings, in which:

FIG. 15 is a block diagram of a driving apparatus of an image pick-up device according to still another embodiment of the present invention;

FIG. 16 is a diagram of a circuit of a sweep switch and the vicinity thereof;

FIGS. 33A, 33B and 34A, 34B are schematic views for showing the principle of the detection of a smear, according to the present invention; and, FIG. 35 is a timing chart of a known image pick-up device.

DESCRIPTION OF PREFERRED EMBODIMENTS

The preferred embodiments of the present invention will be described below in detail.

Figure 1:
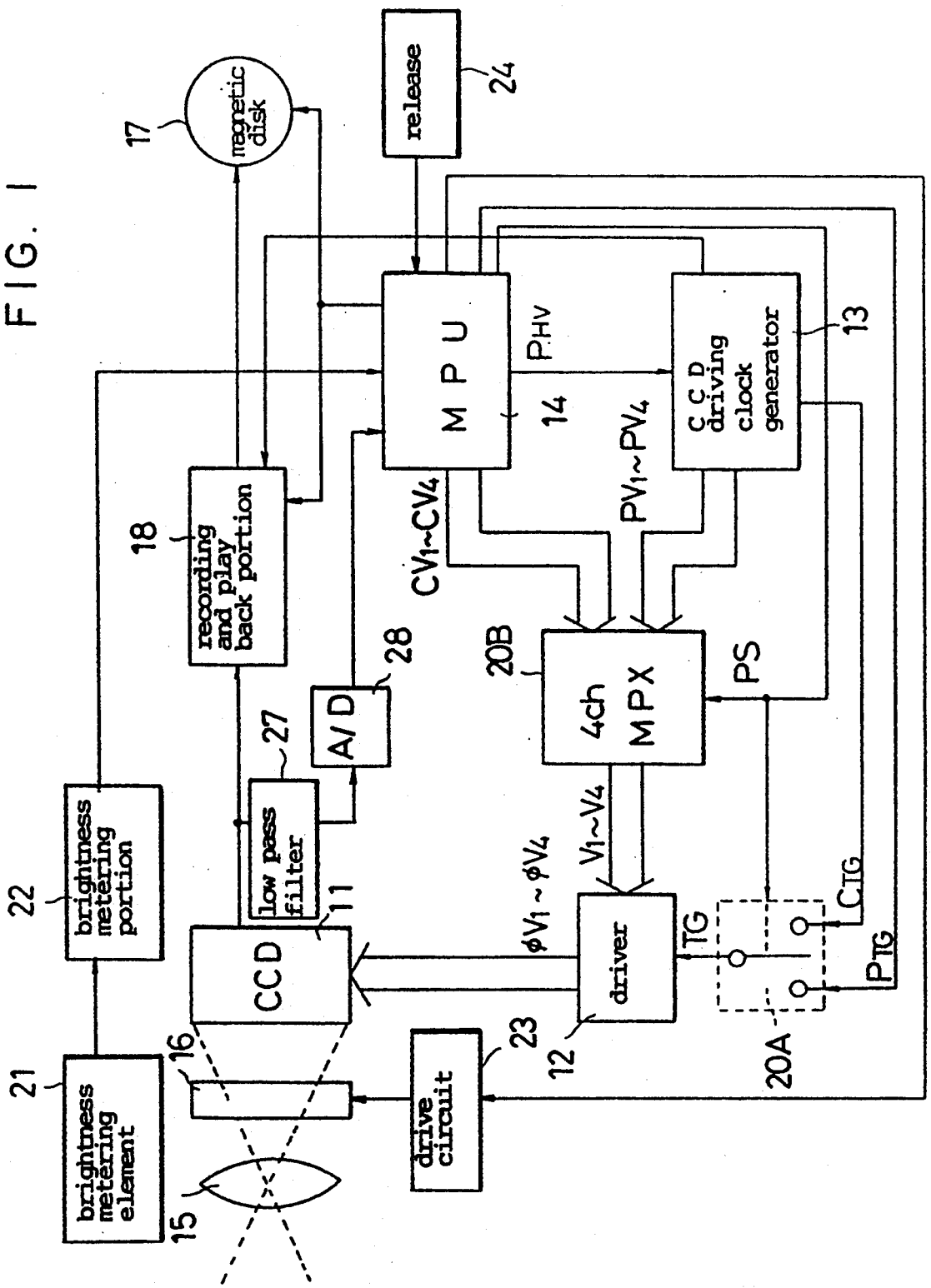
FIG. 1 is a block diagram of a driving apparatus of an image pick-up device, according to the present invention.

FIG. 1 shows a general construction of a driving apparatus of an image pick-up device, according to an embodiment of the present invention.

As can be seen in the drawing of FIG. 1, CCD image pick-up device 11, which serves as an image pick-up device, is connected to a driver 12 which drives the same. A CCD driving clock generator 13 is connected to driver 12, which serves as a pulse signal output device. In addition, a microprocessing unit (MPU) 14, and switching circuits 20A and 20B, respectively are connected to the driver 12. The MPU 14 and the switching circuits 20A and 20B constitute a control device.

The clock generator 13 outputs a periodical accumulation control signal (transfer demand pulse) which constitutes a part of a transfer pulse for periodically transferring the electrical charges accumulated in the light receiving elements (photodiodes) 11a (FIGS. 2A and 2B) to the vertical transfer CCD's (vertical transfer portion) 11b at one time at a predetermined interval (cycle) which is about 1/60 second in the illustrated embodiment, to the switch circuit 20A through line CTG. Also, relatively low speed driving pulses (read pulses) and high speed driving pulses (sweep pulses) are outputted from the clock generator 13 to the switch circuit 20B through lines CV1~CV4.

The clock generator 13 also outputs horizontal and vertical transfer pulses, as read pulses for reading the signal charges transferred to the vertical transfer CCD's 11b. The construction of the horizontal transfer pulses will not be explained here only for clarification.

The driving pulses of the lines CV1~CV4 selectively become transfer pulses or read pulses (or sweep pulses) in accordance with the level of the accumulation control signal of the line CTG, as will be explained hereinafter.

MPU 14 generally controls the whole operation of the driving apparatus. A switching signal is outputted from the MPU 14 through line PS to the switching circuits 20A and 20B. The connection of the switching circuit 20A and 20B is determined by the switching signal which can be "H" (high level) or "L" (low level). Namely, the switching signal determines whether the driver 12 is connected to the MPU 14 or the clock generator 13. In the illustrated embodiment, when the switching signal is "H", the clock generator 13 is connected to the driver 12, and when the switching signal is "L", the MPU 14 is connected to the driver 12.

The MPU 14 also outputs the compulsive accumulation control signal and the drive pulses to compulsively transfer the signal charges accumulated in so the photodiodes of the light receiving portions of the CCD image pick-up device 11 of the vertical transfer portions (CCDs) 11b at an optional time at one time. The compulsive accumulation control signal is outputted to the switching circuit 20A through line PTG, and the driving pulses are outputted to the switching circuit 20B through lines PV1~PV4.

The MPU 14 outputs the sweep demand signal to the clock generator 13 through line PHV. When the sweep demand signal is outputted, the clock generator 13 outputs the high speed driving pulses (sweep pulses, high speed inversion transfer pulses) for sweeping the unnecessary electrical charges at high speed to the switch circuit 20B through lines CV1~CV4.

The accumulation control signal of line CTG or line PTG which is outputted by the MPU 14 or the clock generator 13 is selectively outputted from the switching circuit 20A to driver 12 through line TG.

The driving pulses of lines CV1~CV4 or lines PV1~PV4 are selectively outputted to the driver 12 from the switch circuit 20B through lines V1~V4.

The transfer pulses, the read pulses or sweep pulses are selectively outputted to the CCD image pick-up device 11 from driver 12 in accordance with the level of the accumulation control signal through lines ΦV1~ΦV4.

As mentioned before, the selection of the accumulation control signal which is outputted from the clock generator 13 or the MPU 14 is determined by the switching signal outputted from the MPU 14 through line PS.

The driving pulses outputted from driver 12 into lines ΦV1~ΦV4 selectively become the transfer pulses for transferring the electrical charges of the photodiodes to the vertical transfer portions 11b, the read pulses for reading the electrical charges on the vertical transfer portions 11b or sweep pulses for sweeping the electrical charges on the vertical transfer CCD's 11b, in accordance with the level of the accumulation control signal of line TG. Namely, when the driving pulses are outputted together with the accumulation control signal, the driving pulses become the transferring pulses. Otherwise, the driving pulses become the read pulses or sweep pulses. The electrical charges transferred to the vertical transfer portions 11b are swept into a sweeping drain lid which is located opposite to a horizontal transfer portion (CCD) 11c.

The following discussion will be directed to an optical system for the recording operation.

An image of an object which is incident through photographing lens 15 and which is transmitted through diaphragm 16 is formed on the photodiodes which constitute a light receiving element of the CCD image pick-up device 11, so that the object image is recorded in the form of signal charges. To the horizontal transfer portion 11c of the CCD image pick-up device 11 is connected a recording and play-back portion 18 which records an FM-modulated or modulated signal of image data based on the signal charges outputted by the CCD image pick-up device onto a magnetic disk 17 and which reads back the modulated signal recorded on the magnetic disk 17 to play the same back. The operations of the magnetic disk 17 and the recording and play-back portion 18 are controlled by the MPU To the MPU 14 is connected a brightness metering portion 22 which logarithmically compresses the brightness signal which is generated by a brightness metering element 21 which detects the brightness of the object to effect an A/D conversion to output digital brightness data. The MPU 14 calculates an optimum diaphragm value and an optimum shutter speed (electrical charge accumulation time) in accordance with the brightness data.

To the MPU 14 are connected a diaphragm driving circuit 23 which drives diaphragm 16 and a release button 24 which issues a release ON signal when actuated to cause MPU 14 to control the diaphragm 16 through the diaphragm driving circuit 23 and to drive the CCD image pick-up device in accordance with the result of the calculation mentioned above.

A more detailed embodiment of switching circuit 20b is shown in FIG. 1 of U.S. patent Ser. No. 07/452,283, filed Dec. 15, 1989, now abandoned which is expressly incorporated by reference herein.

The following description will be directed to a more detailed construction of the driver 12.

Figure 3:
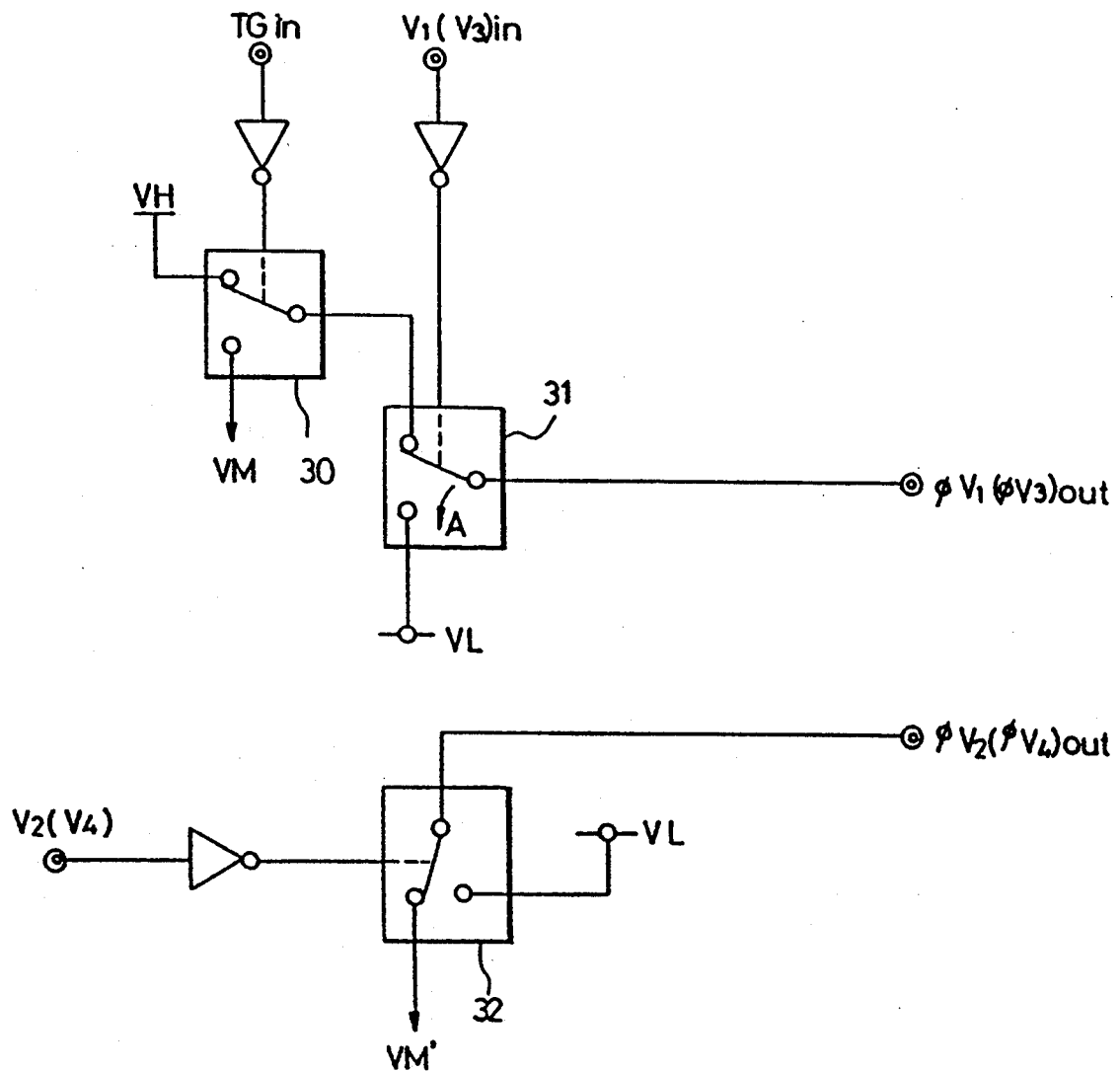
FIG. 3 is a circuit diagram of an example of an inversion type of driver used in the present invention.

FIG. 3 shows an example of a circuit of an inversion type of driver 12, in which a plurality sets of pulse signals which are made of a combination of the accumulation control signal of line TG and the driving pulses of lines CV1~CV4 are outputted to terminals (ports or electrodes) ΦV1~ΦV4 for driving the CCD image pick-up device 11.

Switching element 30 is connected to the line VH when the level of the accumulation control signal of line (terminal) TG is "L", and is connected to line VM when the level of the accumulation control signal of line TG is "H". Switching element 31 is connected to switch 30 when the level of the driving pulses of line (terminal) V1 is "L" and is connected to line (terminal) VL when the level is "H", respectively.

Switching element 32 is connected to line (terminal) VM' and line (terminal) VL when the level of the driving pulses of line (terminal) V2 is "L" and "H", respectively.

The pulse levels of VH, VM (VM') and VL are as follows:

$$VH > VM > VL$$

The circuits for V3 and V4 are similar to those of V1 and V2 mentioned above, respectively.

Figure 4:
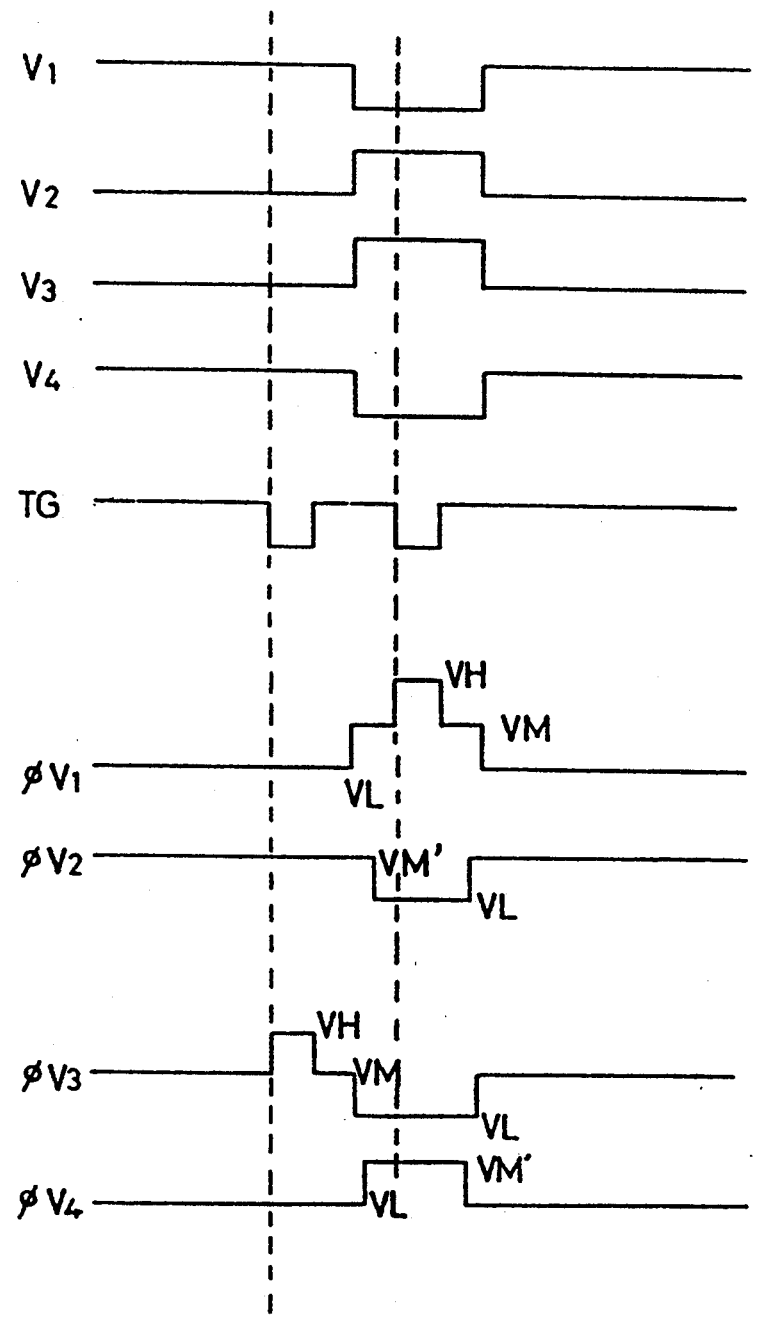
FIG. 4 is a timing chart of the inversion type of driver shown in FIG. 3.

FIG. 4 shows an example of a timing chart of the driver 12. When no accumulation control pulse on line of the TG is inputted, the connection of the switching element 30 is switched to the VM, and accordingly inverted driving pulses of the V1 are outputted from ΦV1.

Similarly, inverted driving pulses of the V2, V3 and V4 are outputted from lines (terminals) ΦV2, ΦV3 and ΦV4, respectively.

The levels "H" and "L" of lines (terminals) V1~V4 correspond to the levels VM and VM' of the ΦV1~ΦV4 and level VL, respectively.

When the accumulation control signal on line TG is inputted to the switching element 30, the connection of the switching element 30 is switched to VH, and accordingly, when the level of the V1 and V3 is "L", the level of ΦV1 and ΦV3 becomes VH.

As can be understood from the foregoing, ΦV1 and ΦV3 become three-valued signals, and when the level of ΦV1 and ΦV3 is the highest value VH, ΦV1 and ΦV3 are transfer signals, so that the electrical charges accumulated in the photodiodes are transferred to the vertical transfer portions (CCDs) 11b. On the other hand when, the level of ΦV1~ΦV4 is VM, VM' or VL, they become the read pulses, so that the electrical charges transferred to the vertical transfer portions 11b are successively transferred thereon.

Figure 5:
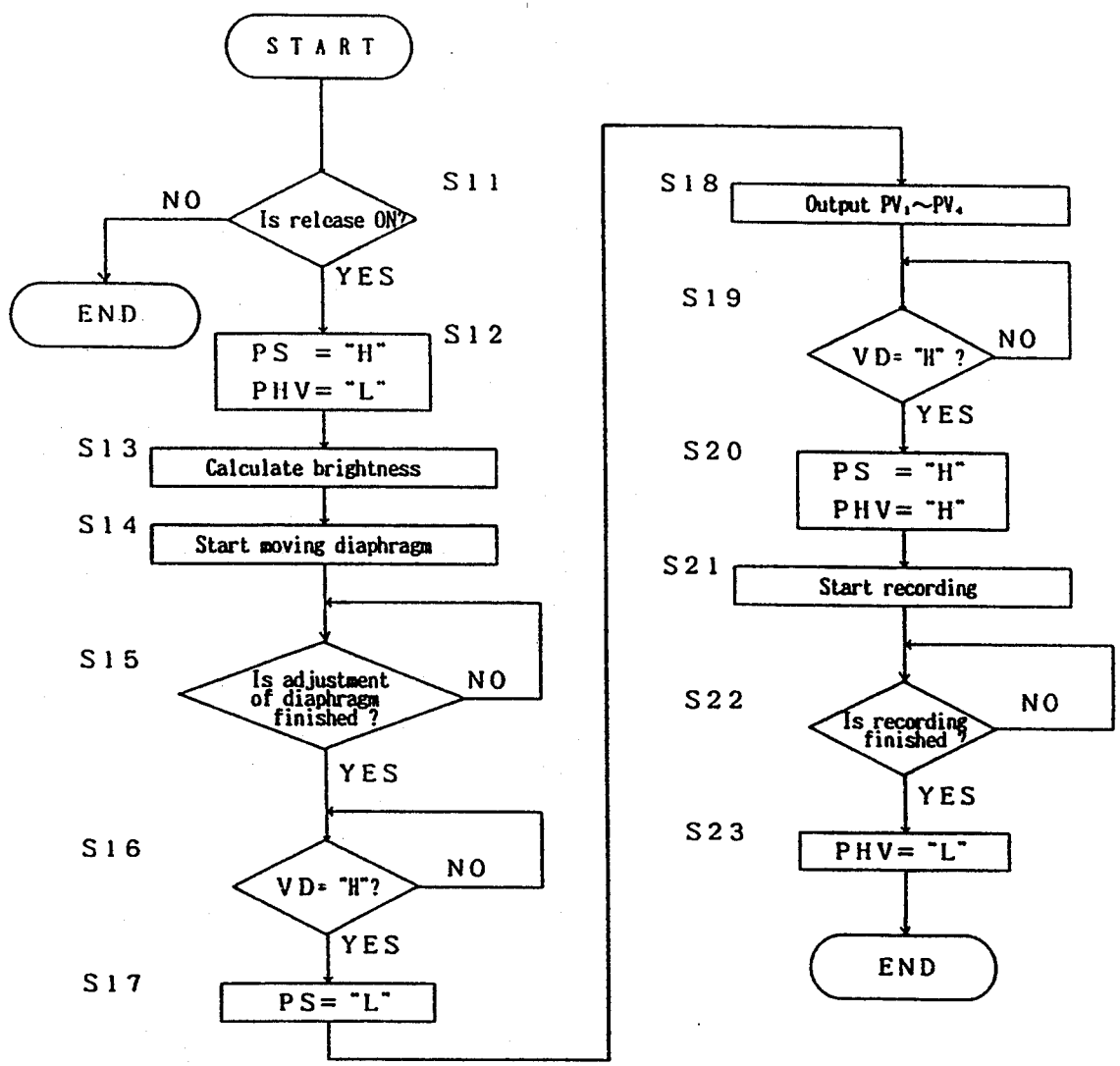
FIG. 5 is a flow chart of the operations of the driving apparatus shown in FIG. 1.

The image pick-up device control apparatus as constructed above operates as follows (see FIG. 5 and also FIGS. 1, 6 and 7). The process for operation are controlled by MPU 14 in accordance with a the program stored in ROM of MPU 14.

When the release button 24 is turned ON, the MPU 14 sets the switching signal of PS to be "H" and sets the sweep demand signal of PHV to be "L" (steps S11 and S12). As a result, driver 12 is connected to clock generator 13, which periodically outputs the periodical accumulation control signal to line CTG and the drive pulses to line CV1~CV4, at an interval of 1/60 second, respectively, as shown in FIG. 6. Namely, the image signal of the object is read from the CCD image pick-up device 11 to be outputted to the record and play-back portion 18, at a cycle of 1/60 second.

The MPU 14 calculates an optimum diaphragm value AV and an optimum shutter speed TV in accordance with the brightness data of the object detected by the brightness metering portion 22 at step S13. Based on a diaphragm value AV, diaphragm 16 is adjusted to have the optimum diaphragm value AV through the drive circuit 23 at steps S14 and 15.

Figure 6:
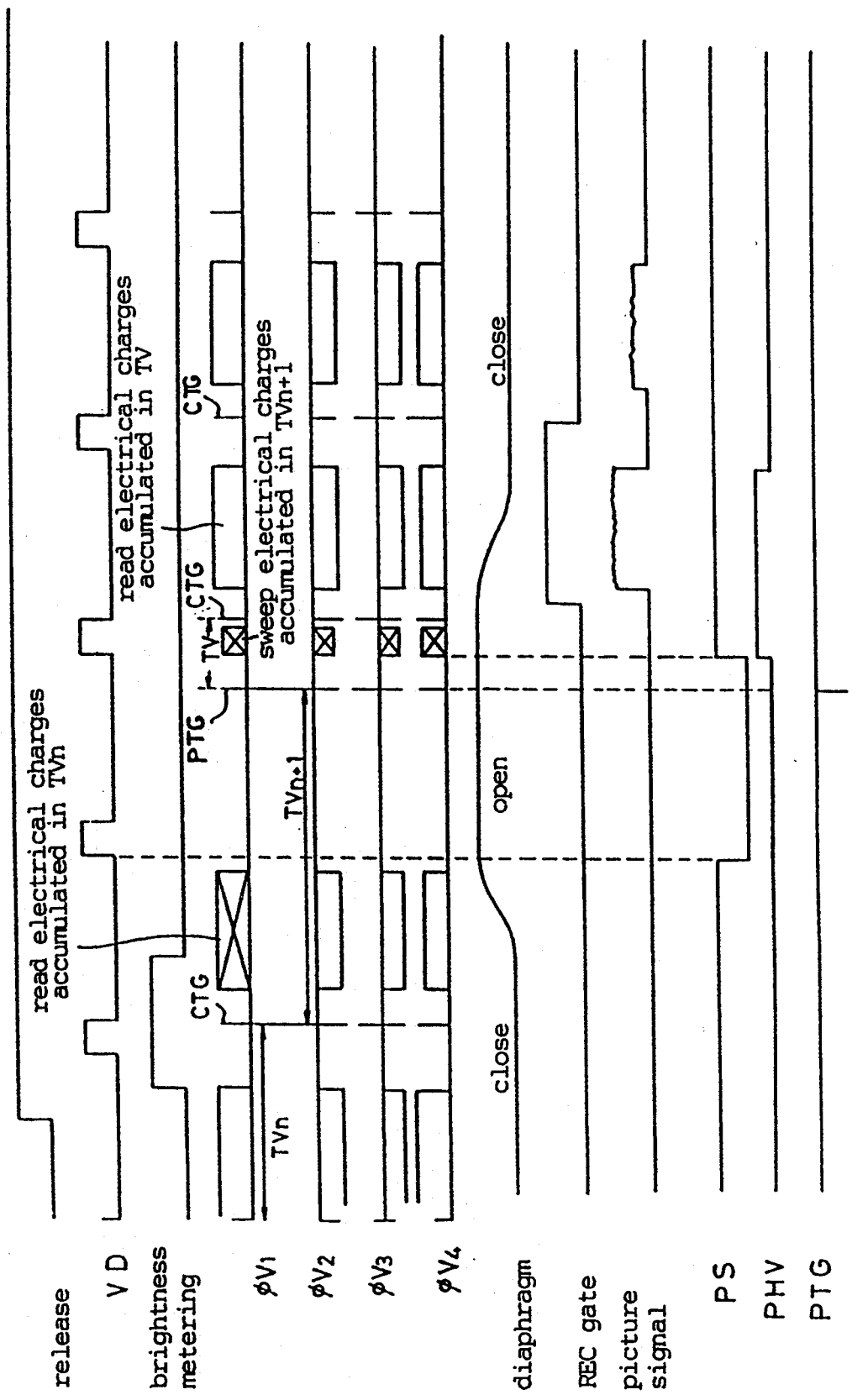
FIGS. 6 and 7 are timing charts of elements of the driving apparatus shown in FIG. 1.

When the adjustment of diaphragm 16 is finished, the MPU 14 sets the switching signal PS to be "L" after the VD pulse shown in FIG. 6, becomes "H" (steps S16 and S17). Consequently, the switch circuits 20A and 20B switch to connect MPU 14 to driver 12, so that the compulsive accumulation control signal and the drive signal can be outputted from the MPU 14. Namely, the transfer pulses are outputted from driver 12 to the CCD image pick-up device 11.

Figure 7:
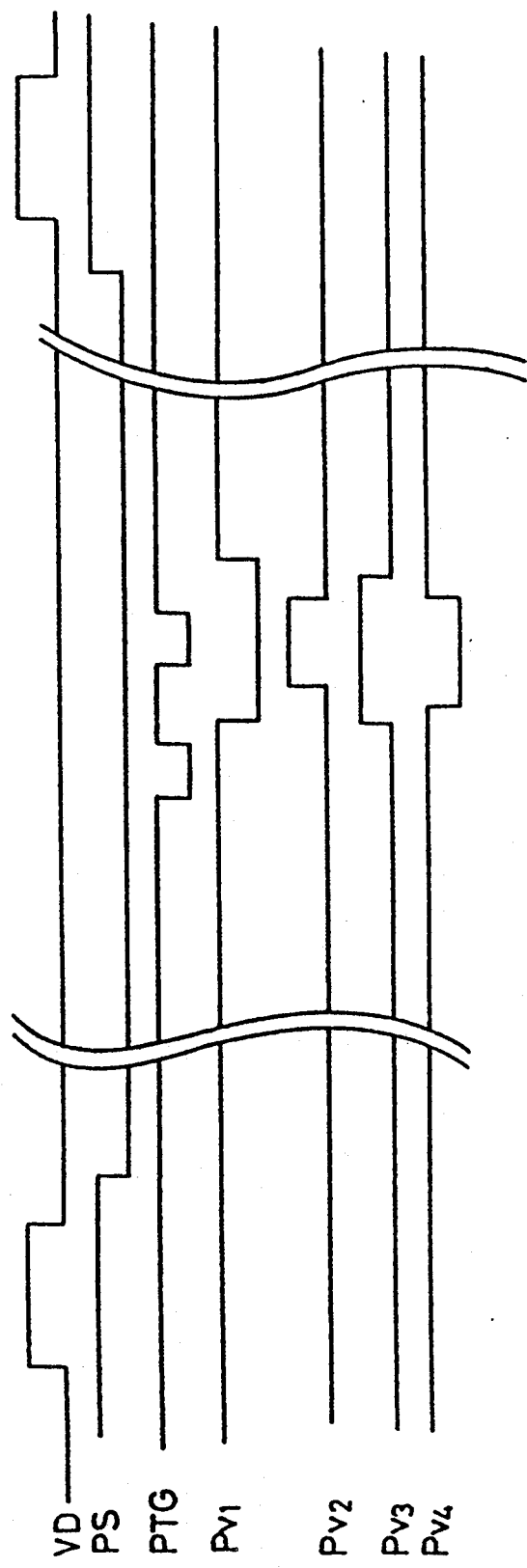

MPU 14 outputs the compulsive accumulation control signal and the drive pulses PTG and PV1~PV4, respectively when the optimum shutter speed TV calculated at step S13 is obtained, as shown in FIGS. 6 and 7. As a result, the unnecessary electrical charges accumulated in photodiodes 11a of the CCD image pick-up device 11 are transferred to the vertical transfer portions 11b at one time (step S18). The time at which the compulsive accumulation control signal is outputted can be obtained by calculating a shutter speed TV from the time at which the subsequent periodical accumulation control signal is outputted from the clock generator 13 when the shutter speed is higher than 1/60 second, by calculating the shutter speed from the time at which the several accumulation control pulses are outputted thereafter when the shutter speed is lower than 1/60 second, respectively.

MPU 14 sets the switching signal of the PS and the sweep demand signal (sweep demand pulses) to be "H" after the VD pulse becomes "H" (steps S19 and S20). As a result, the high speed drive pulses are outputted from clock generator 13 to CV1~CV4 for a predetermined period of time. The high speed sweep pulses are outputted from driver 12 to the CCD image pick-up device 11 through ΦV1~ΦV4. As a result, the unnecessary electrical charges which are transferred to the vertical transfer portions 11b of the CCD image pick-up device 11 are swept at a high speed, The outputting of the sweep pulses are finished before the subsequent periodical accumulation control signal is outputted from the clock generator 13.

When the subsequent periodical accumulation control signal and drive pulse are outputted from the clock generator 13, the signal charges accumulated at the time of the optimum shutter speed TV are transferred to the vertical transfer portions 11b. After that, MPU 14 opens REC gate of the record and play back portion 18 and then, the drive pulse is outputted from the clock generator 13, so that the drive pulse, as the read signal commences the recording of the signal charges (step S21). Namely, the signal charges which are successively outputted from the vertical transfer portions 11b are recorded onto the magnetic disc 17 as video signals through the record and play back portion 18 in accordance with the read pulses outputted from the clock generator 13.

When the recording of one picture plane is finished, the sweep demand signal of the PHV is set at "L" to be returned to the initial position (steps S22 and S23).

According to the illustrated embodiment, since the compulsive accumulation control signal for restricting the shutter time and the sweep demand signal for sweeping the unnecessary electrical charges are outputted from the existing MPU 14, and since the high speed sweep signal for sweeping the unnecessary electrical charges is outputted from the existing clock generator 13, a pure electronic shutter can be realized only by a modification of the existing system.

Although, in the above-mentioned embodiment, an inter-line transfer type of CCD image pick-up device having no memory area is used as an image pick-up device, the application of the present invention is not limited thereto. Namely, the present invention can be also applied to an image pick-up device having a memory area.

Although the above mentioned embodiment is directed to an automatic exposure control system in which the shutter speed varies in accordance with the brightness of the object, the invention can be applied to a manual exposure control system.

FIGS. 8 through 11 show another embodiment of a driving apparatus of an image pick-up device which can realize an electronic shutter in which a smear phenomenon peculiar to an inter-line transfer type of CCD image pick-up device does not substantially occur, according to the present invention. The construction of the modified embodiment is the same as that shown in FIGS. 1 and 3, and the relationship between the level of the accumulation control signal and the drive pulses is similar to that shown in FIG. 4.

Figure 8:
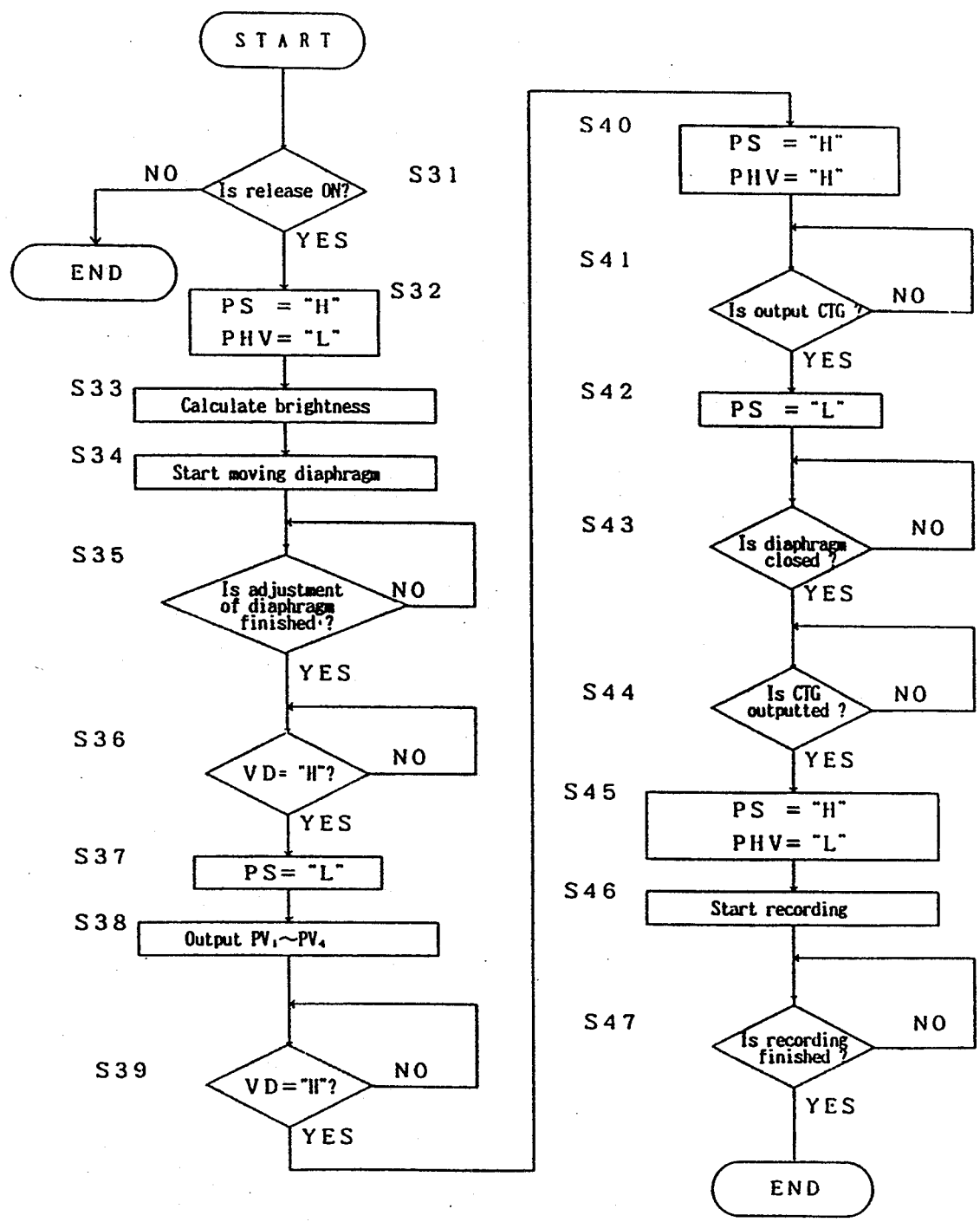
FIG. 8 is a flow chart of a driving apparatus according to another aspect of the present invention.

The driving apparatus of an image pick-up device according to the modified embodiment operates as follows (see FIG. 8 and also FIGS. 1 and 9).

When the release button 24 is turned ON, MPU 14 sets the switching signal PS to be "H" and sets the sweep demand signal PHV to be "L" (steps S31 and S32). As a result, driver 12 is connected to the clock generator 13, which periodically outputs the periodical accumulation control signal CTG and the drive pulses CV1~CV4, at an interval of 1/60 second, respectively, as shown in FIG. 9. Namely, the image signal (charge) of the object is read from the CCD image pick-up device 11 to be outputted to the record and play-back portion 18, at a cycle of 1/60 second.

MPU 14 calculates an optimum diaphragm value AV and an optimum shutter speed TV in accordance with the brightness data of the object detected by the brightness metering portion 22 at step S33. Based on the diaphragm value AV, diaphragm 16 is adjusted to have the optimum diaphragm value AV through the drive circuit 23 at steps S34 and S35.

Figure 9:
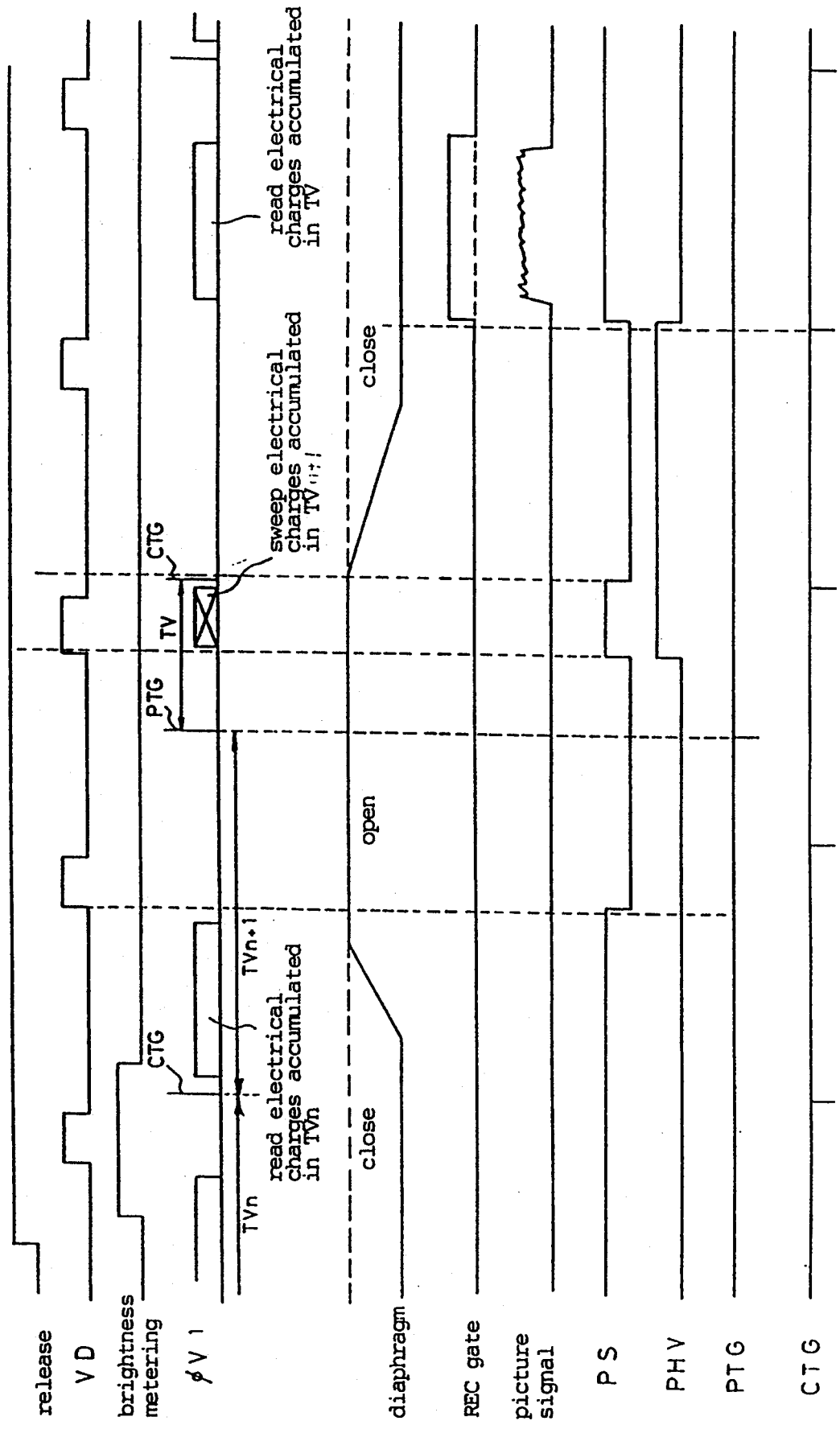
FIG. 9 is timing chart of components of a driving apparatus which operates in accordance with the flow chart shown in FIG. 8.

When the adjustment of the diaphragm 16 is finished, MPU 14 sets the switching signal PS to be "L" after the pulse VD shown in FIG. 9 becomes "H" (steps S36 and S37). Consequently, the switch circuits 20A and 20B switch to connect the MPU 14 to the driver 12, so that the compulsive accumulation control signal and the drive signal can be outputted from MPU 14. Namely, the compulsive transfer pulses can be outputted from the driver 12 to the CCD image pick-up device 11.

MPU 14 outputs the compulsive accumulation control signal and the drive pulses PTG and PV1~PV4, respectively, when the optimum shutter speed TV calculated at step S33 is obtained, as shown in FIG. 9 (step S38). As a result, the unnecessary electrical charges accumulated in the light receiving portion (photodiodes 11a) of the CCD image pick-up device 11 are transferred to the vertical transfer portions 11b at one time. The time at which the compulsive accumulation control signal is outputted can be obtained by calculating the shutter speed TV from the time at which the subsequent periodical accumulation control signal is outputted from the clock generator 13 when the shutter speed TV is higher than 1/60 second, and by calculating the shutter speed from the time at which the several accumulation control pulses are outputted thereafter when the shutter speed TV is slower than 1/60 second, respectively.

MPU 14 sets the switching signal PS and the sweep demand signal (sweep demand pulses) to be "H" after the VD pulse becomes "H" (steps S39 and S40). As a result, the clock generator 13 is connected to the driver 12, so that the high speed drive pulses are outputted from the clock generator 13 to CV1~CV4. The high speed sweep pulses (the high speed drive pulses) are outputted from driver 12 to the CCD image pick-up device 11 through ΦV1~ΦV2. As a result, the unnecessary electrical charges which are transferred to the vertical transfer portions 11b of the CCD image pick-up device 11 are swept at a high speed to the sweeping drain 11d. The sweep pulses which are outputted for a predetermined period of time are finished before the subsequent periodical accumulation control signal is outputted from the clock generator 13.

When the subsequent periodical accumulation control signal is outputted from the clock generator 13 to CTG, the signal charges accumulated at the time of the optimum shutter speed TV are transferred to the vertical transfer portions 11b. After the periodical accumulation control signal is outputted, and before the periodical drive pulse (read pulse) is outputted, MPU 14 turns the switching signal PS to "L" to break the connection between the driver 12 and the clock generator 13 (steps S41 and S42). Thus, the signal charges are maintained in the vertical transfer portions 11b.

MPU 14 maintains its position until diaphragm 16 is completely closed. Even if the periodical accumulation control signal is outputted from 14 to OFD driver 26 through the POFD, the sweep pulses (high level pulses) are outputted from the OFD driver 26 to OFD gate of the CCD image pick-up device 11. The CCD image pick-up device 11 discharges (sweeps) all the electrical charges accumulated in photodiodes 11a and the vertical transfer portions into the silicon board, when the sweep pulse is applied to gate OFD. Namely, the unnecessary electrical charges accumulated for the time TVn+1, in accordance with the sweep demand signal which is outputted from the MPU 14 to the POFD at the commencement of the exposure.

As can be understood from the above discussion, since no transfer of the signals on the vertical transfer portions, (i.e. the sweeping of the unnecessary electrical charges) is effected during the exposure of the CCD image pick-up device 11, no smear phenomenon occurs.

The above explanation is directed to an embodiment having the CCD image pick-up device for a video movie in which the accumulation control signals are periodically outputted to the drive unit. However, it is also possible to control the output of all signals including the accumulation control signals and the transfer signals etc.

Although, in the above-mentioned embodiment, an inter-line transfer type of CCD image pick-up device having no memory area is used as an image pick-up device, the application of the present invention is not limited thereto. Namely, the present invention can also be applied to a frame inter-line type of image pick-up device having memory area.

In the above-mentioned embodiment, diaphragm 16 is normally closed, but it is possible to provide a normally open type of diaphragm. In such an alternative, the diaphragm is once almost completely closed after the completion of exposure and before the completion of reading.

As can be understood from the foregoing, in the present invention, the exposure time (shutter speed) is controlled in accordance with the state (brightness etc.) of the object, and if the accumulated signal charges are to be read during the exposure, the reading is effected after the diaphragm is the clock generator 13 before diaphragm 16 is completely closed, the unnecessary electrical charges which are accumulated in the photodiodes 11a can not be transferred to the vertical transfer portions 11b, since the clock generator 13 is not connected to photodiodes 11a.

MPU 14 turns the switching signal PS and the sweep demand signal PHV to "H" and "L", respectively, after the periodical accumulation control signal is outputted to CTG (step S45). As a result, clock generator 13 is connected to driver 12, so that the clock generator 13 stops outputting the high speed drive pulses.

After that MPU 14 opens the REC gate of the record and play back portion 18 to commence the recording of the signal charge which is read by the read pulses outputted from the clock generator 13 (step S46). Namely, the signal charges which are successively outputted from the vertical transfer portions 11b in accordance with the drive pulses (vertical and horizontal transfer pulses, read pulses) which are outputted from the clock generator 13 are recorded on the magnetic disk 17 as video signals, through the record and play back portion 18.

When the recording is finished, control proceeds to the END process (step S47). In the END process, control returns to a switch check process (not shown) to check whether the release switch 24 is periodically turned ON.

According to the modified embodiment, since the recording of the signal charges is effected only when diaphragm 16 is completely closed, the unnecessary electrical charges due to bright objects can not be incorporated in the signal charges when the transfer to the vertical transfer portions 11b 25 is performed, thus resulting in no smear.

Figure 10:
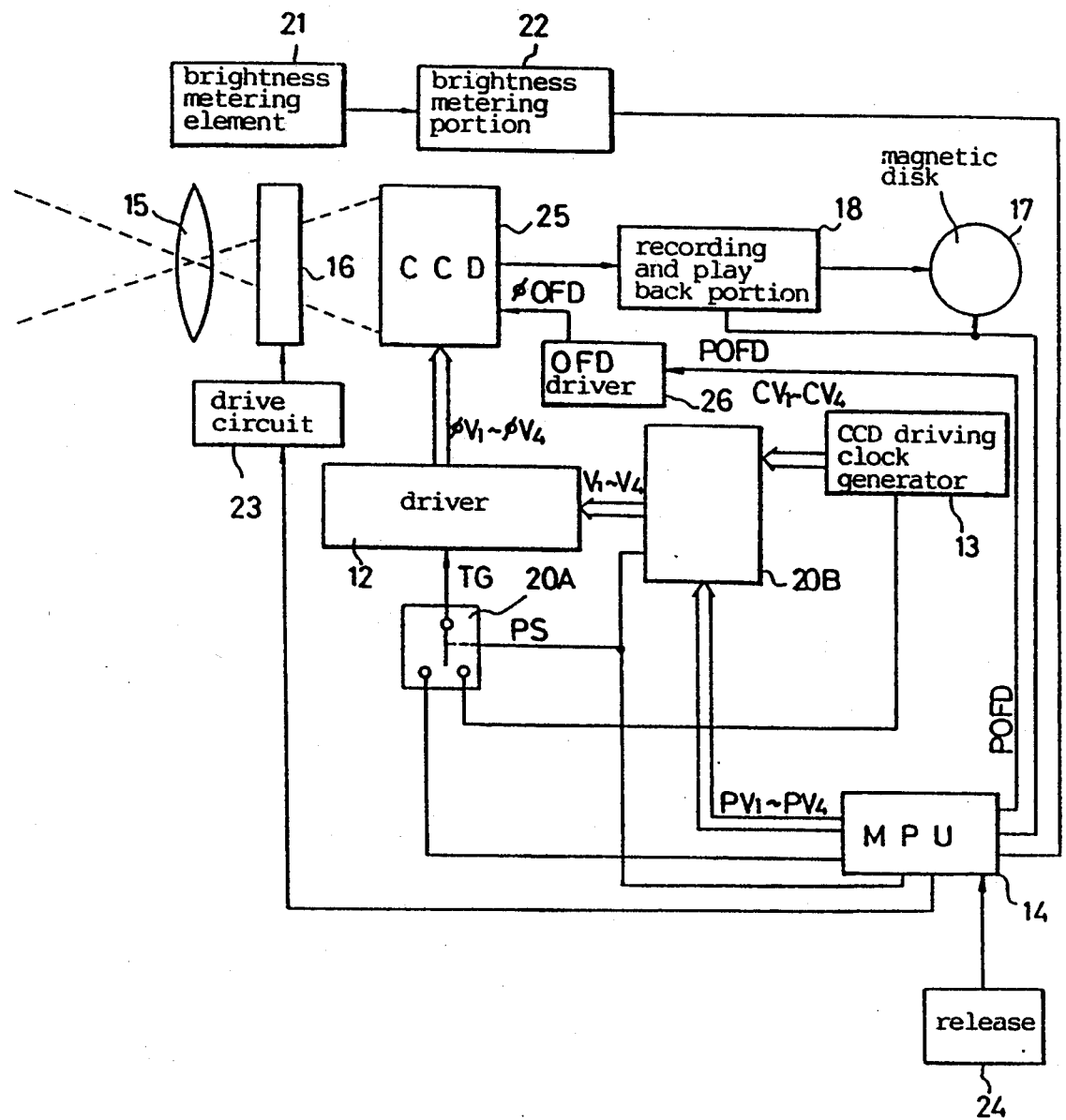
FIG. 10 is a block diagram of a driving apparatus according to another aspect of the present invention.
Figure 11:
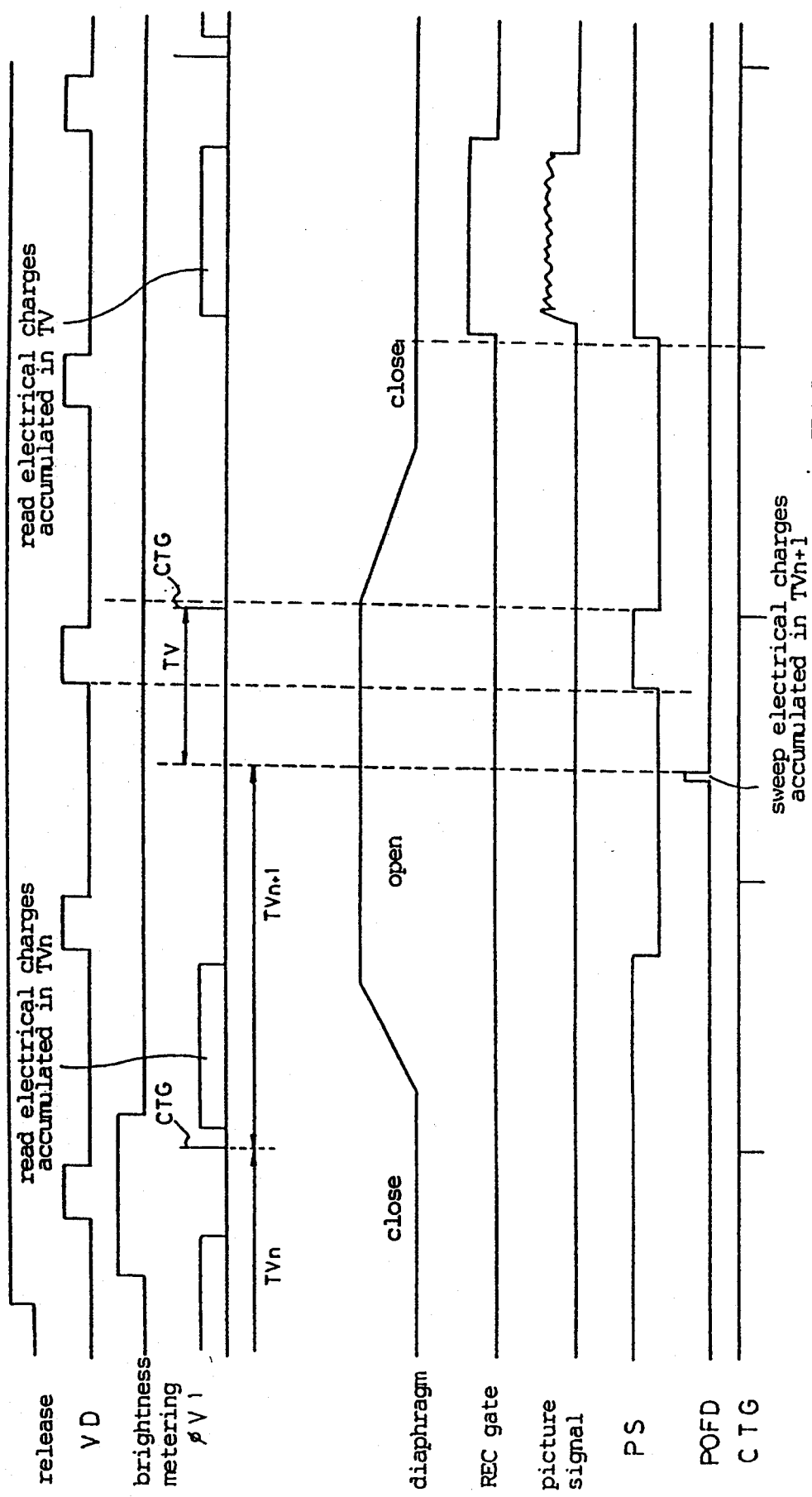
FIG. 11 is a timing chart corresponding to an embodiment shown in FIG. 10.

FIG. 10 shows a circuit diagram of an inter-line transfer type of CCD image pick-up device 11 having an overflow drain (OFD) which can discharge the electrical charges accumulated in the photodiodes onto a silicon board. FIG. 11 shows a timing chart thereof.

In this embodiment, when the sweep demand signal is outputted from MPU almost completely closed. Accordingly, even when a picture of an object having a high brightness is being taken, the recording of the signal charges can be effected without a smear occurring. Namely, high quality pictures can be taken, regardless of the brightness of the object.

Figure 12:
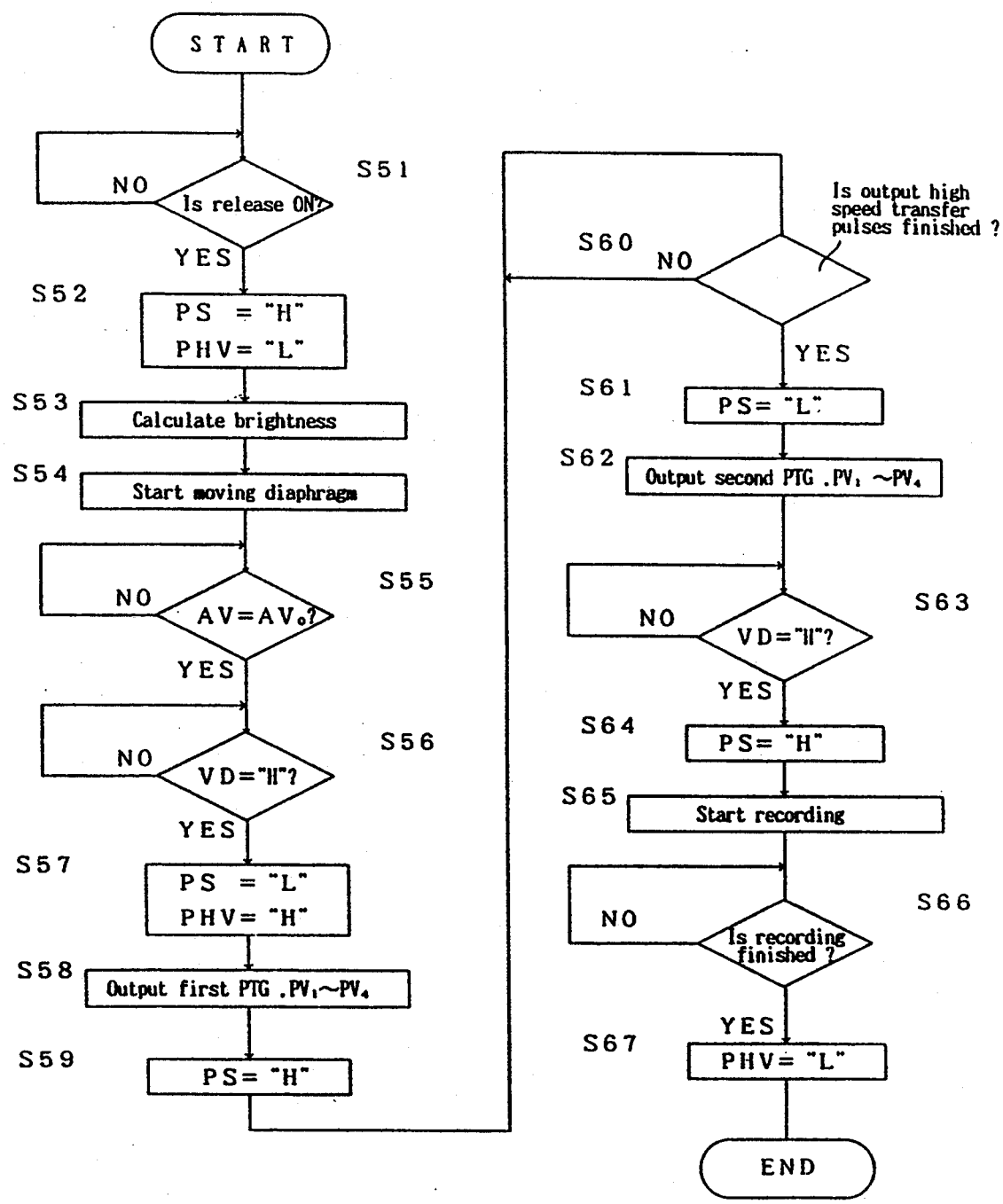
FIG. 12 is a flow chart of operations of a driving apparatus of an image pick-up device according to still another aspect of the present invention.
Figure 13:
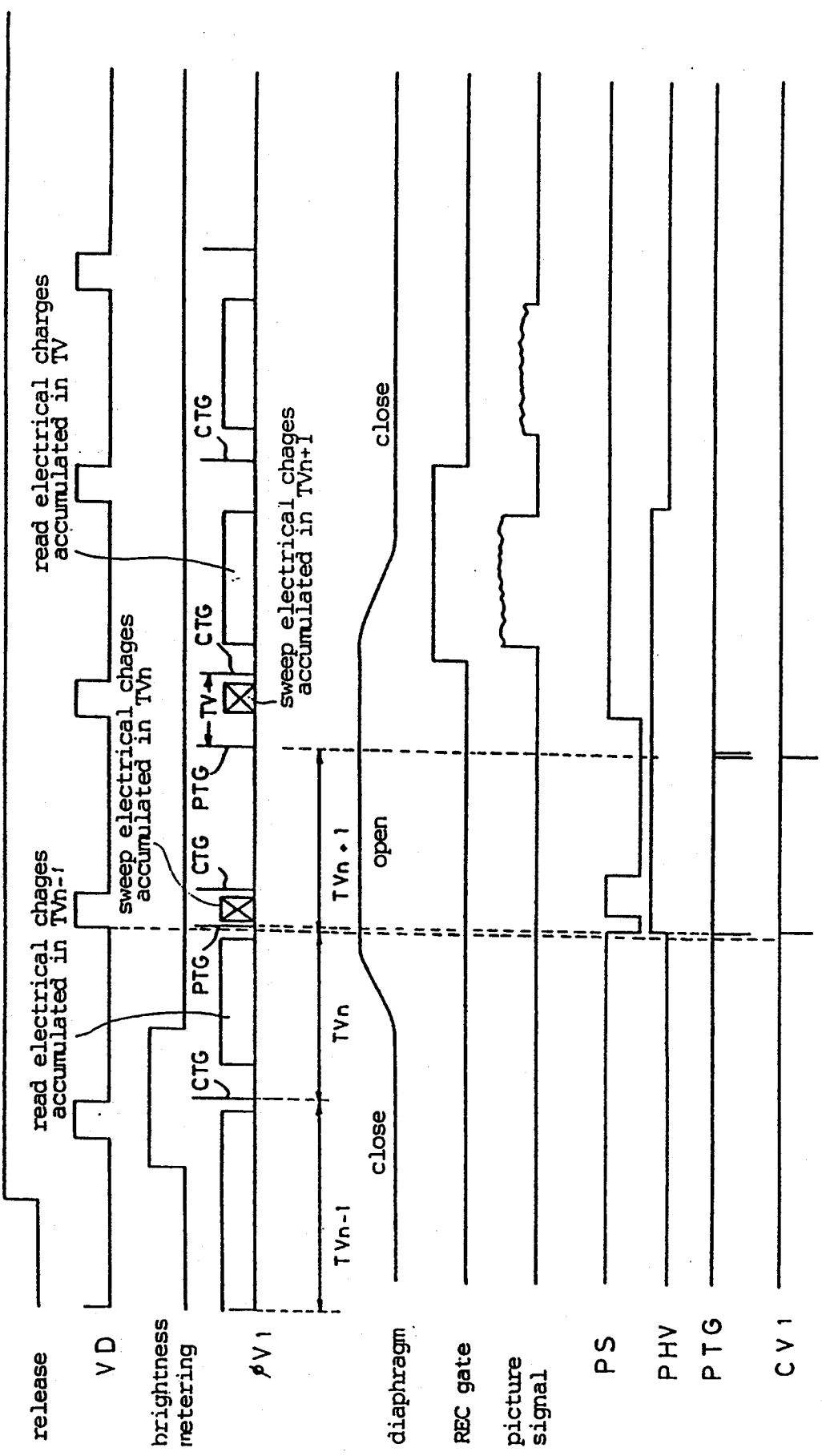
FIG. 13 is a timing chart of elements of a driving apparatus which operates in accordance with the flow chart shown in FIG. 12.
Figure 14:
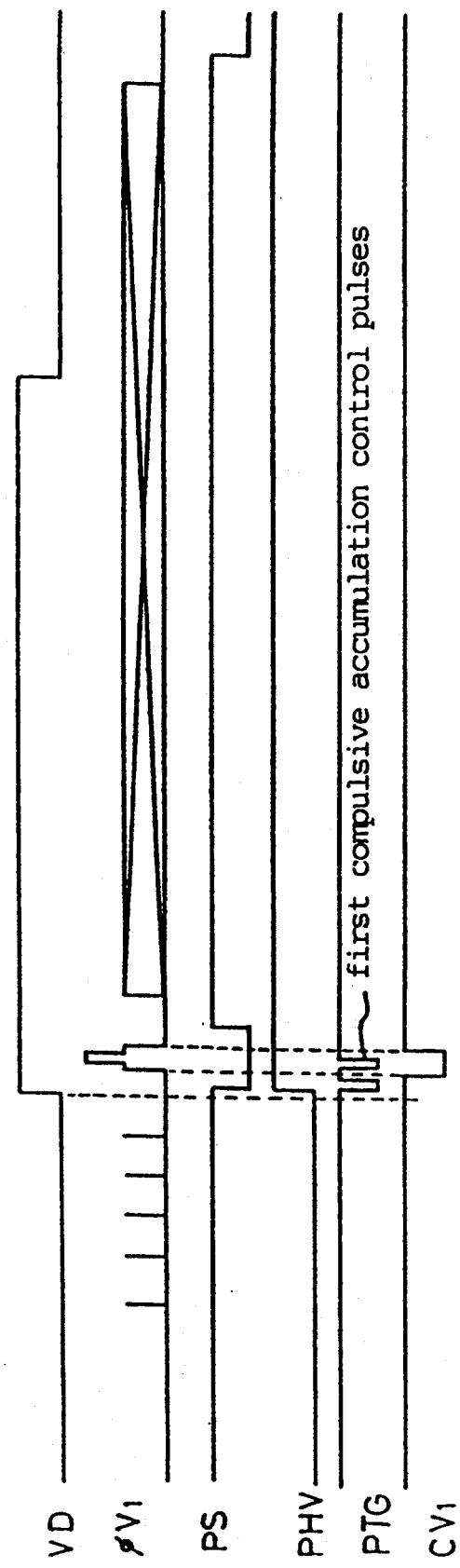
FIG. 14 is a timing chart which shows the detail of elements in a driving apparatus shown in FIG. 12, especially in the vicinity of the output of compulsive transfer accumulation control signals.

FIGS. 12 to 14 show another embodiment in which unnecessary electrical charges can be certainly swept even at the high speed shutter operation.

The main feature of this embodiment resides in that the unnecessary electrical charges which are accumulated in the field immediately before the field in which the shutter operation is effected are compulsively swept before the shutter operation is effected, so that the unnecessary electrical charges can be discharged independently of the shutter speed.

The driving apparatus of an image pick-up device according to the modified embodiment operates as follows (see FIGS. 1-3, 12 and 14).

When the release button 24 is turned ON, the MPU 14 sets the switching signal PS to "H" and sets the sweep demand signal PHV to "L" (steps S51 and S52). As a result, driver 12 is connected to clock generator 13, which periodically outputs the periodical accumulation control signal to CTG and the drive pulses to CV1~CV4, at an interval of 1/60 second, respectively, as shown in FIG. 13. Namely, the image signal (charge) of the object is read from the CCD image pick-up device 11 to be outputted to the record and play-back portion 18, at a cycle of 1/60 second. The image signal can also be used to measure the brightness of the object. However, in the present embodiment, since the external brightness metering device 21 is provided, the image signal is used only for forming an image.

MPU 14 calculates an optimum diaphragm value AVo and an optimum shutter speed TV in accordance with the brightness data of the object detected by the brightness metering portion 22 at step S53. Based on the diaphragm value AV, diaphragm 16 is adjusted to have the optimum diaphragm value AVo through the drive circuit 23 at steps S54 and S55.

When the adjustment of diaphragm 16 is finished, MPU 14 sets the switching signal PS to "L" after the VD pulse shown in FIG. 13 becomes "H" (steps S56 and S57). Consequently, switch circuits 20A and 20B switch to connect MPU 14 to driver 12, so that the first compulsive accumulation control signal and the drive signal can be outputted from MPU 14 to driver 12 through PTG and PV1~PV4.

MPU 14 outputs the first compulsive accumulation control signal and the drive pulses to PTG and PV1~PV4, respectively, when the level of the VD pulse becomes "H", as shown in FIGS. 13 and 14. As a result, the unnecessary electrical charges accumulated in the time TVn+1 are transferred to the vertical transfer portions 11b (step S58).

MPU 14 sets the switching signal PS to be "H" (step S59). As a result, the clock generator 13 is connected to the driver 12, so that the high speed drive pulses are outputted from the clock generator 13 to the driver 12 through CV1~CV4. Namely, the unnecessary electrical charges transferred to the vertical transfer portions are swept.

MPU 14 turns the switching pulse PS to "L" again after the output of the high speed transfer pulse is finished (steps S60 and S61). Thus, the second compulsive accumulation control pulse can be outputted from MPU 14.

At step S62, MPU 14 outputs the second compulsive accumulation control pulse and the drive pulse to the driver 12 through PTG and PCV1~PCV4 to accumulate the electrical charges within the optimum shutter speed (time) TV obtained at step S53. As a result, the unnecessary electrical charges which are accumulated in photodiodes 11a of the CCD image pick-up device within the time TVn+1 after the first compulsive accumulation control pulse is outputted and before the second compulsive accumulation control pulse is outputted are transferred to the vertical transfer portions 11b.

MPU 14 turns the switching signal PS to "H" after the level of the VD pulse becomes "H" (steps S63 and S64), so that the high speed drive pulses are outputted from the clock generator 13 to the driver 12 through CV1~CV4 to sweep the unnecessary electrical charges on the vertical transfer portions 11b of the CCD image pick-up device into the discharge drain 11d at a high speed. A predetermined number of high speed drive pulses (sweep pulses) are outputted and are stopped before the periodical accumulation control signal is outputted.

When the transfer pulses are outputted from the clock generator 13 together with the periodical accumulation control signal, the signal charges accumulated in the shutter time TV are transferred to the vertical transfer portions 11b. After that, MPU 14 opens the REC gate of the record and play back portion 18 to commence the record of the signal charges (step S65). Namely, the signal charges which are successively outputted from the vertical transfer portions 11b in accordance with the drive pulses (vertical and horizontal transfer pulses) which are outputted from the clock generator 13 are recorded on the magnetic disk 17 as video signals through the record and play back portion 18.

When the recording for one picture plane is finished, the unnecessary charges sweeping demand signal PHV is set to be "L" and is returned to the initial position (steps S66 and S67).

With the above-mentioned embodiment, even if the shutter speed is high (i.e., even if the time for accumulation is short), the unnecessary charges which are accumulated in the field immediately before the field including the second compulsive periodical accumulation control signal, which determines the shutter speed, can be certainly swept by the first compulsive accumulation control signal, since the maximum period of time in which the unnecessary charges are accumulated is within one field.

Note that although MPU 14 outputs the drive pulses which becomes the transfer pulses in the above-mentioned embodiment, the drive pulses can be outputted from the clock generator 13 instead and the MPU 14 outputs only the control signals for controlling the drive pulses.

As can be seen from the above description, according to the present invention, since the unnecessary charges which are accumulated in the field immediately before the field in which the shutter operation is effected are compulsively swept before the shutter operation is effected, the unnecessary electrical charges can be certainly swept regardless of the shutter speed, resulting in a clear noiseless picture having a uniform brightness.

Figure 17:
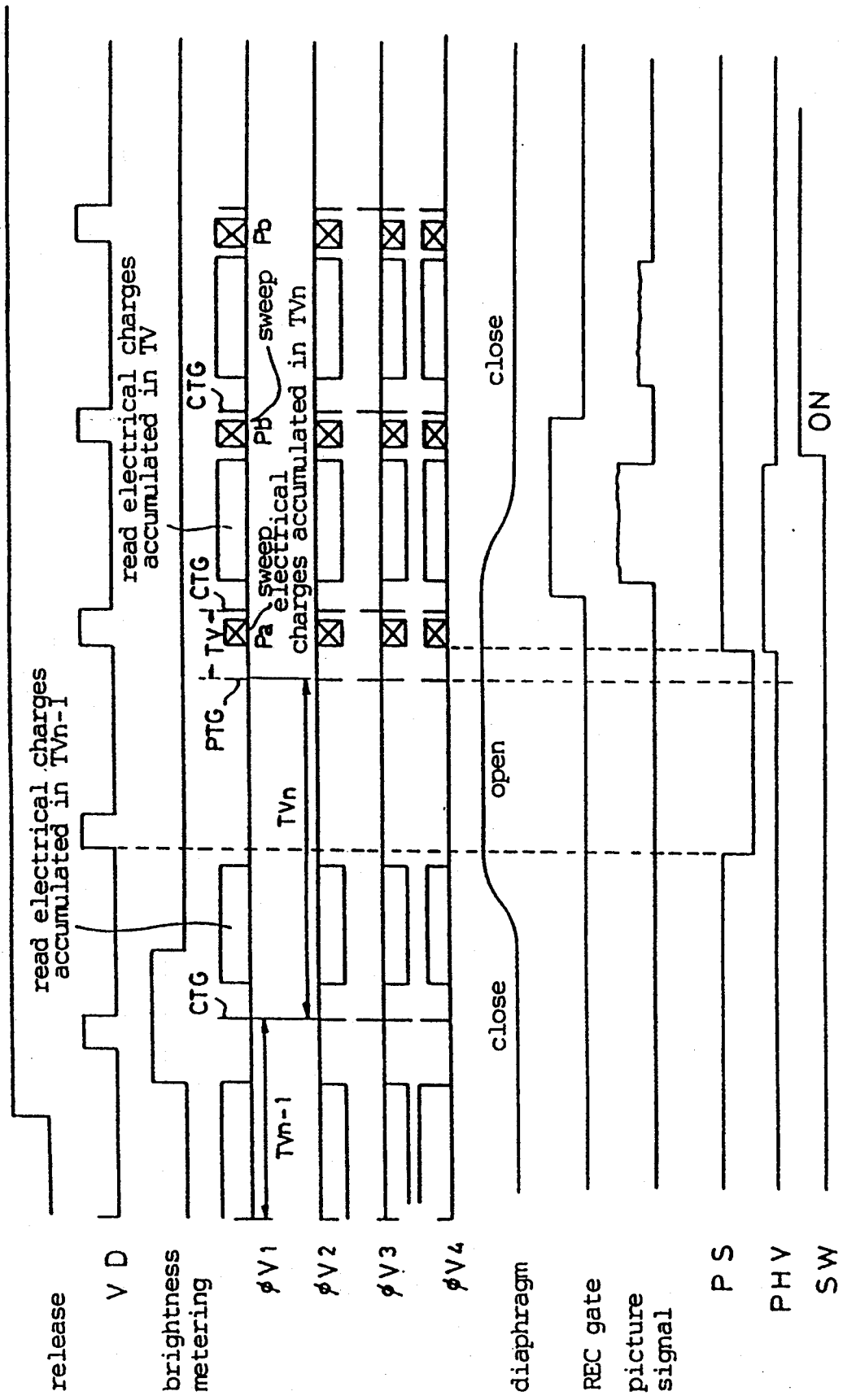
FIG. 17 is a timing chart of components of the driving apparatus shown in FIG. 15.
Figure 18:
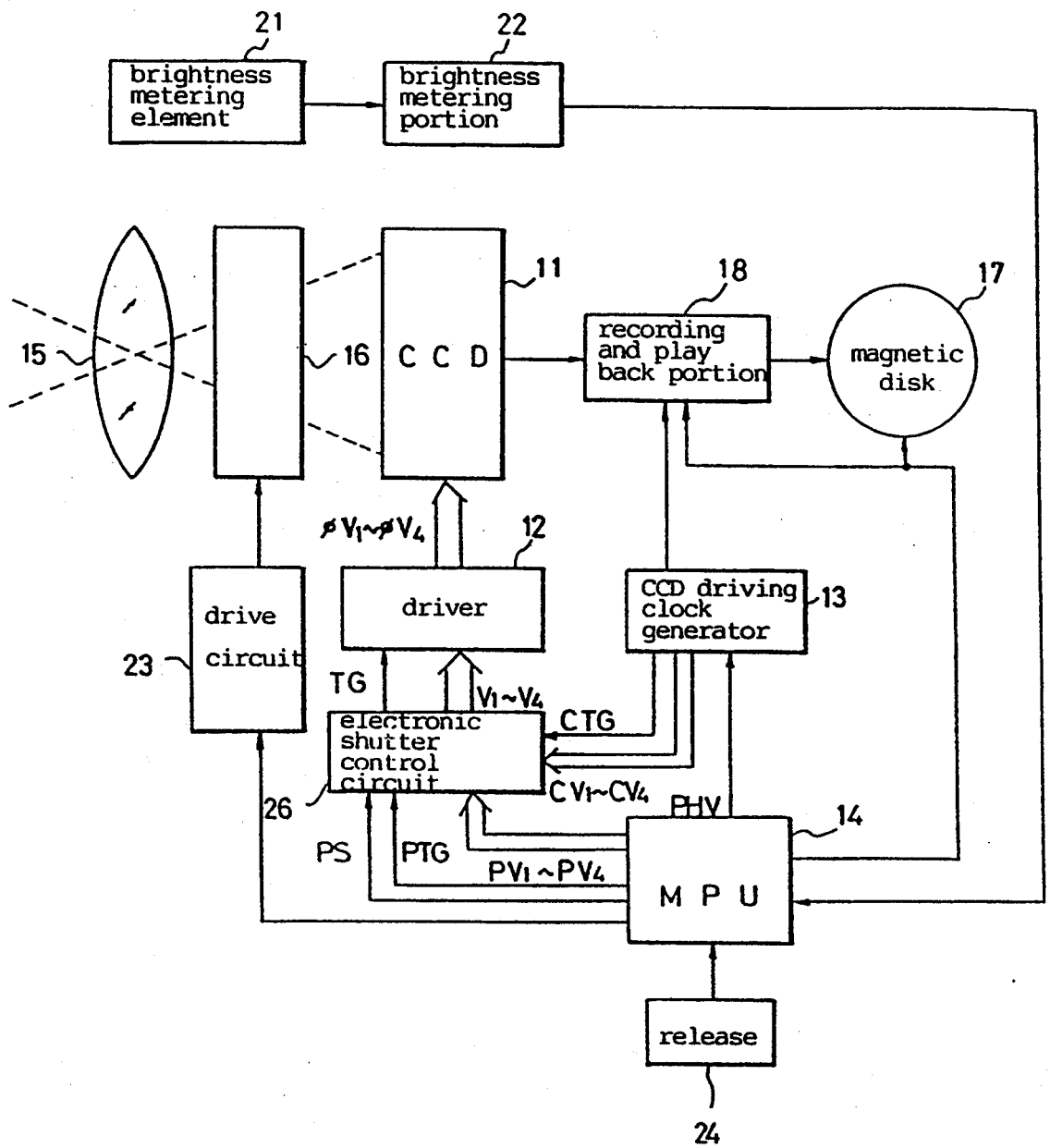
FIG. 18 is a block diagram of the driving apparatus of an image pick-up device according to still another embodiment of the present invention.
Figure 19:
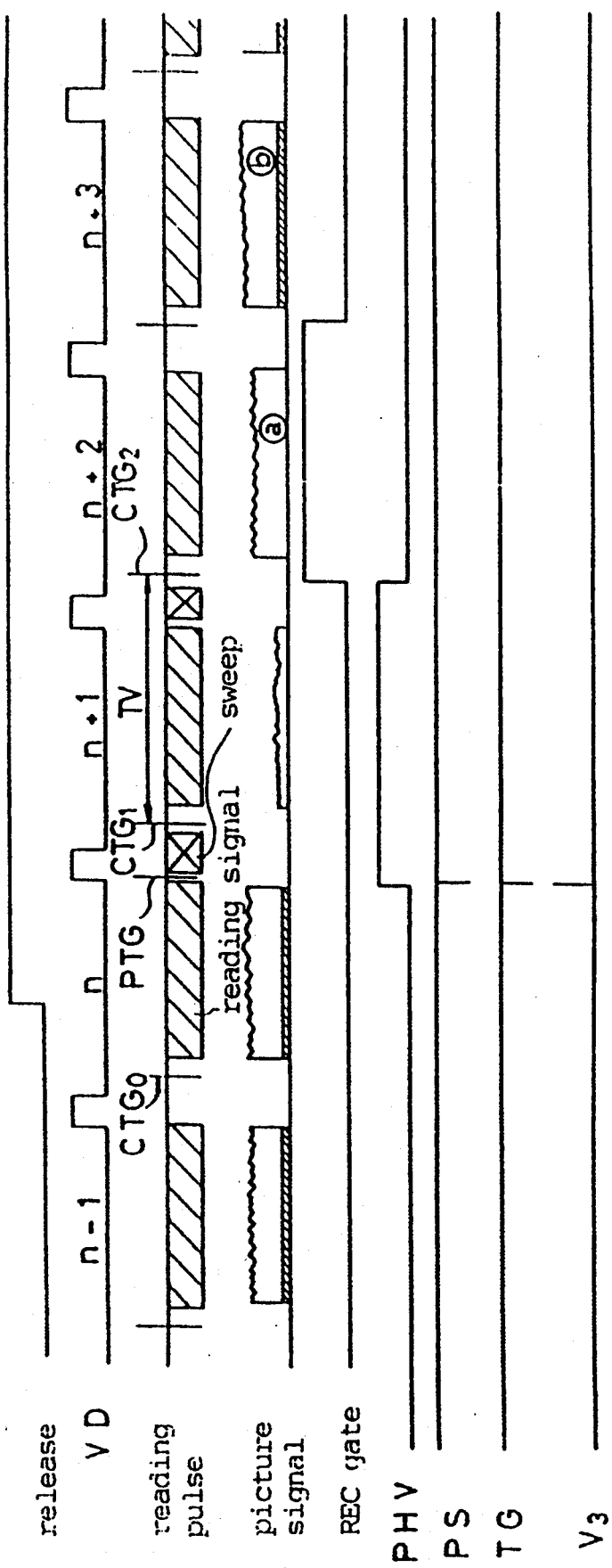
FIG. 19 is a timing chart of the driving apparatus shown in FIG. 18, in a movie mode.

The following discussion will be directed to another embodiment of the present invention, in which the picture images can be successively inputted at a predetermined interval of time, similarly to a video movie camera in which the electronic shutter operation can be effected, with reference to FIGS. 15 to 17. The main advantage of this embodiment is an easy adjustment for making the smear level in the movie mode identical to that in the still mode.

FIG. 15 shows a block diagram of a driving apparatus for driving an imaging device according to another aspect of the present invention. In this embodiment, the elements corresponding to those shown in FIG. 1 are designated with the same reference numerals.

The recording and play back portion 18 is connected to an electronic view finder 38, so that the image signals inputted to the recording and play back portion 18 can be viewed (monitored) through the electronic view finder 38.

To MPU 14 is connected a sweeping switch 39 which is actuated to cause the MPU 14 to output a sweep demand signal to the clock generator 13 through PHV. The clock generator 13 outputs high speed drive pulses after the outputting of the periodical drive pulses is completed to sweep the vertical transfer portions 11b. This decreases smear.

FIG. 16 shows an example of a concrete control circuit in the MPU 14, showing the sweeping switch 35. The sweeping switch 35 is connected to one input of an OR gate 36. The still/movie switching signals in the MPU 14 are inputted to the remaining input terminal of the OR gate 36. The still/movie switching signal is a signal within the MPU 14 and becomes a "H" level in the still mode and a "L" level in the movie mode. In the illustrated embodiment, when a power switch (not shown) is turned ON, the release button 24 is depressed halfway to actuate the movie mode, in which the monitoring can be effected through the electronic view finder 38 or an external monitoring device. When the release button 24 is fully depressed, the mode switches to the still mode, in which a picture can be taken. It is also possible to provide a special switch for switching the mode to the movie mode. In this alternative, when the release switch 24 is actuated during the operation in the movie mode, the mode is changed to the still mode to take a picture.

Output OR gate 36 is connected to one of the input terminal of an AND gate 37. Sweep demand signal PHV is inputted to the remaining input terminal of the AND gate 37. The sweep demand signal is periodically outputted at a predetermined interval in the movie mode and is only once outputted at a predetermined time in the still mode. The output terminal of the AND gate 37 is connected to the clock generator 13 through line PHV.

Accordingly, in the movie mode, the sweep demand signal is periodically outputted on line PHV when the "H" signal (ON signal) is outputted on line the sweeping switch 35. On the other hand, in the still mode, the sweep demand signal is outputted only once at a predetermined time.

The following discussion will be directed to the operation of the electronic shutter in the apparatus as constructed above, according to the present invention. Note that the main operation is similar to the flow chart shown in FIG. 5 and accordingly, the reference is made also to FIG. 5 (see also FIGS. 15 and 17).

First, it is supposed that sweeping switch 35 is not turned ON. When release button 24 is turned ON, MPU 14 turns the sweep demand signal (pulse) to "L" at steps S11 and S12. As a result, driver 12 is connected to clock generator 13, which periodically outputs the periodical accumulation control signal to CTG and the drive pulses to CV1~CV4, at an interval of 1/60 second, respectively, as shown in FIG. 17. Namely, the image signal (charge) of the object is read from the CCD image pick-up device 11 to be outputted to record and play-back portion 18, at a cycle of 1/60 second. This is the movie mode.

MPU 14 calculates an optimum diaphragm value AV and an optimum shutter speed TV in accordance with the brightness data of the object detected by the brightness metering portion 22 at step S13. Based on the diaphragm value AV, diaphragm 16 is adjusted to have the optimum diaphragm value AVo through the drive circuit 23 at steps S14 and S15.

When the adjustment of the diaphragm 16 is finished, MPU 14 sets the switching signal PS to "L", after the VD pulse shown in FIG. 17 becomes "H" (steps S16 and S17). Consequently, switch circuits 20A and 20B switch to connect MPU 14 to driver 12, so that the compulsive accumulation control signal and the drive signal can be outputted from MPU 14. Namely, the compulsive transfer pulses can be outputted from the driver 12.

MPU 14 outputs the compulsive accumulation control signal and the drive pulses to PTG and PV1~PV4, respectively, when the optimum shutter speed TV calculated at step S13 is obtained, as shown in FIG. 17. As a result, the unnecessary electrical charges accumulated in photodiodes 11a of the CCD image pick-up device 11 are transferred to the vertical transfer portions 11b at one time (step S18).

MPU 14 sets the switching signal PS and the sweep demand signal PHV to be "H" after the pulse of the VD shown in FIG. 17 is raised to be "H" (steps S19 and S20). As a result, the high speed drive pulses are outputted from clock generator 13 to CV1~CV4 for a certain period of time and the high speed sweep pulses are outputted from the driver 12 to the vertical transfer portions 11b through the ΦV1~ΦV2. Namely, the unnecessary electrical charges transferred to the vertical transfer portions of the CCD transfer image pick-up device 11 are swept into the sweep drain 11d at high speed. The output of the high speed sweep pulses is stopped before the subsequent periodical accumulation control signal is outputted from the clock generator 13.

When the subsequent periodical accumulation control signal is outputted to CTG from the clock generator 13, the unnecessary electrical charges accumulated in the photodiodes 11a within the optimum shutter speed (time) TV are transferred to the vertical transfer portions 11b. After that, the MPU 14 opens the REC gate of the recording and play back portion 18 to commence the recording of the signal charges (step S21). Namely, the signal charges which are successively outputted from the vertical transfer portions 11b in accordance with the read pulses which are outputted from the clock generator 13 are recorded on the magnetic disk 17 as picture signals through the recording and play back portion 18.

When the recording of one picture plane is finished, the sweep demand signal PHV is set to "L" and is returned to the initial position (steps S22 and S23).

The above discussion has been directed to the shutter operation when the sweeping switch 35 is not turned ON. When the sweeping switch 35 is turned-ON, since the sweep demand signal is always outputted to the clock generator 13 from MPU 13 (the output of the AND gate 37) through the PHV, as shown in FIG. 17, the high speed drive pulses are outputted for a certain period of time after the output of the periodical drive pulses (read pulses) is finished. This corresponds to the operation after the completion of exposure in the timing chart shown in FIG. 17. Accordingly, the adjustment of the smear level in the still mode and the movie mode can be easily effected by turning ON the sweeping switch 35.

During the monitoring of the bright object in the movie mode, when the sweeping switch 3B is turned ON, the smear level of the image in the electronic view finder 38 decreases, resulting in a clear picture. When the sweeping switch 35 is turned OFF, the electrical power consumption can be decreased.

In the illustrated embodiment, the inter-line transfer type CCD image pick-up device having no memory area is used, however the invention is not limited thereto. For example, the invention can be applied to a frame inter-line transfer type of CCD image pick-up device having a memory area.

It is possible to provide a clock generator 13 which outputs the compulsive accumulation control pulses and the drive pulses. In this case, MPU 14 can output the control signals for controlling the compulsive accumulation control pulses and the drive pulses.

According to the present invention, the time of accumulation of the electrical charges of the image pick-up device can be controlled in accordance with the brightness of the object. Furthermore, in the movie mode, when the sweep demand device is turned ON, the sweeping signal is outputted from the pulse signal outputting device in each field after the output of the read signal is completed, so that the electrical charges of the vertical transfer portion can be swept within a short space of time. Accordingly, there is no difference in smear level in the movie mode and in the still mode, so that clear pictures having a uniform quality can be obtained in the still mode and the movie mode. No adjustment of the smear level is necessary or even if it is necessary, the adjustment can be easily effected.

FIGS. 18 to 22 show another embodiment of a drive apparatus of an image pick-up device in which an adjustment to take uniform clear pictures can be easily effected. This embodiment is similar to that shown in FIG. 1. The elements corresponding to those in FIG. 1 are designated with the same reference numerals as those in FIG. 1. The relationship between the accumulation control signals and the drive pulses is identical to that shown in FIG. 4.

An electronic shutter control circuit 26 controls a switching operation of the switching circuits 20A and 20B, similarly to FIG. 1. Namely, the control signals and the drive pulses from the clock generator 13 or the control signals and the drive pulses from the MPU 14 are selectively fed to the driver 12 in accordance with the switching signals from the MPU 14.

Figure 20:
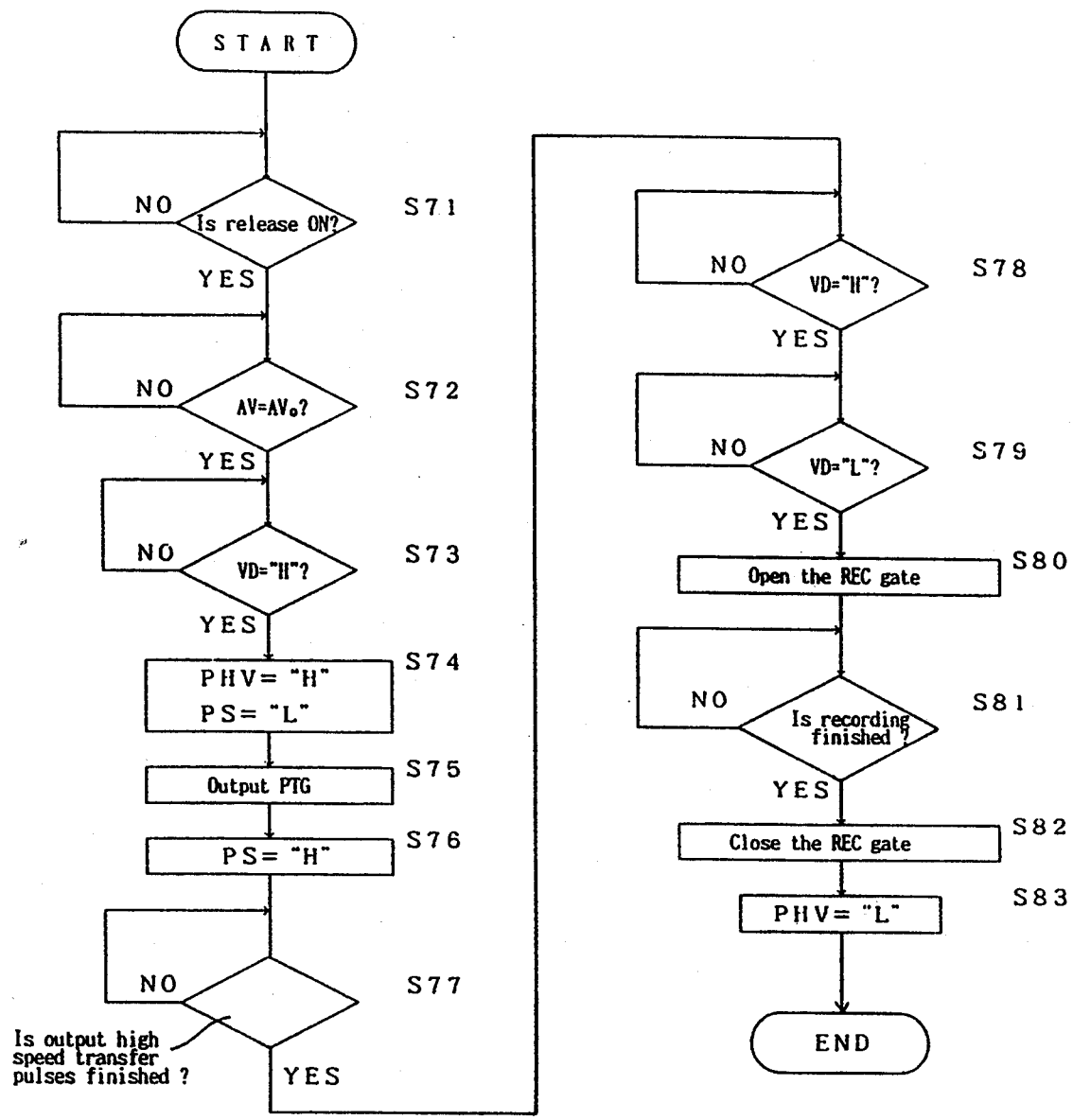
FIG. 20 is a flow chart of operations of the driving apparatus shown in FIG. 18, in the movie mode.

The operation of the driving apparatus of the image pick-up device at the still mode will be explained below (FIG. 20).

When release button 24 is turned ON, MPU 14 checks whether the pulse VD is changed from "L" to "H" (steps S71~S73). The VD pulse is a pulse which is produced from the clock generator 13 for a predetermined period of time immediately before the periodical accumulation control signal is outputted.

When the VD pulse becomes "H", the switching signal (pulse) PS is set to "L", and the sweep demand signal (pulse) PHV is set to "H", at step S74. As a result, the pulses of MPU 14 can be sent to driver 12 through the electronic shutter control circuit 26.

MPU 14 outputs the compulsive accumulation control signal (compulsive transfer pulse) PTG and the transfer pulses PV1~PV4 (step S75). Consequently, the unnecessary electrical charges accumulated in the photodiodes 11a are transferred to vertical transfer portions 11b after the periodical accumulation control signal (periodical transfer pulse) CTG1 is outputted, as shown in FIG. 20.

MPU 14 turns the switching signal (switching pulse) PS to "H" after the compulsive accumulation control signal PTG is outputted (step S76). As a result, the pulses of the clock generator 14 are inputted to driver 12 through the electronic shutter control circuit 26. Namely, the high speed sweep pulses (high speed drive pulses) outputted from the clock generator 14 are inputted to CCD image pick-up device 11, so that the unnecessary electrical charges transferred to vertical transfer portions 11b are swept.

MPU 14 turns the switching signal PS to "H", and then checks the ascending and descending of the VD pulses when the output of the high speed sweep pulses is completed (steps S77~S79). Namely, the MPU 14 waits until the completion of the exposure.

The following operations are performed during exposure. Upon the completion of the output of the high speed drive pulses, the periodical accumulation control signal CTG1 is outputted from clock generator 14 to commence the exposure. Consequently, the unnecessary electrical charges of photodiodes 11a are transferred to vertical transfer portions 11b, so that photodiodes 11a commence the accumulation of the electrical charges.

During the accumulation of the electrical charges of the photodiodes 11a, the read pulses are inputted from the clock generator 14 to read the unnecessary electrical charges transferred to the vertical transfer portions 11b.

The operations mentioned above are performed during the checking of the VD, pulses by MPU 14. MPU 14 checks the pulse VD, which is descended after the operations mentioned above are performed, to open the REC gate (step S80), so that the signal charges which are read by the CCD image pick-up device 11 can be recorded.

After the VD pulses are descended, the periodical accumulation control signal CTG2 and the drive pulses are outputted from clock generator 13, so that the signal charges which are accumulated in exposure field n+1 (shutter speed TV, exposure time) are transferred to vertical transfer portions 11b. The signal charges are read by the read pulses which are outputted from the clock generator 14 and recorded as a picture signal on magnetic disk 17.

Upon the completion of recording, MPU 14 closes the REC gate and returns the sweep demand signal PHV to "L". After that, the control proceeds to the END process, so that MPU 14 waits until the release button 24 is depressed (steps S81~S83).

Figure 21:
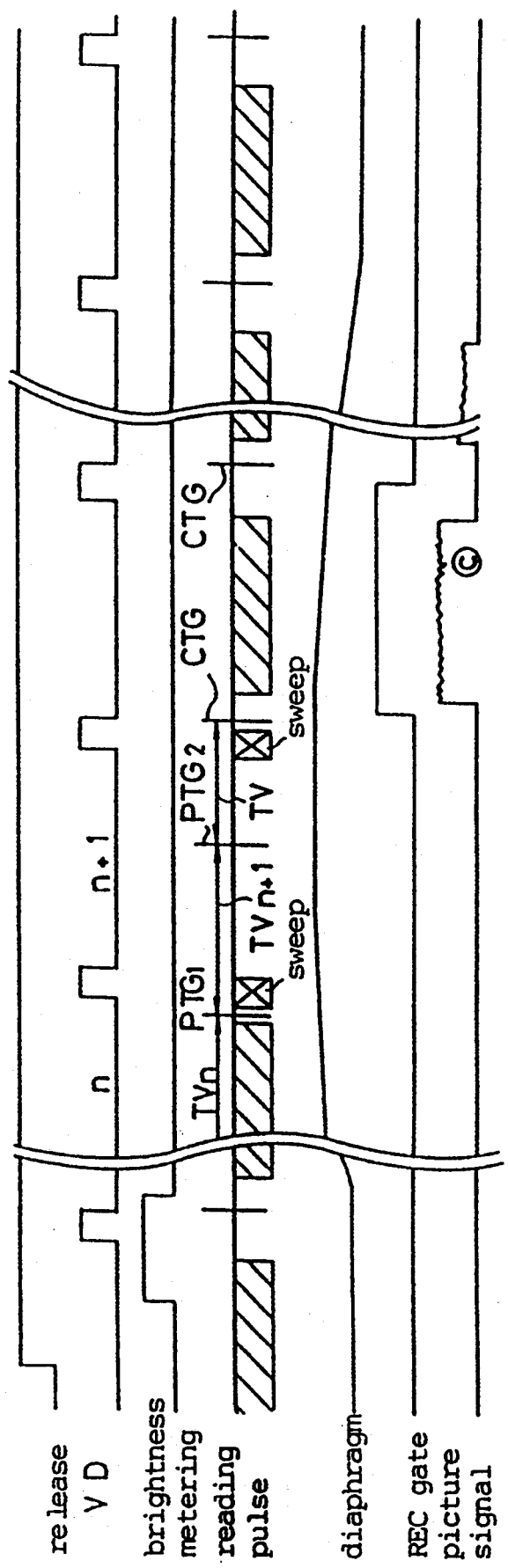
FIG. 21 is a timing chart of the driving apparatus shown in FIG. 18, in a still mode.
Figure 22:
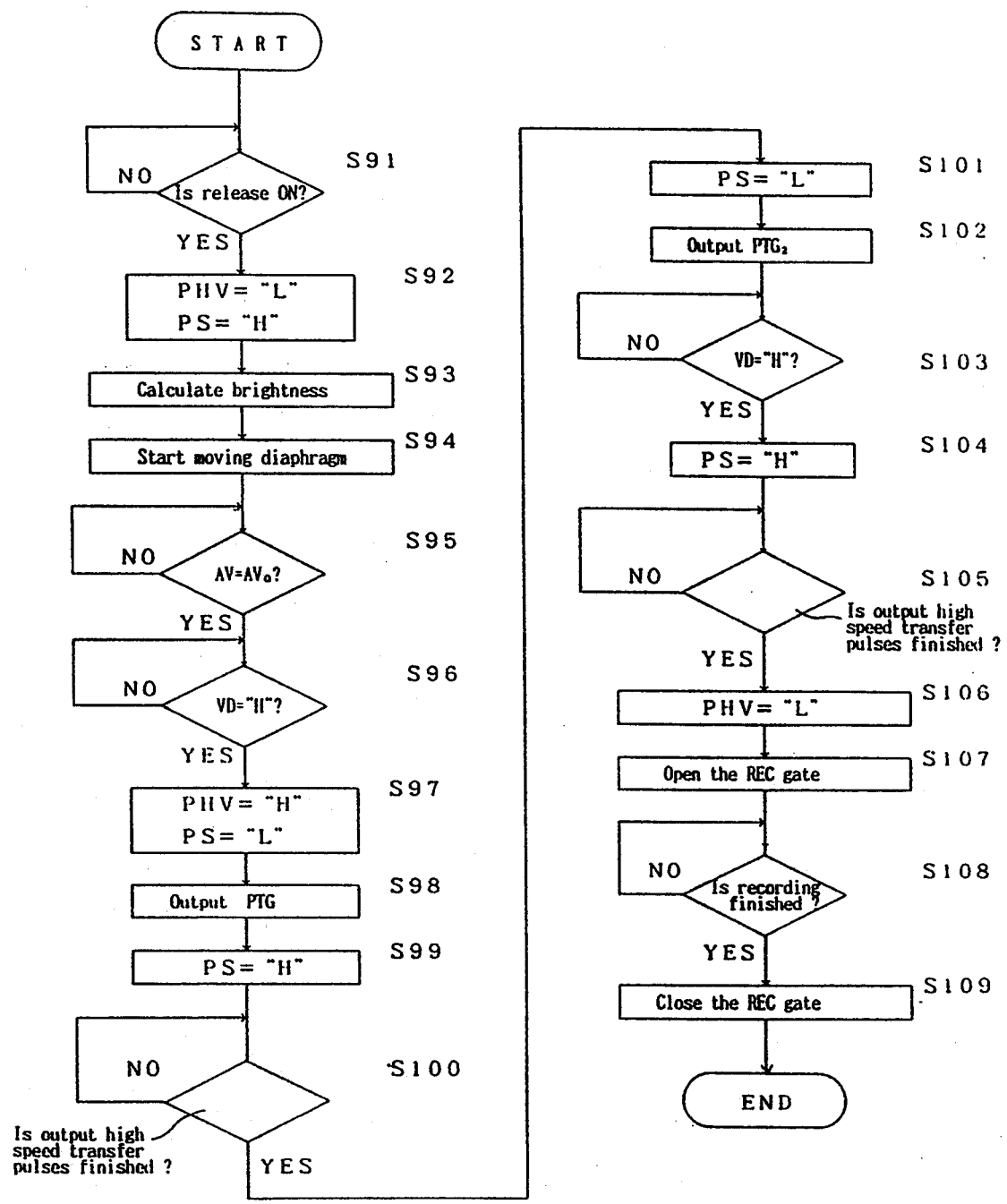
FIG. 22 is a flow chart of operations of the driving apparatus shown in FIG. 18, in the still mode.

The operations of the apparatus in the still mode will be explained below (FIGS. 21 and 22).

When the release button 24 is turned ON, MPU 14 turns the switching signal PS and the sweep demand signal (sweep demand pulse) to "H" and "L", respectively (steps S91 and S92). As a result of this, the pulses which are outputted from the clock generator 13 are outputted to the driver 12 and accordingly the driver 12 periodically outputs the accumulation control signal CTG and the drive pulses CV1~CV4 at an interval of 1/60 second.

MPU 14 performs the calculation to obtain an optimum diaphragm value AVo and shutter speed TV, based on the brightness data of the object which is detected by the brightness metering device 22 (step S93). After that, diaphragm control circuit 23 controls the diaphragm 16 to have the optimum diaphragm value (steps S94 and S95).

When the adjustment of the diaphragm 16 is finished, MPU 14 turns the switching signal PS and the sweep demand signal PHV to "L" and "H", respectively, after the VD pulse becomes "H" (steps S96 and S97). After that, the pulses of MPU 14 are fed to CCD image pick-up device 11, so that MPU 14 outputs a compulsive accumulation control signal PTG1 and the drive pulses (step S98). Thus, the unnecessary electrical charges accumulated in photodiodes 11a in field n are transferred to the vertical transfer portions 11b.

After that, MPU 14 turns the switching signal PS to "H" (step S99). As a result, the high speed drive pulses are inputted from the clock generator 13 into the CCD image pick-up device 11 to sweep the unnecessary electrical charges which are transferred to the vertical transfer portions 11b. Thereafter MPU 14 waits until the output of the high speed drive pulses is finished (step S100).

Upon the completion of the output of the high speed drive pulses, MPU 14 turns the switching signal PS to "L" (step S101). As a result, the pulses of the MPU 14 are inputted to the CCD image pick-up device 11, so that even if the periodical accumulation control signal and the read pulses are outputted from the clock generator 13, they can not be inputted to the CCD image pick-up device 11.

MPU 14 outputs a compulsive accumulation control signal PTG2 and the drive pulses when optimum shutter speed TV, which is calculated at step S93, is obtained (step S102). As a result, the unnecessary electrical charges which are accumulated in photodiodes 11a of the CCD image pick-up device 11 are transferred to the vertical transfer portions 11b to commence the exposure. For example, if the shutter speed TV is 1/60 second, the compulsive accumulation control signal PTG2 is outputted at the same time as the periodical accumulation control signal CTG1.

MPU 14 turns the switching signal PS to "H" after the VD pulse becomes "H" (steps S103 and S104). As a result, the high speed drive pulses from the clock generator 13 are inputted into the CCD image pick-up device as high speed sweep pulses, so that the unnecessary electrical charges of the vertical transfer portions 11b are swept before the subsequent periodical accumulation control signal CTG is outputted.

MPU 14 returns the sweep demand signal PHV to "L" after the switching signal is set at "H" and after the output of the high speed sweep signal is completed to open the REC gate (steps S105~S107). The operations mentioned above allow the signal charges read by the CCD image pick-up device 11 to be recorded.

After the VD pulse has ascended, the periodical accumulation control signal CTG and the periodical drive pulses are outputted from the clock generator 13, so that the signal charges accumulated in photodiodes 11a are transferred to the vertical transfer portions 11b. After that, the signal charges are read by the read signal outputted from the clock generator 13 to be recorded as a picture signal on the magnetic disk 17 through the recording and play back portion 18.

Upon the completion of recording, MPU 14 closes the REC gate and the control proceeds to the END process, in which MPU 14 waits until the release button 24 is depressed (steps S108 and S109).

Since, in the still mode and the movie mode, the unnecessary electrical charges which are accumulated in the photodiodes 11a in the field immediately before the exposure field are compulsively transferred and swept, the same operations are performed in the same exposure time (duration). Consequently, clear pictures having a uniform quality can be obtained in both the movie mode and the still mode.

According to the illustrated embodiment mentioned above, in case of recording in the movie mode, since the compulsive transfer pulses and the sweep pulses are outputted after the output of the read pulses for reading the unnecessary electrical charges is completed, and since the electrical charges which are accumulated photodiodes in the filed immediately before the exposure is commenced are swept within a short space of time before the exposure, similarly to the case of the still mode, noiseless pictures having the same high quality and the same smear level can be obtained in the still mode and the movie mode.

Since there is no difference in the quality of pictures between the still mode and the movie mode, it is possible to record a high quality picture that is equivalent to that of the still mode in a desired time, while monitoring it at the movie mode.

FIGS. 23 to 29 show still another embodiment of a driving apparatus of an imaging device. Note that the elements corresponding to those in FIG. 1 are designated with the same reference numerals as those in FIG. 1.

Figure 23:
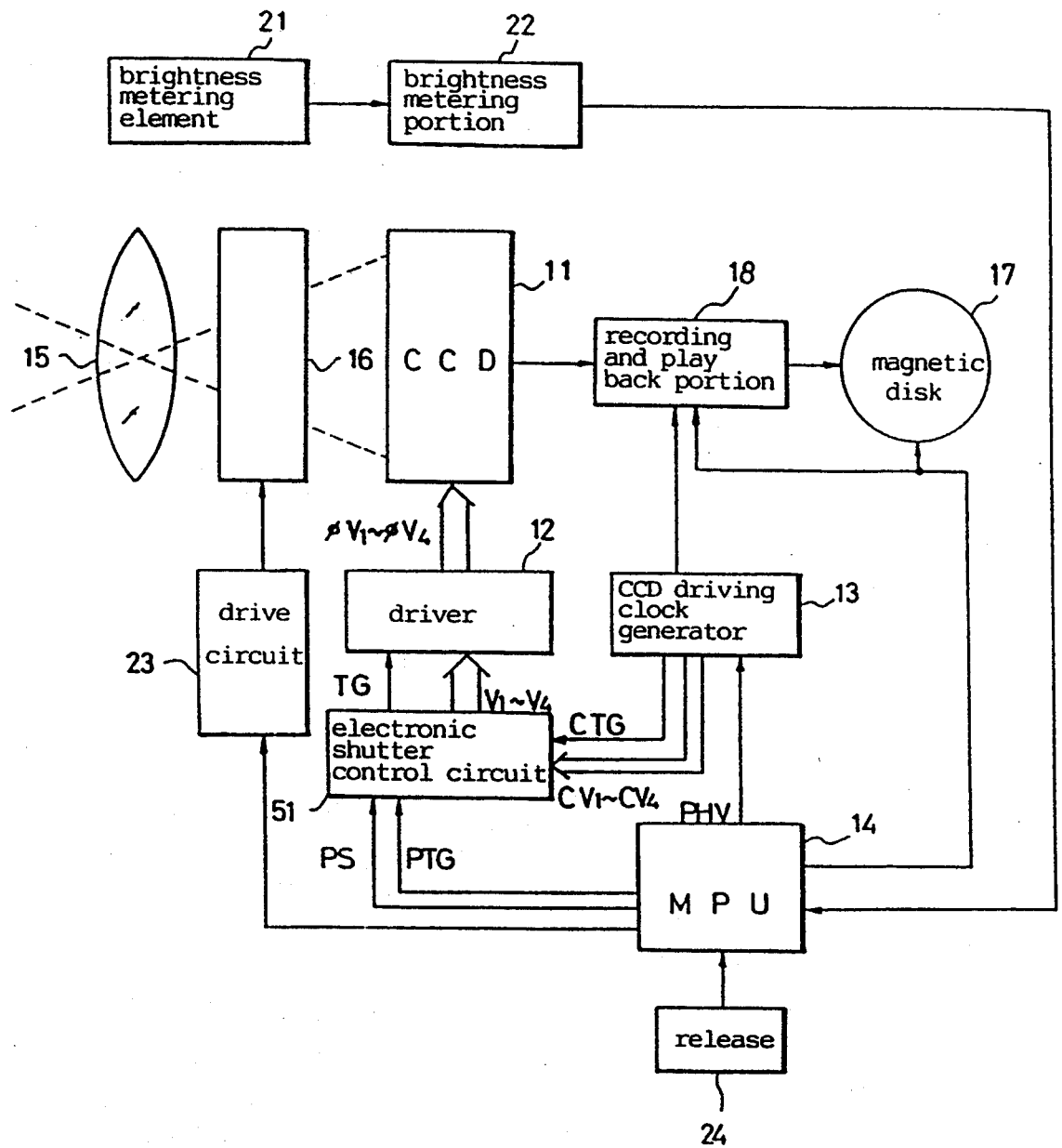
FIG. 23 is a block diagram of a driving apparatus of an image pick-up device according to still another aspect of the present invention.

As can be seen in FIG. 23, driver 12 is connected to the CCD image pick-up device 11 as an imaging device to drive the latter. The CCD image pick-up device 11 is similar to that shown in FIG. 2.

The CCD driving clock generator 13 and the MPU (microprocessing unit) 14 are connected to the driver 12 through the electronic shutter control circuit 51. The CCD driving clock generator 13 and the electronic shutter control circuit 51 constitute a pulse signal outputting device.

The CCD image pick-up device 11 is of an inter-line transfer type having no memory area. The image of the object which is incident upon the photographing lens 15 and is transmitted through the diaphragm 16 is formed on photodiodes 11a of the CCD image pick-up device 11. The object image is picked up in the form of signal charges. The diaphragm 16 is driven by the diaphragm control circuit 23 which is in turn controlled by the MPU 14.

The signal charges accumulated in the photodiodes of the CCD image pick-up device 11 are transferred to the vertical transfer portions (vertical transfer CCDs) 11b at one time. The signal charges which are transferred to the vertical transfer portions 11b are, upon reading, successively transferred to the horizontal transfer portion (horizontal transfer CCD) 11c, so that the signal charges are read by each horizontal line thereof. Upon sweeping, the signal charges are swept into the sweeping drain 11d which is located on the side opposite to the horizontal transfer portion 11c.

The recording and play back portion 18 is connected to the horizontal transfer portion 11c of the CCD image pick-up device 11. The recording and play back portion 18 records information of the signal charges which are outputted from the CCD imaging device 11 onto the magnetic disk 17 as a picture signal and reads the picture signal recorded on the magnetic disk 17 to play it back. The operations of the magnetic disk 17 and the recording and play back portion 18 are controlled by MPU 14.

To MPU 14 is connected a brightness metering device 22 which logarithmically compresses the brightness data which is detected by the photometer element 21 and converts the analog signal to the digital signal (A/D conversion) which is outputted therefrom. MPU 14 calculates an optimum diaphragm value AV and an optimum shutter speed TV (electrical charge accumulation time, integration time), based on the digital brightness data.

When the release button 24 which is connected to the MPU 14 is turned ON to commence the recording, MPU 14 performs the calculation of the diaphragm value and the shutter speed, based on the brightness data, the control of the diaphragm 16 through the diaphragm adjusting circuit 23, the drive of the CCD image pick-up device 11, and the recording of the picture signal, etc.

The accumulation control signal, the relatively slow drive pulses (accumulation control signal) and the high speed drive pulses (sweep signal) are outputted from the clock generator 13. The accumulation control signal and the drive pulses are fed to the electronic shutter control circuit 51 through the CTG and CV1~CV4, respectively.

There are two kinds of transfer pulses and two kinds of drive pulses. Namely, the first kind are the periodical accumulation control signal and the drive pulses (read pulses) which are periodically (about 1/60 second interval) outputted. The second kind are the compulsive transfer pulses (sweep control signal) and the high speed drive pulses (sweep pulses) which are outputted when the transfer demand signal is issued from the outside (MPU 14). The high speed drive pulses are outputted at a predetermined time when the sweep demand signal from the MPU 14 is inputted.

The accumulation control signal and the drive pulses sent to CTG and CV1~CV4 from the clock generator 13 are inputted to the CCD image pick-up device 11 through electronic shutter control circuit 51, driver 12 and ΦV1~ΦV4. The pulses outputted to the ΦV1~ΦV4 become transfer pulses, so that the electrical charges accumulated in the photodiodes 11a of the CCD image pick-up device 11 are transferred to the vertical transfer portions 11b at one time.

The high speed drive pulses outputted to CV1~CV4 are inputted as the sweep pulses to CCD image pick-up device 11 through electronic shutter control circuit 51, the driver 12 and ΦV1~ΦV4. Consequently, the electrical charges transferred to the vertical transfer portions 11b are swept into the sweeping drain 11d at high speed.

The horizontal and vertical drive pulses are outputted from the clock generator 13, as the read pulses for reading the signal charges transferred to the vertical transfer portios 11b. The vertical drive pulses are outputted through CV1~CV4. A detailed explanation of the horizontal drive pulses for the horizontal transfer, which are not important in the present embodiment is not given herein.

The drive pulses outputted through CV1~CV4 become transfer pulses, the read pulses, or the sweep pulses, in accordance with the level of the accumulation control signal of the CTG.

MPU 14 generally controls the whole operations of the apparatus of the invention and outputs the accumulation control signal, the sweep signal, and switching signal, as control signals. The compulsive accumulation control signal, and switching signal are outputted to the electronic control circuit 51 through PTG and PS, respectively. The sweep demand signal is outputted to clock generator 13 through the PHV.

When the compulsive accumulation control signal PTG is outputted to the electronic shutter control circuit 51 from the MPU 14 (i.e., when the level becomes "L"), the transfer signal is outputted from the driver 12 to transfer the electrical charges of the photodiodes 11a to the vertical transfer portions 11b. When the sweep demand signal PHV is inputted to the clock generator 13 (when the level becomes "L"), the high speed drive pulses and the sweep signal are outputted from the clock generator 13 and the driver 12, respectively.

The output of the electronic shutter control circuit 51 is switched in accordance with the level ("H" or "L") of the switching signal PS to determine to send the drive pulses from the clock generator 13 to the driver 12 or to send the drive pulses in response to the compulsive accumulation control signal from MPU 14.

The drive pulses, the pulses and the high speed drive pulses are outputted from the electronic shutter control circuit 51 to the driver 12 through V1~V4, and the accumulation control signal is outputted through TG.

The transfer pulses, read pulses or sweep pulses are outputted from the driver 12 to the CCD image pick-up device 11 through ΦV1~ΦV4.

Figure 24:
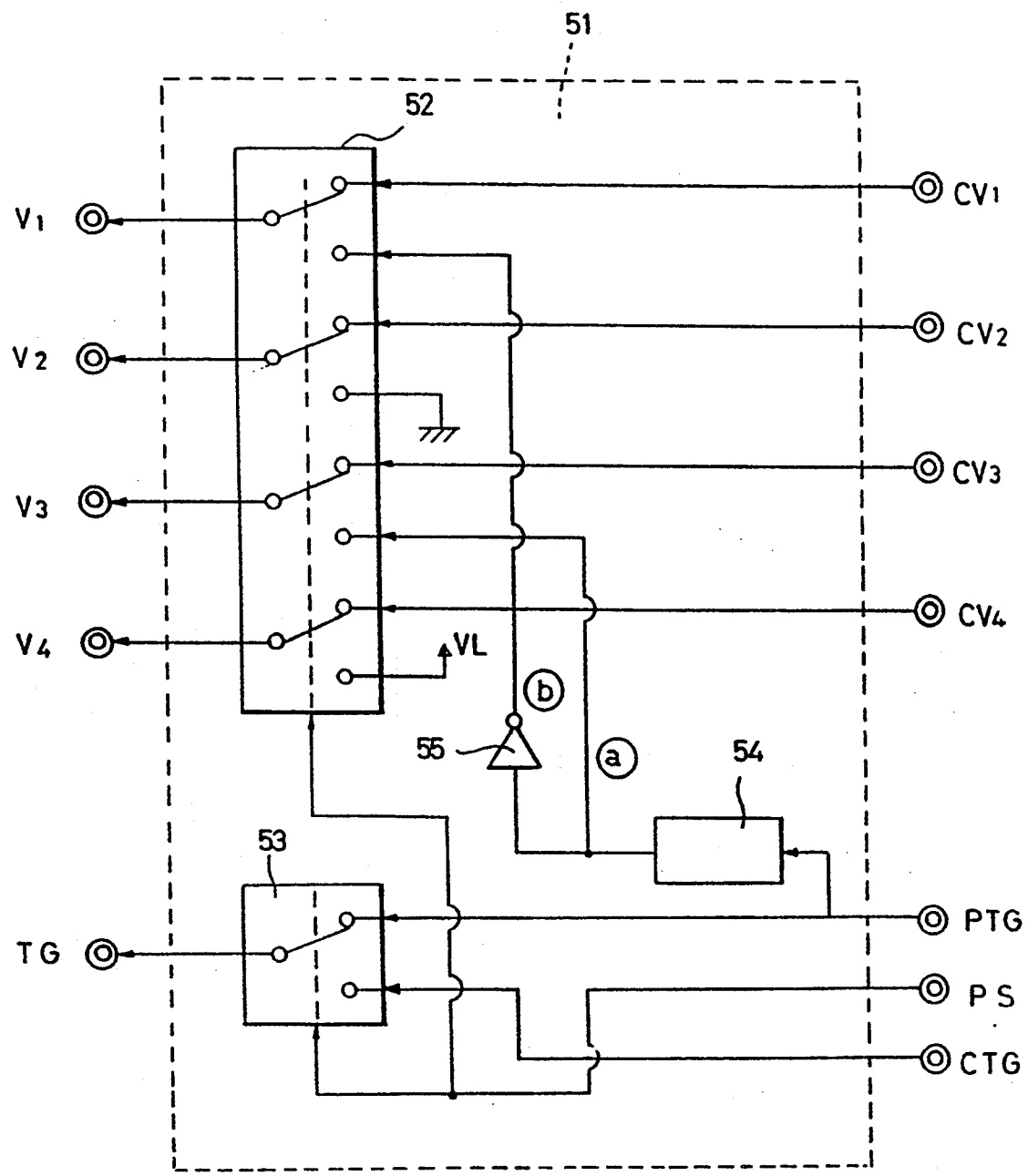
FIG. 24 is a diagram of an electronic shutter control circuit on the driving apparatus shown in FIG. 23.

As can be understood from the above description, the input of the electronic shutter control circuit 51 is switched in accordance with the switching signal PS of MPU 14. A detailed arrangement of the electronic shutter control circuit 51 is shown in FIG. 24. The electronic shutter control circuit 51 has a first switching circuit 52 and a second switching circuit 53. The first switching circuit 52 has four pairs of input and output terminals, each pair having a pair of input terminals and one output terminal. The second switching circuit 53 has a pair of input and output terminals, having two input terminals and one output terminal.

Terminals (lines) CV1~CV4 of the clock generator 13 are connected to the input terminals of the pair of input terminals of the first switching circuit 52. Corresponding output terminals of the first switching circuit 52 are connected to terminals (lines) V1~V4.

PTG of MPU 14 and the CTG of clock generator 13 are connected to the input terminals of the second switching circuit 53. The PTG is also connected to the other input terminal of the pair of input terminals, one of which is connected to terminal CV3 through the monostable multivibrator 54. The output terminal of a monostable multivibrator 54 is also connected to an input terminal of the pair of input terminals, one of which terminal CV1 of the first switching circuit 52 is connected through an inverter 55. Namely, the input terminals of the first switching circuit 52 are connected to the terminal CV1, inverter 55, terminal CV2, GND (ground), terminal CV3, mono-multiplier 54, terminal CV4 and terminal VL, respectively.

The switching signal input terminals of the first and second switching circuits 52 and 53 are connected to terminal (line) PS of the MPU 14. Namely, the switching operation of the first and second switching circuits 52 and 53 is restricted by the switching signal which is outputted from the MPU 14 through PS. When the switching signal (terminal) PS is "H", the first and second switching circuits 52 and 53 are connected to CV1~CV4 and CTG, respectively. When the switching signal (terminal) PS is "L", the first switching circuit 52 is connected to inverter 55, the GND, the monostable multivibrator 54 and the terminal VL, and the second switching circuit 53 is connected to terminal PTG.

The operation of the driver 12 when the electrical charges of the photodiodes 11a are transferred to the vertical transfer CCDs 11b will be explained below with reference to FIGS. 25 and 26.

Figure 2B:
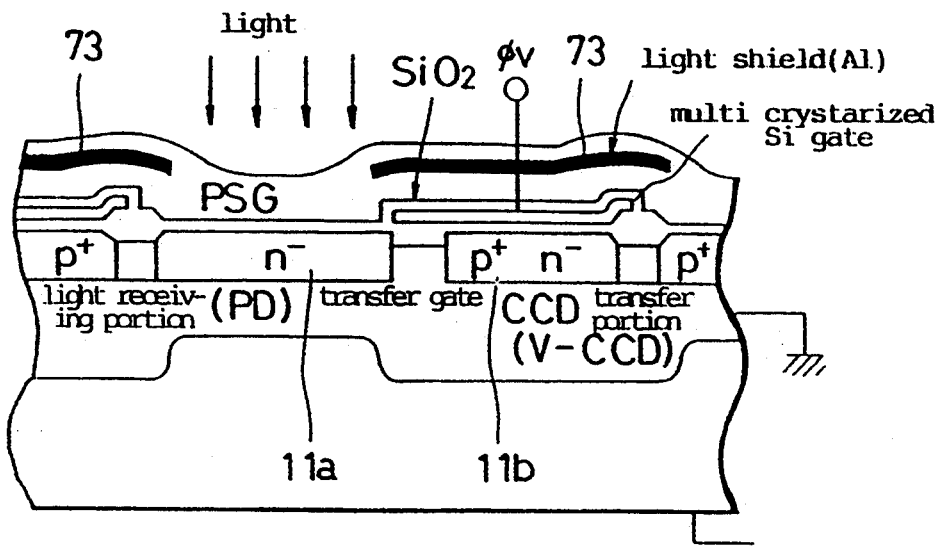
FIG. 2B is an enlarged sectional view taken along the line IIB—IIB in FIG. 2A.
Figure 2A:
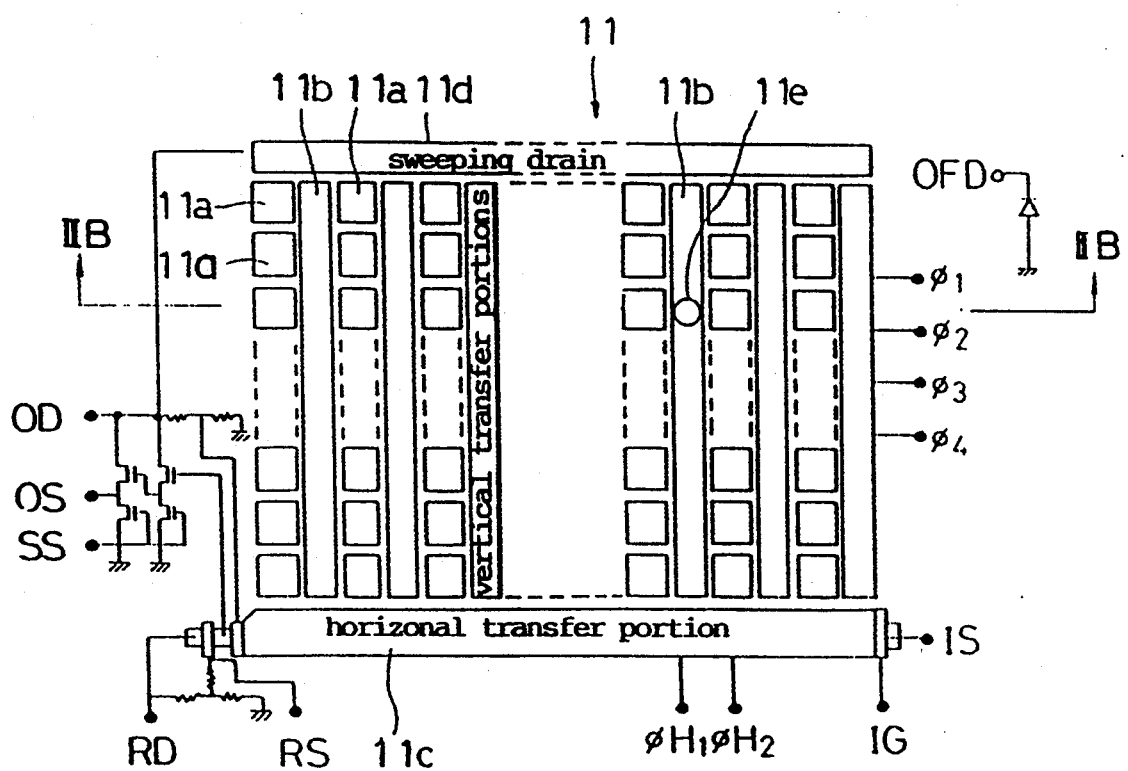
FIG. 2A is a front elevational view of an inter-line transfer type of CCD image pick-up device which is driven by a driving apparatus according to the present invention.
Figure 25:
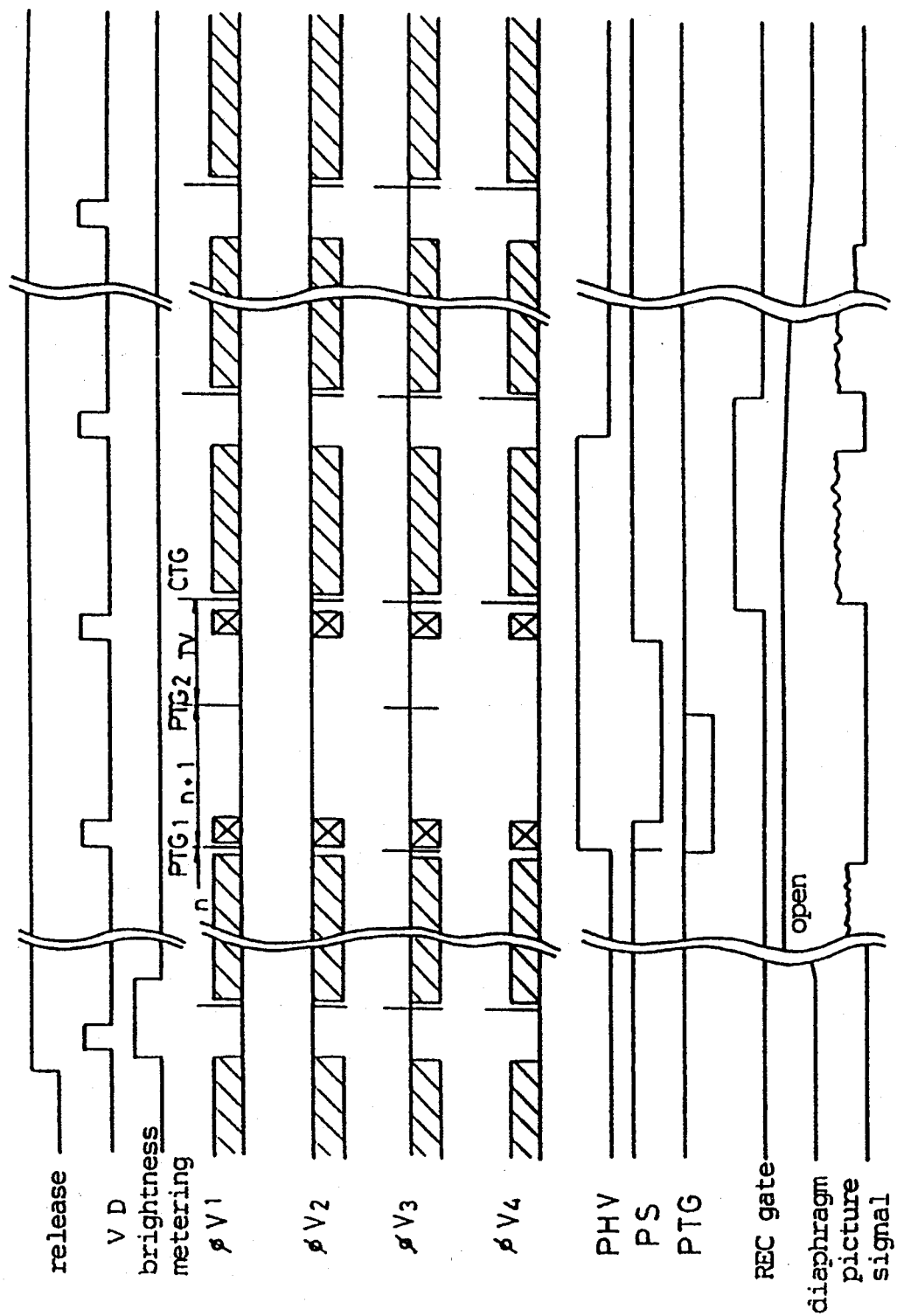
FIG. 25 is a timing chart of components of the driving apparatus shown in FIG. 23.

FIG. 25 shows a timing chart of the outputs of driver 12 when the compulsive accumulation control signal PTG is outputted, and FIG. 2B shows a timing chart when the periodical accumulation control signal CTG is outputted.

When the compulsive accumulation control signal PTG is outputted (i.e. when the level is "H"), the input terminals of the first switching circuit 52 are connected to inverter 55, GND, the monostable multivibrator 54 and the terminal VL, respectively, and the input terminal of the second switching circuit 53 is connected to PTG. Consequently, output b of inverter 55 is outputted from the terminal V1 of the first switching circuit 52, GND from terminal V2, and the output a of the monostable multivibrator 54 from the terminal V3, respectively. The compulsive accumulation control signal PTG is outputted from terminal TG.

When the compulsive accumulation control signal PTG is "H", the output a of the monostable multivibrator 54 is "L", and output b of the inverter 55 is "H". Namely, the level of the ΦV1 is opposite to the level of ΦV3.

When the compulsive accumulation control signal PTG is descended to be "L", switching element 31 of the driver 12 is switched to be connected to terminal VL, and accordingly, ΦV3 becomes VL, so that the electrical charges accumulated in the photodiodes of the first field are transferred to the vertical transfer portions 11b.

When the compulsive accumulation control signal PTG is ascended to be "H", switching element 30 of the driver 12 is switched to be connected to terminal VM, and accordingly, ΦV3 returns to GND, so that the monostable multivibrator 54 starts with a predetermined delay time. As a result, output a of the monostable multivibrator 54 becomes "H", and the output b of the inverter 55 becomes "L". Consequently, ΦV1 becomes VM, and ΦV3 becomes VL. The operation of the monostable multivibrator 54 mentioned above is maintained for a certain period of time.

When the compulsive accumulation control signal PTG is descended to be "L" again, the switching element 30 is turned to VH, and accordingly, ΦV1 becomes VL and the electrical charges accumulated in the photodiodes of the second field are transferred to the vertical transfer portions 11b.

Output a of the monostable multivibrator 54 is returned to the initial position and output b of the inverter 55, ΦV1 and ΦV3 are returned to their initial positions in the lapse of a predetermined time after the compulsive accumulation control signal PTG is ascended to be "H".

Figure 26:
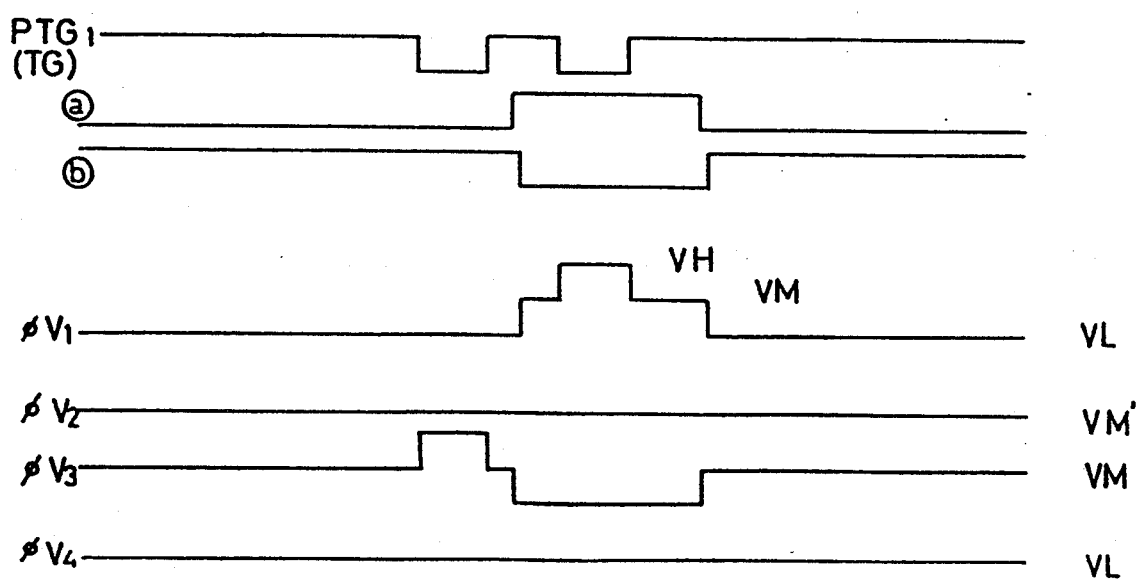
FIG. 26 is a detailed timing chart of FIG. 25, especially at the output of the compulsive accumulation control signals.
Figure 28:
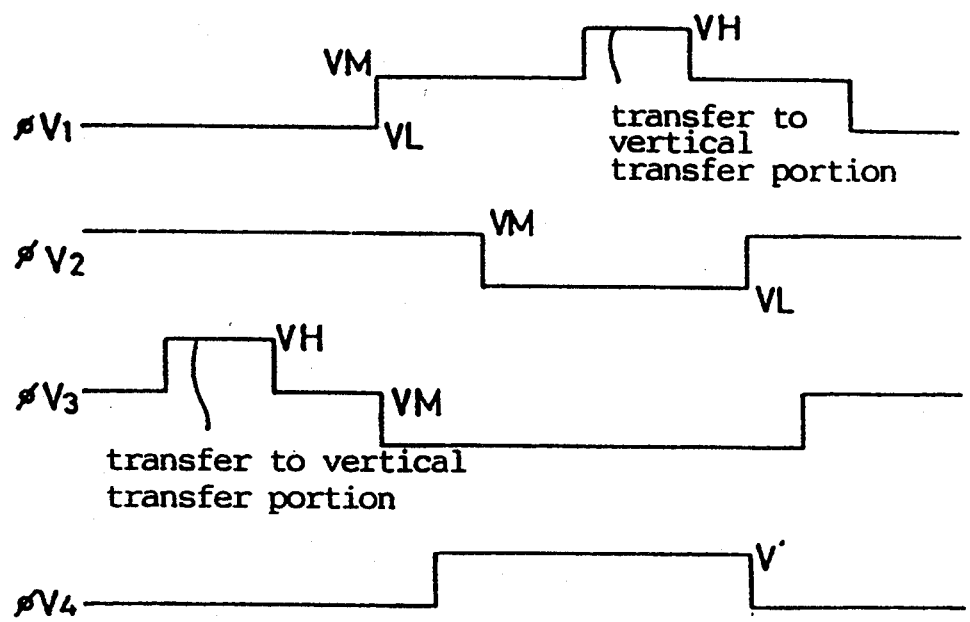
Figure 29:
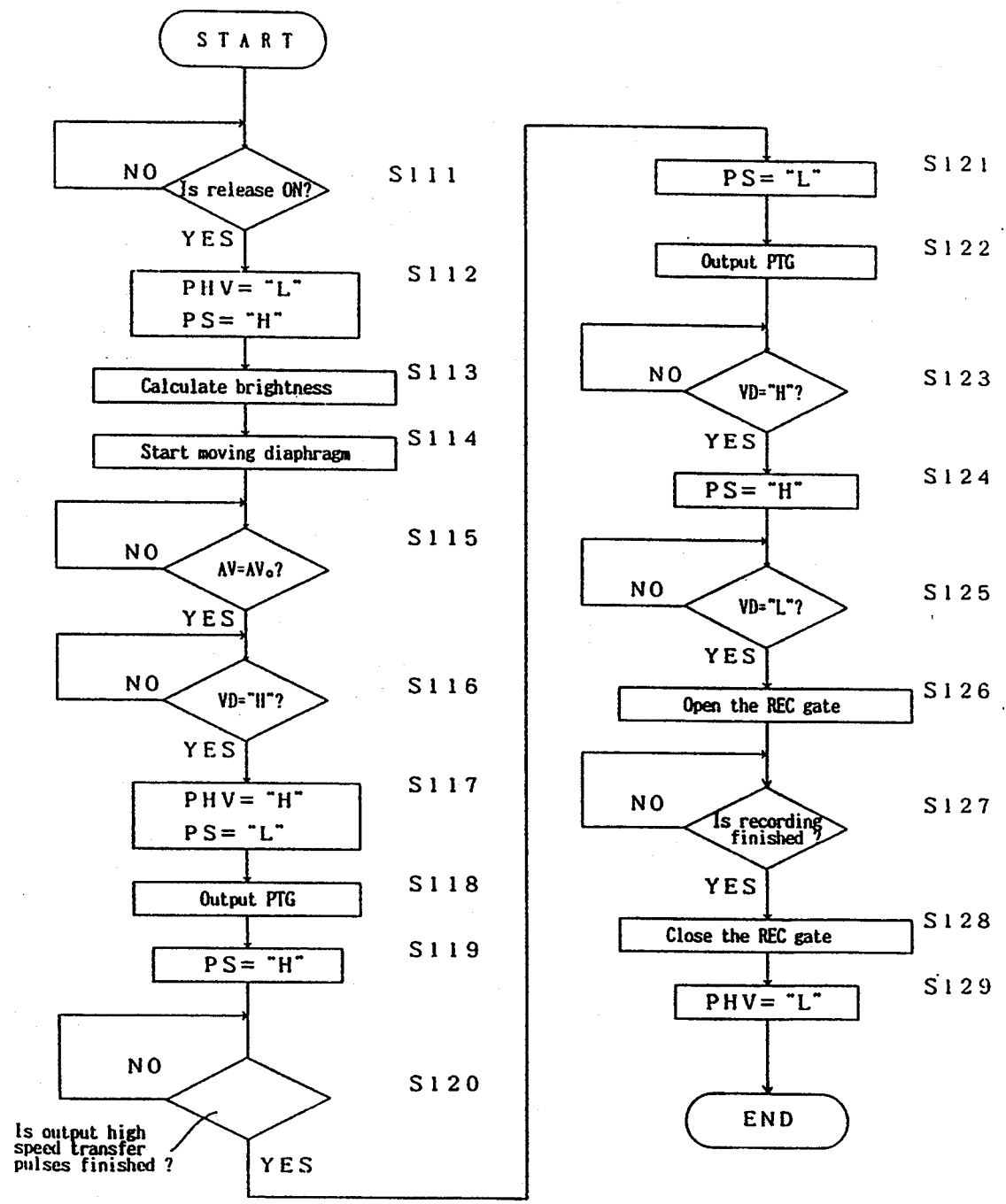
FIG. 29 is a flow chart of operations of an electronic shutter according to the present invention.

The drive pulses of ΦV1 and ΦV3 which are three-valued signals become the transfer pulses at the highest level VH to transfer the electrical charges accumulated in the photodiodes 11a to the vertical transfer portions 11b (FIGS. 26 and 28). The compulsive accumulation control signal PTG is produced in the fashion of hardware by the electronic shutter control circuit 51 and the driver 12, as mentioned before.

Figure 27:
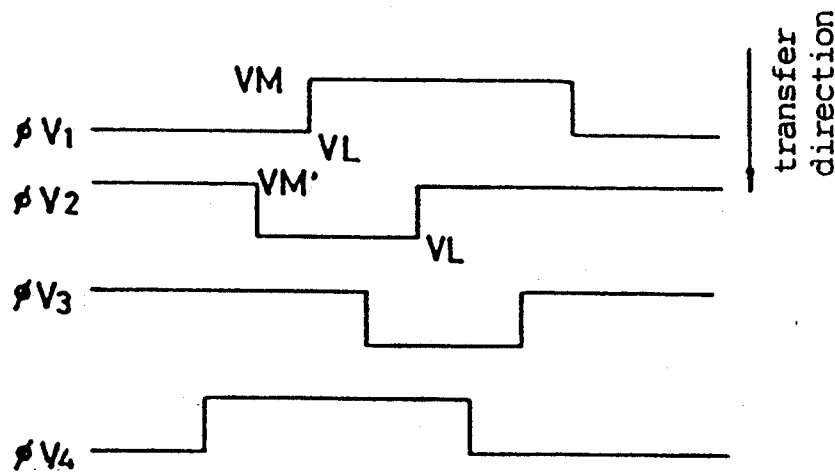
FIGS. 27 and 28 are timing charts of vertical transfer pulses and transfer pulses outputted by respective drivers.

When the levels of the drive pulses ΦV1~ΦV4 are VM, VM' and VL, they are read pulses (vertical transfer pulses) to successively transfer the electrical charges of the vertical transfer portions 11b (FIG. 27).

The electronic shutter operation of the control apparatus of the image pick-up device as constructed above will be discussed below in detail, with reference to FIG. 29 and FIGS. 23, and 25 to 28.

When the release button 24 is turned ON, MPU 14 turns the sweep demand signal and switching signal PS to "L" and "H", respectively (steps S111 and S112). As a result of this, the periodical accumulation control signal CTG and the drive pulses CV1~CV4 are outputted from the driver 12 at an interval of 1/60 second.

MPU 14 performs the calculations to obtain the optimum diaphragm value AVo and shutter speed TV, based on the brightness data of the object which is detected by the brightness metering device 22 (step S113). After that, the diaphragm control circuit 23 controls the diaphragm 16 to have the optimum diaphragm value (steps S114 and S115).

When the adjustment of diaphragm 16 is finished, MPU 14 turns the switching signal PS and the compulsive accumulation control signal PHV to "L" and "H", respectively, after the VD pulse becomes "H" (steps S116 and S117). Thus, the compulsive accumulation control signal PTG and the drive pulses can be outputted from the electronic shutter control circuit 51.

After that, MPU 14 outputs the compulsive accumulation control signal PTG (step S118). Consequently, the compulsive accumulation control signal PTG and the drive pulses are outputted from the electronic shutter control circuit 51, and the transfer pulses are outputted from the driver 12, so that the unnecessary electrical charges accumulated in the photodiodes 11a in the field n are transferred to vertical transfer portions 11b.

After that, MPU 14 turns the switching signal PS to "H" (step S119). As a result, the high speed drive pulses are outputted at a predetermined timing from the clock generator 13 through the electronic shutter control circuit 51 to sweep the unnecessary electrical charges which are transferred to vertical transfer portions 11b. MPU 14 turns the switching signal PS to "L", after the output of the high speed drive pulses is finished (step S120,S121). Thus, the connection of the input terminal of the electronic shutter control circuit 51 is switched to the MPU 14 from the clock generator 13.

MPU 14 outputs the compulsive accumulation control signal PTG when the optimum shutter speed TV, which is calculated at step S113, is obtained (step S122). As a result, the unnecessary electrical charges which are accumulated in the photodiodes 11a of the CCD image pick-up device 11 in field n+1 are transferred to the vertical transfer portions 11b to commence the exposure.

The time at which the compulsive accumulation control signal PTG is outputted can be calculated, based on the time at which the subsequent periodical accumulation control signal is outputted from the clock generator 13 when the shutter speed TV is larger than 1/60 second, and based on the time at which the several periodical accumulation control signals are outputted when the shutter speed is smaller than 1/60 second, respectively.

MPU 14 turns the switching signal PS to "H" after the VD pulse becomes "H" (steps S123 and S124). As a result, the high speed drive pulses from the clock generator 13 are inputted into the CCD image pick-up device 11, so that the unnecessary electrical charges of the vertical transfer portions 11b are swept, since the sweep demand signal PHV is "H" when control signal CTG is outputted.

MPU 14 returns the sweep demand signal PHV to "L" after the switching signal is set at "H" and after the output of the high! speed sweep signal is completed to open the REC gate (steps S125~S127). The operations mentioned above allow the signal charges read by the CCD image pick-up device 11 to be recorded.

After the VD pulse is descended, the periodical accumulation control signal CTG and the drive pulses CV1~CV4 are outputted from the clock generator 13, so that the signal charges accumulated in photodiodes 11a in the exposure time are transferred to the vertical transfer portions 11b. After that, the signal charges are read by the read pulses which are periodically outputted from the clock generator 13.

When the signal charges are transferred to the vertical transfer portions 11b, MPU 14 opens the REC gate (steps S125 and S126). As a result, the signal charges read by the CCD image pick-up device 11 are recorded as a picture signal on the magnetic disk 17 through the recording and play back portion 18.

Upon the completion of recording, MPU 14 closes the REC gate and changes the sweep demand signal PHV to "L". After that, the control proceeds to END process, and waits until the release button 24 is depressed (steps S127 to S129).

As can be seen from the above discussion, according to the present invention, no drive pulse for driving the CCD image pick-up device 11 is outputted from MPU 14. Namely, MPU 14 outputs only three kinds of signals, i.e., the compulsive accumulation control signal PTG, the sweep demand signal, and the switching signal PS.

Therefore, the number of output ports of MPU 14 which must be used to drive the CCD image pick-up device 11 can be decreased, resulting in a simple software program. The increased number of remaining output ports can be used for another purpose.

It should be appreciated that according to the present embodiment, all of the drive signals necessary for driving the image pick-up device are outputted from the pulse signal outputting device. Since only the control signals for controlling the drive signals outputted from the pulse signal outputting device are outputted from the control device, the number of signals which are produced by the control device and the number of the output ports can be decreased, resulting in a simplified control device.

In an embodiment of the present invention, the output of the CCD image pick-up device 11 is connected to a smear detecting A/D converter 28 through low pass filter 27 which eliminates carrier signals. The A/D converter 28 converts the signals output from the CCD image pick-up device 11 to digital signals as a unit of pixel or a unit of pixels to be output to the MPU 14.

MPU 14 stores and adds the digital signals as a unit of row. After the signals for one picture plane are added and stored, whether or not the stored signals are above a predetermined value (level) is checked to detect the possibility of a smear.

The image pick-up operation of the present invention will be described below with reference to FIG. 32 (also see FIGS. 1, 2A, 2B, 30 and 31).

The image pick-up operation is performed by the MPU 14 in accordance with the program stored therein.

Figure 32:
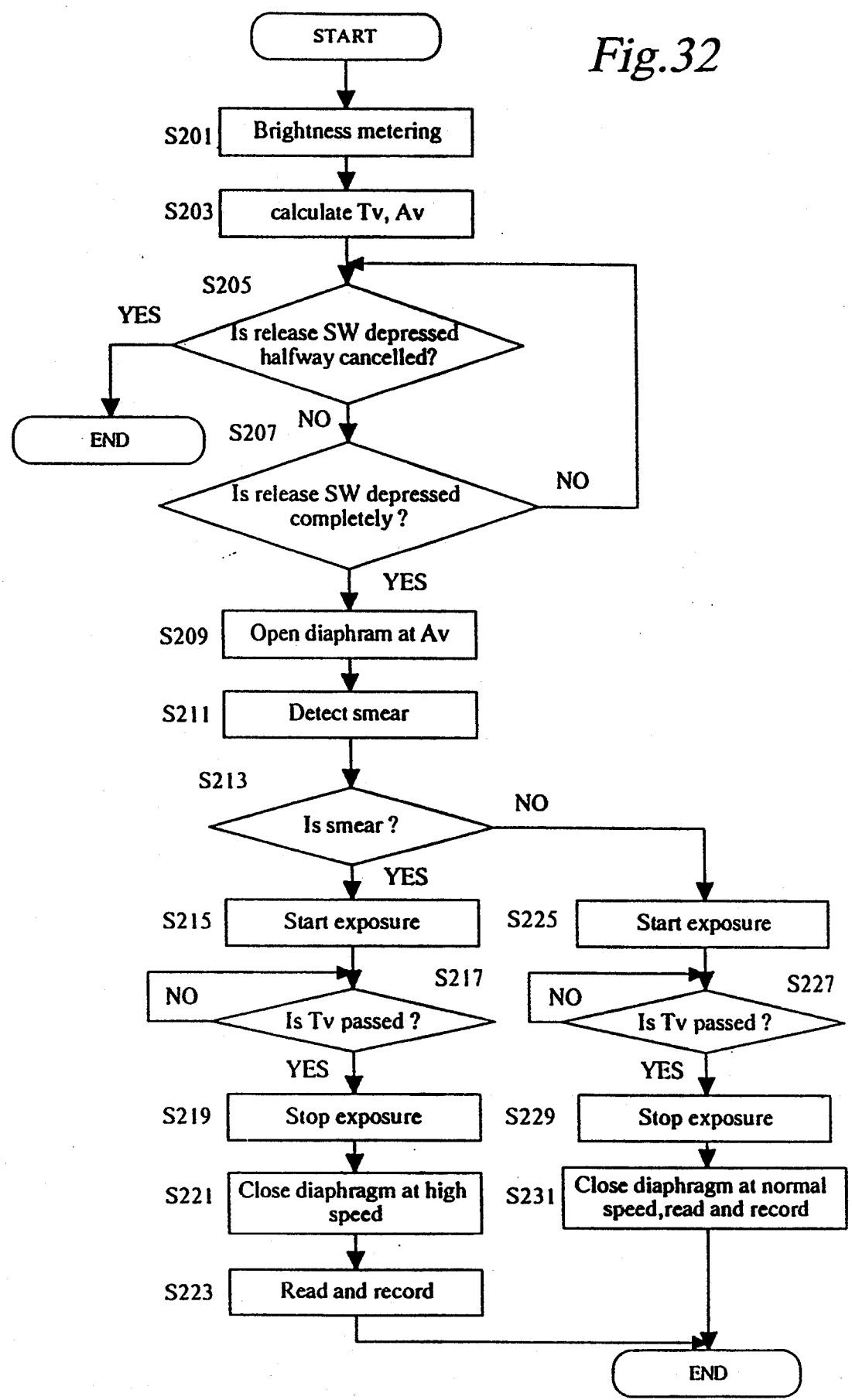
FIG. 32 is a flow chart of the operation of a still video camera according to the present invention.
Figure 35:
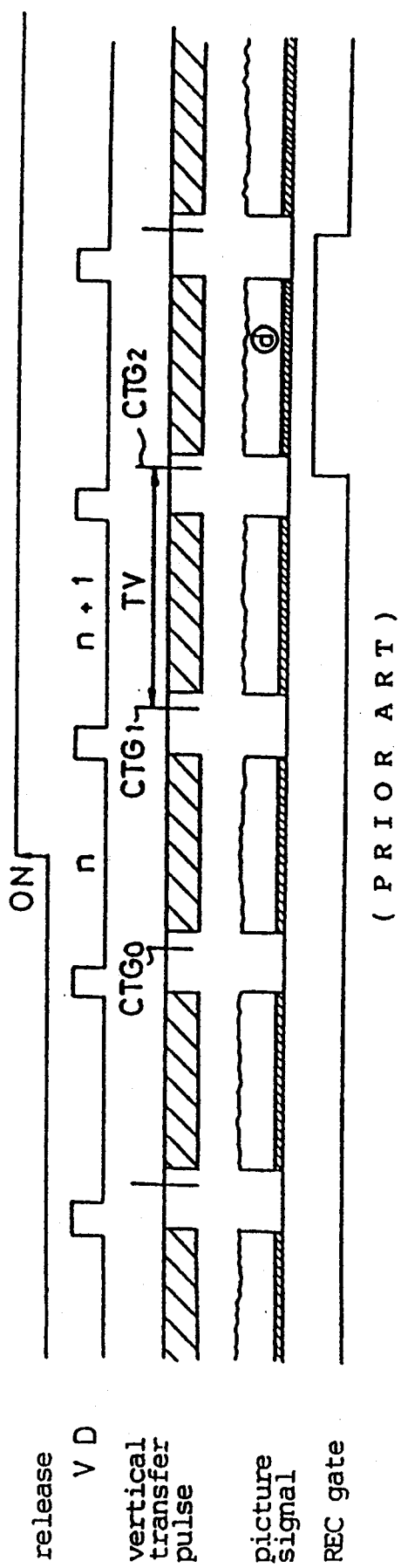

When the release switch 24 is pushed down by a half step, the external exposure measurement is performed using the photometering element 21 (step S201), in accordance with the routine shown in FIG. 32. Thereafter, MPU 14 performs the arithmetic operation to obtain the diaphragm value Av and the exposure time TV, in accordance with the photometric signals output from the photometering portion 22 based on the output of the photometering element 21 which receives the object light reflected by the object to be taken (step S203).

When the release switch 24 is pushed down by a half step, MPU 14 rotates the magnetic disc 17 at a predetermined speed and drives the clock generator 13 to commence the normal driving operation of the image pick-up element. Namely, the clock generator 13 periodically outputs the periodical reading pulses CTG, the periodical transfer pulses CTG, the periodical reading pulses CTG, and so on.

MPU 14 checks the operational state of the release switch 24 at step S205. If no release switch 24 does not continue to be pushed down by a half step, the control ends. If the release switch 24 continues to be pushed down by a half step, the AE lock is maintained (the shutter speed TV and the diaphragm value AV, based on the exposure measurement are maintained), and the control does not proceed until the release switch 24 is pushed down by full step. If the release switch 24 is pushed down by full step at step S207, the control proceeds to step S209.

At step S209, the MPU 14 drives the diaphragm driving circuit 23 in accordance with the calculated diaphragm value AV to open the diaphragm 16 at the diaphragm value AV. As a result, an image of the object which is incident on the photographing lens 15 and transmitted through the diaphragm 16 is formed on each of the photodiodes of the CCD image pick-up device 11.

When the diaphragm 16 is opened at a predetermined diaphragm value AV, the MPU 14 switches the level of the switching pulses PS to level "LOW," and switches the multiplexer 20B and the switching circuit 20A to be connected to the MPU 14. Furthermore, the MPU 14 outputs the reading pulse PTG1 to transfer the electric charges accumulated in the photodiodes 11a to the vertical transfer portions 11b. Thereafter, the level of the switching pulses Ps is returned to level "High." Thus, the CCD image pick-up element (device) 11 begins receiving the light (exposure) at a predetermined diaphragm value AV.

During this operation, the MPU 14 converts the sweeping-ON pulses PHV to level "High" to cause the clock generator 13 to periodically output the sweeping pulses. Consequently, the electric charges transferred to the vertical transfer portions 11b are swept through the sweeping drain 11d.

Upon completion of the sweeping operation, the electric charges accumulated in the vertical transfer portions 11b are read in accordance with the periodical transfer pulses output from the clock generator 13. The read signals are converted to digital signals by the A/D converter 28 and are then fetched by MPU 14 to integrate and memorize the digital signals for every vertical row, i.e., for every vertical transfer portion 11b (step S211).

When the signals of all the vertical transfer portions 11b are read and memorized, whether or not the level of the signals is above a predetermined level is checked for every vertical transfer portion 11b (steps S211 and S218). If high intensity of light is incident upon, for example, the light receiving portion 11e or the vicinity thereof in FIG. 2, unnecessary electric charges overflow into the area 11e of the adjacent vertical transfer portion 11b. Consequently, the signals of the upper portion read through the area 11e include the unnecessary or harmful electric charges. This appears as a smear on the picture plane 74 on which area 11e is represented by a portion 75 and the portion above area 11e is represented by a portion 76 located below the portion 75, as shown in FIG. 33A. The levels of the signals for every vertical transfer portion 11b are as shown in FIG. 33B. As can be seen in FIG. 33B, if there is a vertical transfer portion 11b having a level above a predetermined value (level), there is a possibility of the occurrence of smear. Conversely, if there is no vertical transfer portion 11b having a level higher than a predetermined level, there is no or almost no possibility of the occurrence of smear.

In the illustrated embodiment, the detection of the smear is continuously effected twice. The portion of the vertical transfer portion 11b located below the area 11e holds the electric charges which are transferred through the area 11e. Namely, the unnecessary electric charges are mixed when the signal charges pass through the area 11e. Accordingly, the smear occurs also in the portion located below area 11e. This appears on the reproduced image plane 74, as shown in FIG. 34A, in which the image of the area 11e is designated at 75 and the portion below the area 11e is designated as a smear 77 appearing above the portion 75, respectively.

The portion above the area 11e of the vertical transfer portion 11b appears as a smear 76 below the portion 75, similarly to the first detection (reading) of the smear shown in FIG. 33A., Therefore, in the second detection (reading), the unnecessary electric charges are included in all the portions above and below the area 11e. If the signal charges including the unnecessary (harmful) charges mixed therein are reproduced, the smears 76 and 77 appear above and below the portion 75, as shown in FIG. 34A. The levels of the added vertical transfer portions 11b are as shown in FIG. 34B.

Consequently, possible smears of the portions above and below the area 11e can be certainly detected by the two detections. Furthermore, the quantity of the collected harmful electric charges is increased by the two detections, thus resulting in an increase in precision of detection of the smear.

Figure 30:
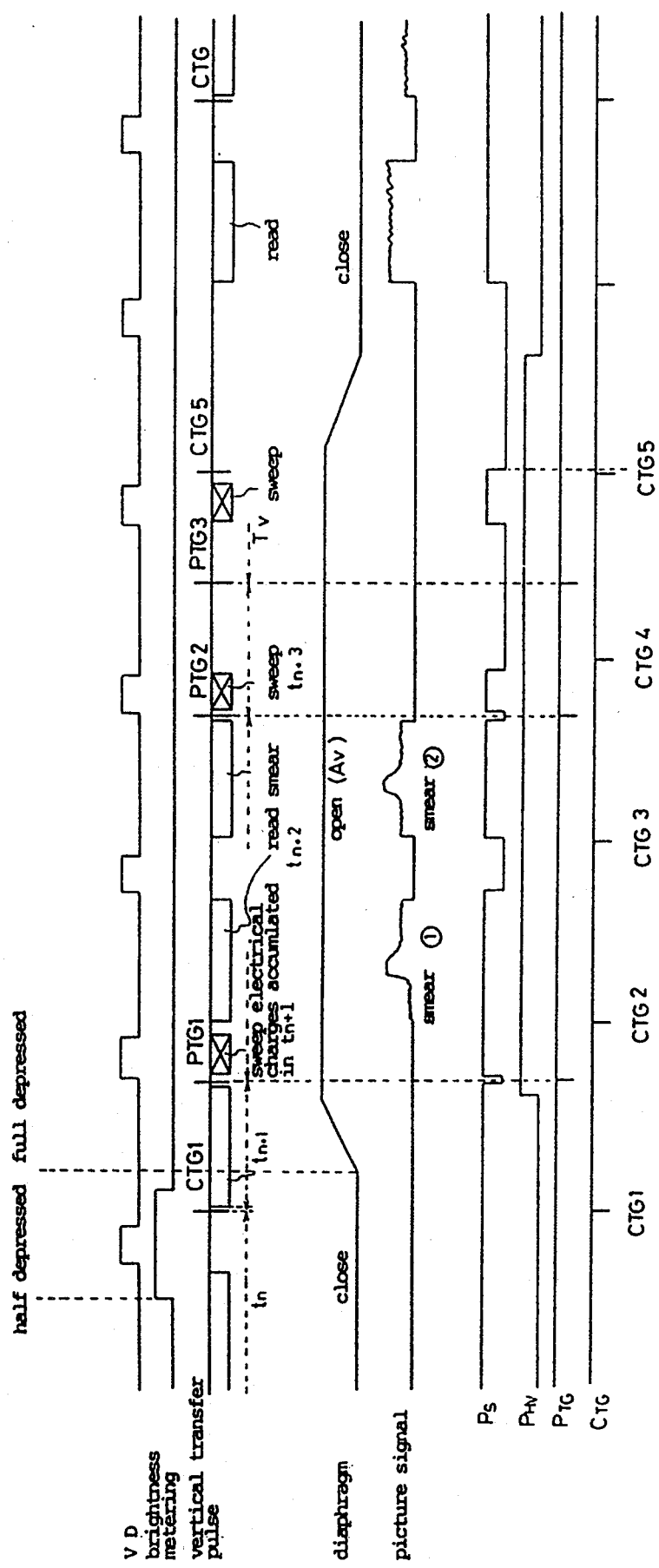
FIGS. 30 and 31 are timing charts of release operations of a still video camera according to the present invention, in cases where there is a possibility of the occurrence of smear and where there is no possibility of the occurrence of smear, respectively.
Figure 31:
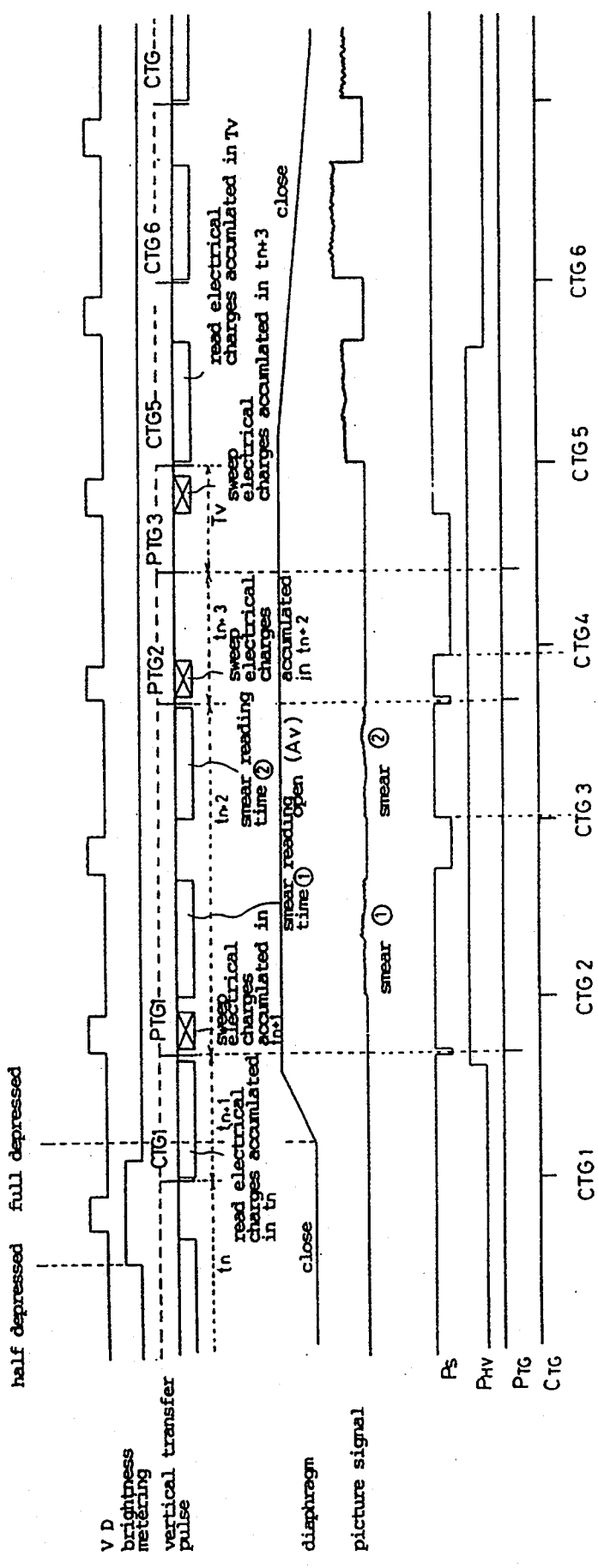

If there is a possibility of the occurrence of a smear, the reading and recording operations are commenced after the diaphragm 16 is closed at a high speed, upon the completion of the exposure, as shown in FIG. 30 (steps S213, S215, S219, S221 and S223 in FIG. 32). Conversely, if there is no possibility of smear, the reading is effected while closing the diaphragm 16 at a normal speed upon completion of the exposure, as shown in FIG. 31 (steps S213, S225, S227, S229 and S231 in FIG. 32).

In the exposure commencement process at step S215, the switch pulse PS is switched to level "Low" to output the reading pulse PTG2, so that the unnecessary electric charges accumulated in the photodiodes 11a are transferred to the vertical transfer portions 11b. Thereafter, the switch pulse PS is returned to level "High," and the electric charges transferred to the vertical transfer portions 11b are swept into the sweeping drain 11d in accordance with the sweeping signals which are periodically output from the clock generator 13. After that, the switching pulses PS are converted to level "Low."

Reading pulse PTG3 is outputting at the exposure time TV before the output of the subsequent periodical reading pulse CTG5 from the clock generator 13 to transfer the unnecessary electric charges accumulated in the photodiodes 11a to the vertical transfer portions 11b, thereby to commence the exposure. Switching pulses PS are returned to level "High" after the output of the reading pulse PTG3, so that the unnecessary electric charges transferred to the vertical transfer portion 11b are swept into the sweeping drain 11d in accordance with the periodically output sweeping signals.

After the lapse of the exposure time TV, the reading pulse CTG5 is outputted, so that the signal charges accumulated in photodiodes 11a the exposure time TV are transferred to the vertical transfer portions 11b.

After the periodical reading pulse CTG5 is outputted (after the lapse of the exposure time TV), MPU 14 converts the switching pulses PS to level "Low" and closes the diaphragm 16 at a high speed (FIG. 30). After the periodical reading pulse CTG5 is outputted and the diaphragm 16 is completely closed, the switching pulses PS are returned to level "High" prior to the output of the periodic transfer pulses. Thus, the signal charges transferred to the vertical transfer portions 11b are read by the periodical transfer pulses.

MPU 14 processes the signal charges thus read in the recording and reproducing portion 18 and then records them on the magnetic disc 17.

As can be understood from the foregoing, according to the present invention, when there is a possibility of the occurrence of a smear, the signal charges are held in the vertical transfer portions 11b until the diaphragm 16 is completely closed upon completion of the exposure to prevent the occurrence of a smear.

When there is no possibility of smear, the control proceeds to step S225 from step S213.

MPU 14 converts the switching pulses PS to level "Low" and is connected to the CCD image pick-up device 11. Thereafter, the reading pulse PTG2 is outputted to transfer the unnecessary electric charges accumulated in the photodiodes 11a to the vertical transfer portions 11b. When the unnecessary electric charges of the photodiodes 11a are transferred to the vertical transfer portions 11b, MPU 14 returns the switching pulses PS to level "High" and connects the clock generator 13 to the CCD image pick-up device 11. Thus, the unnecessary electric charges of the vertical transfer portions 11b are swept into the sweeping drain 11d in accordance with the sweeping pulses which are periodically outputted from the clock generator 13.

Upon completion of the output of the sweeping pulses, MPU 14 converts the switching pulses PS to level "Low" and is connected to CCD image pick-up device 11.

Thereafter, the MPU 14 outputs the reading pulse PTG3 at the exposure time TV before the output of the subsequent periodical reading pulse CTG5 to transfer the unnecessary electric charges accumulated in the photodiodes 11a to the vertical transfer portions 11b in order to commence the exposure.

After the commencement of the exposure and before the output of the sweeping signals from the clock generator 13, MPU 14 returns the switching pulse PS to level "High" and connects the clock generator 13 to the CCD image pick-up device 11. Thus, the unnecessary electric charges transferred to the vertical transfer portions 11b are swept therefrom in accordance with the sweeping pulses outputted from the clock generator 13.

After the lapse of the exposure time TV, the signal charges accumulated in the photodiodes 11a are transferred to the vertical transfer portions 11b in accordance with the periodical reading pulse CTG5 outputted from the clock generator 13 to finish the exposure.

Upon completion of the exposure, MPU 14 commences the stop-down operation of the diaphragm 16 at a normal speed (FIG. 31). During the stop-down, the signal charges transferred to the vertical transfer portions 11b are read by the periodical transfer pulses outputted from the clock generator 13. The read signal charges are subject to a predetermined process in the recording and reproducing portion 18 and are then recorded on the magnetic disc 17.

As can be seen from the above discussion, according to the present invention, the electric charges accumulated in the vertical transfer portions 11b are read after the diaphragm is opened to a predetermined diaphragm value AV and immediately before the exposure commences to check the level of the charges integrated for every vertical transfer portion 11b to thereby detect the possibility of the occurrence of smear. If there is a possibility of the occurrence of smear, the signal charges are read after the diaphragm is quickly closed at a high speed. Accordingly, the signal charges are prevented from being mixed with the unnecessary electric charges during the reading operation, thus resulting in the prevention of the occurrence of smear. Conversely, if there is no possibility of smear, since the exposure and the recording are normally effected while closing the diaphragm at a normal speed (low speed), the stop-down operation of the diaphragm requires less battery power with substantially no voltage change, thus reducing malfunctioning of other electronic circuits.

Although the electric charges accumulated in the vertical transfer portions are read twice to detect the smear in the illustrated embodiments, the number of detections (reading operations) is not limited to two and can be less or more than two.

The image pick-up element is not limited to the illustrated type of CCD image pick-up element as described above and can be of any inter-line type of CCD image pick-up element.

As can be understood from the foregoing, in a still video camera including an image pick-up element having vertical transfer portions, according to the present invention, the signals which are accumulated in the vertical transfer portions are read before the exposure to detect the possibility of a smear. If there is a possibility of the occurrence of a smear, since the signal charges are read after the diaphram is quickly closed at a high speed, no smear occurs. On the other hand, if there is no possibility of a smear, the reading is effected while closing the diaphragm at a low speed, thus resulting in substantially no change in voltage, a low possibility of malfunctioning of other electronic circuits, and a reduced power consumption. Furthermore, according to the present invention, a compact and inexpensive still video camera can be easily comprised of a conventional CCD image pick-up device, with a slight modification to the software of the control circuit.

The present disclosure relates to the subject matter contained in Japanese Patent Applications Nos. 63-317374 (filed Dec. 15, 1988), 63-317904 (filed Dec. 16, 1988), 63-320004 (filed Dec. 19, 1988), 63-322518 (filed Dec. 21, 1988), 63-322519 (filed Dec. 21, 1988), 63-322520 (filed Dec. 21, 1988) and 1-296997 (filed Nov. 15, 1989), all of which are expressly incorporated herein by reference in their entireties.

We claim:

1. In a still video camera having an image pick-up device having a light receiving surface, said image pick-up device being provided on said light receiving surface with arrays of photoelectric elements and vertical transfer portions which are adjacent to said arrays of photoelectric elements, a photographing lens for forming a focused image of an object to be taken on said light receiving surface of said image pick-up device, release means for performing a release operation, and a diaphragm device having a diaphragm for adjusting the quantity of light incident upon said light receiving surface of said image pick-up device, said diaphragm being normally fully closed, so that said diaphragm device opens said diaphragm to a predetermined diaphragm value after commencement of said release operation and fully closes said diaphragm in accordance with a predetermined stop-down speed after completion of the exposure, wherein said image pick-up device comprises:

smear detecting device for reading electric charges accumulated in each of said vertical transfer portions when said diaphragm is opened to a predetermined diaphragm value after said commencement of said release operation and for adding said read electric charges to compare a level of said added electrical charges with a predetermined level; and, control means for changing said stop-down speed of said diaphragm depending on said compared level of said added electrical charges.

2. A still video camera according to claim 1, wherein said control means closes said diaphragm at a high speed after said completion of the exposure when said smear detecting means detects that the level of said added electric charges is above said predetermined level.

3. A still video camera according to claim 1, wherein said control means closes said diaphragm at a normal speed after said completion of the exposure when said smear detecting device detects that the level of the added electric charges is not above said predetermined level.

4. A still video camera according to claim 1, further comprising a signal reading means for reading signal charges accumulated in said photoelectric elements of said image pick-up device.

5. A still video camera according to claim 4, wherein said control means closes said diaphragm at a high speed after said completion of the exposure when said smear detecting device detects that the level of said added electric charges is not above said predetermined level, and thereafter causes said signal reading means to read said signal charges.

6. A still video camera according to claim 4, wherein said control means causes said signal reading device to read said signal charges while closing the diaphragm at a low speed after said completion of the exposure when said smear detecting device detects that the level of said added electric charges is below said predetermined level.

7. A still video camera according to claim 1, wherein said smear detecting means reads said electric charges accumulated in said vertical transfer portions more than once at a predetermined time interval during said exposure operation.

8. A still video camera according to claim 7, wherein said smear detecting means adds said electric charges read by more than one reading for every vertical transfer portion.

* * * * *

UNITED STATES PATENT AND TRADEMARK OFFICE
CERTIFICATE OF CORRECTION

PATENT NO. : 5,416,517
DATED : May 16, 1995
INVENTOR(S) : N. TANI et al.

It is certified that error appears in the above-indentified patent and that said Letters Patent is hereby corrected as shown below:

Title page, item [76], "Inventors", lines 2 through 4, change "c/o Asahi Kogaku Kogyo Kabushiki Kaisha, 36-9, Maenocho 2-chome, Itabashi-ku," to ---of---.

On the cover, insert ---[73] Assignee: Asahi Kogaku Kogyo Kabushiki Kaisha, Tokyo, Japan---.

At column 38, line 52 (claim 6, line 2) of the printed patent, "device" should be changed to ---means---.

Signed and Sealed this

Seventeenth Day of September, 1996

Attest:

BRUCE LEHMAN

Attesting Officer    Commissioner of Patents and Trademarks